(12) United States Patent
Perl

(10) Patent No.: US 8,884,810 B2
(45) Date of Patent: Nov. 11, 2014

(54) COMPACT BEACON RADAR AND FULL ATC SERVICES SYSTEM

(75) Inventor: Elyahu Perl, Manlius, NY (US)

(73) Assignee: Saab Sensis Corporation, Wilmington, DE (US)

( * ) Notice: Subject to any disclaimer, the term of this patent is extended or adjusted under 35 U.S.C. 154(b) by 818 days.

(21) Appl. No.: 13/121,270

(22) PCT Filed: Sep. 29, 2009

(86) PCT No.: PCT/US2009/058736
§ 371 (c)(1),
(2), (4) Date: May 23, 2011

(87) PCT Pub. No.: WO2010/096101
PCT Pub. Date: Aug. 26, 2010

(65) Prior Publication Data
US 2011/0215963 A1    Sep. 8, 2011

Related U.S. Application Data

(60) Provisional application No. 61/100,850, filed on Sep. 29, 2008, provisional application No. 61/218,516, filed on Jun. 19, 2009.

(51) Int. Cl.
*G01S 13/00* (2006.01)
*H01Q 25/00* (2006.01)
*H04W 48/08* (2009.01)

(52) U.S. Cl.
CPC .............. *H01Q 25/00* (2013.01); *H04W 48/08* (2013.01); *H01Q 25/004* (2013.01)
USPC .............. 342/36; 342/42; 342/147; 342/149; 342/156; 342/159

(58) Field of Classification Search
USPC .............................. 342/33–51, 147–164, 175
See application file for complete search history.

(56) References Cited

U.S. PATENT DOCUMENTS

| | | | | | |
|---|---|---|---|---|---|
| 4,746,924 | A | * | 5/1988 | Lightfoot | 342/453 |
| 4,975,710 | A | * | 12/1990 | Baghdady | 342/442 |
| 5,191,349 | A | * | 3/1993 | Dinsmore et al. | 343/751 |
| 5,245,347 | A | * | 9/1993 | Bonta et al. | 342/149 |
| 5,619,206 | A | * | 4/1997 | Cole et al. | 342/37 |
| 5,973,643 | A | * | 10/1999 | Hawkes et al. | 342/457 |
| 6,104,346 | A | * | 8/2000 | Rudish et al. | 342/424 |
| 6,313,783 | B1 | * | 11/2001 | Kuntman et al. | 342/32 |
| 6,329,947 | B2 | * | 12/2001 | Smith | 342/418 |
| 7,250,902 | B2 | * | 7/2007 | Manoogian et al. | 342/154 |
| 7,385,560 | B1 | * | 6/2008 | Maloratsky et al. | 343/705 |

(Continued)

*Primary Examiner* — Peter Bythrow
(74) *Attorney, Agent, or Firm* — Burr & Brown, PLLC

(57) ABSTRACT

A system and method for a single site beacon transceiver including an omni-directional transceiver, a plurality of directional receiving antennas for receiving a signal, and a digital receiver for processing the signal to determine an azimuth to the source of the received signal. The digital receiver includes a plurality of receiver channels that are calibrated periodically and at least one processor that estimates a coarse signal azimuth for the signal by calculating an amplitude monopulse ratio for the signal using the two directional receiving antennas receiving the highest amplitude signal, and estimates a final signal azimuth for the signal using an interferometer baseline between the two directional receiving antennas or, alternately, subtracts the complex ratio of the measurements from the complex ratio of the antenna array RF model to determine the angle corresponding to the minimum of the absolute value of the difference.

80 Claims, 29 Drawing Sheets

(56) References Cited

U.S. PATENT DOCUMENTS

| | | | |
|---|---|---|---|
| 7,420,501 B2 * | 9/2008 | Perl | 342/30 |
| 7,439,901 B2 * | 10/2008 | Needham et al. | 342/30 |
| 7,508,343 B1 * | 3/2009 | Maloratsky et al. | 342/374 |
| 7,554,482 B2 * | 6/2009 | Smith et al. | 342/29 |
| 7,576,686 B2 * | 8/2009 | Needham et al. | 342/174 |
| 7,825,858 B2 * | 11/2010 | Blessing et al. | 342/442 |
| 2004/0235497 A1 * | 11/2004 | Zekavat | 455/456.1 |
| 2005/0156777 A1 * | 7/2005 | King et al. | 342/29 |
| 2005/0156780 A1 * | 7/2005 | Bonthron et al. | 342/107 |
| 2005/0179819 A1 * | 8/2005 | Bhaskar et al. | 348/614 |
| 2006/0238405 A1 * | 10/2006 | Wakayama et al. | 342/79 |
| 2008/0012765 A1 * | 1/2008 | Xu et al. | 342/442 |
| 2012/0257653 A1 * | 10/2012 | Nagaishi et al. | 375/219 |

* cited by examiner

COMPACT BEACON RADAR AND FULL ATC SERVICES SYSTEM

FIELD OF INVENTION

The invention relates to beacon systems, particularly to beacon systems used for air traffic surveillance.

BACKGROUND OF THE INVENTION

Beacon radars have been in extensive use for ATC applications. The role of beacon radar in all its forms is increasing as more and more services are provided through the bi-directional link available between the ground stations and the aircraft. Known prior art include beacon radars with mechanically rotating antennas, wide area multilateration systems and TCAS.

The earliest form of a beacon radar consisted of a directional, mechanically rotating antenna and a beacon transmitter/receiver (transceiver) connected to it. The transceiver sends interrogations at a frequency of 1030 MHz through the antenna and receives replies from the targets. The range of the target is determined by measuring the time between transmission and reception and subtracting the internal transponder delay. The net round trip delay (RTD) multiplied by the speed of light is twice the target range. Target azimuth is determined from the known azimuth of the spinning antenna. Beacon radars with scanning antennas require mechanical support structures that are heavy and not easy to transport. Further, the size of the antenna is directly related to the desired azimuth accuracy. Thus, if the azimuth accuracy requirement is high for the beacon radar, the antenna size is larger, making it heavier and more difficult to transport.

Beacon radars with scanning antennas sweep the detection volume at a constant rate that is equal to their rotation rate. In air traffic control (ATC) applications, more and more of the services depend on unsolicited transmissions (ADS-B Squits) from the airborne transponders. In order to receive all unsolicited transmissions the receiving system needs to be open in all azimuths at all times. Only under these conditions will the probability of intercept (POI) of target squits be 100%. Beacon radars using scanning antenna are unsuitable for these services because the unsolicited transponder transmissions is totally asynchronous with the antennas rotation.

Multilateration systems are based on multiple receivers, each measuring high accuracy time of arrival of all replies. The TOA (Time of Arrival) data is processed in a central processor. It can be shown that Differential Time of Arrival (DTOA) from, at least, 3 stations are sufficient to find 2D target position and at least 4 stations are required to find 3D target position. Multilateration systems can also use transmission and RTD to help the localization process. In particular, this capability is useful when the targets are outside of the baseline of the multilateration receive stations.

Multilateration systems overcome the POI issue of target squits associated with the scanning antenna systems because the receivers are open at all times in all azimuths. Therefore, multilateration systems can support ADSB and other services on the bi-directional link to the aircraft, and can also support ADSB verification because, by their nature, they estimate target position, or at least hyperbolas where the target can be present independent of the ADSB report. However, multilateration systems require relatively large baselines (distance between receiving stations) for high accuracy. As an example, in order to obtain accuracy comparable to BI-6, the baseline has to be in the order of 2000 meters (BI-6 is the Air Traffic Beacon Interrogator 6, which is a high performance air traffic beacon radar based on a large rotating antenna). Multilateration systems also require data links between the individual stations and the central processor, which add to the cost and complexity of the system. TCAS systems provide instantaneous hemisphere coverage with azimuth estimation. These systems typically estimate azimuth by comparing the amplitude and/or phase between adjacent antenna quadrants. The inter-element spacing between antenna elements is in the order of half a wavelength and, therefore, there are no ambiguities associated with phase comparison azimuth estimation methods. However, the size of the antenna is limited and, therefore, the accuracy is about 10 to 20 times worse than BI-6. TCAS antennas and azimuth estimation could be used for beacon surveillance systems, extracting range from RTD. Such systems have 100% POI and can, thus, support ADSB and other services if the antenna is connected to a transceiver/processor that support such services.

Interferometry can be used to obtain very high azimuth accuracy with much smaller baselines compared to multilateration. However, when the spacing between interferometric elements is over half of the wavelength rollover of 360 degrees of phase occurs and the measurement becomes ambiguous.

Further, where indirect reflections of a transmitted signal from other objects (i.e., multipath) mix with the transmitted signal coming directly from the target, the received signal is distorted by the reflected signals. The distortion of the received signal creates ambiguity that results in angle of arrival estimation error.

Existing methods for resolving this ambiguity is to add additional baselines, which requires additional antennas and receivers at different physical locations. This adds significant cost and complexity to any system. Prior art regarding adaptive techniques to mitigate signal distortion caused by multipath mention the possibility of adaptive nulling in space, using the antenna array, an optimal set of complex weights is calculated and the complex output from each antenna is multiplied by these weights and summed. However these techniques an adaptive null in space towards multipath sources only if the multipath signals can be separated from the direct path signals.

What is needed is a system and method for determining the angle of arrival of a received signal with high accuracy that can resolve the interferometric ambiguity and determine the angle of arrival correctly without having to add additional antennas and receivers at different physical locations.

SUMMARY OF THE INVENTION

According to a first aspect of the present invention, there is provided a single site beacon transceiver, comprising an omni-directional transceiver, a plurality of directional receiving antennas providing 360 degrees of coverage for receiving a signal; and a digital receiver for signal processing. The digital receiver comprising a plurality of receiver channels and at least one processor, wherein the plurality of receivers are calibrated periodically and the processor estimates a coarse signal azimuth for the signal by calculating an amplitude monopulse ratio for the signal using two of the plurality of directional receiving antennas receiving the highest amplitude signal, and estimates a final signal azimuth for the signal using an interferometer baseline between the two of the plurality of directional receiving antennas. In other embodiments discussed later in this disclosure, the full complex amplitude and phase data of the two receivers is used, in conjunction with a RF (Radio Frequency) model of the antennas, to determine unambiguous highly accurate angle of arrival.

In some embodiments of the present invention, the digital receiver estimates the final signal azimuth using the equation:

$$\text{final\_azimuth} = \arcsin\left[\sin(\text{coarse\_az}) + \left[\frac{\text{del\_phi} \cdot c}{2 \cdot pi \cdot f \cdot d}\right]\right] \quad (a)$$

where del_phi is the phase difference between the two of the plurality of directional receiving antennas, c is the speed of light, f is the RF frequency of received signal, d is distance between phase centers of the two of the plurality of directional receiving antennas, and coarse_az is the coarse signal azimuth relative to the normal to the interferometer baseline. In some of these embodiments, the coarse azimuth (coarse_az) is determined from an amplitude monopulse table using the amplitude monopulse ratio equation, $$\text{amp\_monopulse\_ratio} = \frac{\text{abs}(VC1) - \text{abs}(VC2)}{\text{abs}(VC1) + \text{abs}(VC2)}$$

where ABS denotes the absolute value of the complex envelope of the signal, VC1 is the complex envelope in one of the two of the plurality of directional receiving antennas after calibration, and VC2 is the complex envelope in the other of the two of the plurality of directional receiving antennas after calibration.

In other embodiments, the coarse azimuth (coarse_az) is determined from an amplitude monopulse table using the amplitude monopulse ratio equation, $$\text{amp\_monopulse\_ratio} = \frac{\text{abs}(VC1)}{\text{abs}(VC2)} \quad (b)$$

where: ABS denotes the absolute value of the complex envelope of the signal, VC1 is the complex envelope in one of the two of the plurality of directional receiving antennas after calibration, and VC2 is the complex envelope in the other of the two of the plurality of directional receiving antennas after calibration.

In some embodiments, the coarse azimuth (coarse_az) is determined from an amplitude monopulse table using the amplitude monopulse ratio equation, $$\text{amp\_monopulse\_ratio} = \log\left[\frac{\text{abs}(VC1)}{\text{abs}(VC2)}\right] \quad (b)$$

where ABS denotes the absolute value of the complex envelope of the signal, VC1 is the complex envelope in one of the two of the plurality of directional receiving antennas after calibration, and VC2 is the complex envelope in the other of the two of the plurality of directional receiving antennas after calibration.

In some embodiments, the omni-directional transceiver transmits an interrogation signal and the signal is a reply signal to the interrogation signal or an unsolicited beacon "squit" transmission, and wherein the omni-directional transceiver and the two of the plurality of directional receiving antennas receiving the highest amplitude signal provide at least two interferometer baselines to resolve azimuth ambiguities. In some embodiments, the digital receiver calculates an interferometric azimuth deviation from an interferometric phase difference between the two of the plurality of directional receiving antennas. In some embodiments, the signals are converted to a numerical representation of their complex envelope using a Hilbert Transform. In some of these embodiments, the signal is downconverted to an intermediate frequency and digitized prior to being transformed into a numerical representation of the signal.

In some embodiments of the present invention, the calibration of the plurality of receiver channels of the single site beacon transceiver comprises the steps of receiving a calibration signal at each of the plurality of receiver channels, downconverting the calibration signal to an intermediate frequency, digitizing the downconverted calibration signal, transforming the calibration signal into a numerical representation of a complex envelope of the calibration signal using a Hilbert Transform and calculating an insertion phase difference and an insertion amplitude difference between the plurality of receiver channels, associating each antenna of the plurality of antennas with one of the plurality of receiver channels, combining the insertion amplitude difference and the insertion phase difference calculated for each receiver channel with a stored insertion amplitude difference and a stored insertion phase difference for the antenna associated with the receiver channel; storing the insertion amplitude difference and the insertion phase difference for each receiver channel and the antenna associated with the receiver channel, and then removing the insertion amplitude difference and the insertion phase difference of the receiver channel and the antenna associated with the receiver channel from the signal before estimating the azimuth. In other embodiments, each of the plurality of receiver channels is calibrated by periodically injecting a calibration signal through a directional coupler to determine a calibration coefficient for each of the plurality of receiver channels, storing the calibration coefficient for each of the plurality of receiver channels, and removing the calibration coefficient from the signal before estimating a coarse signal azimuth.

According to a second aspect of the present invention, there is provided a single site beacon transceiver, comprising an omni-directional transceiver, wherein the omni-directional transceiver transmits an interrogation signal, a plurality of directional receiving antennas providing 360 degrees of coverage for receiving a signal, and a digital receiver for processing the signal, the digital receiver comprising a plurality of receiver channels and at least one processor. The processing of the signal comprises calibrating the plurality of receiver channels periodically before estimating the angle of arrival of the signal, determining which two of the plurality of directional receiving antennas received the highest amplitude signal, determining an interferometric baseline between the two of the plurality of directional receiving antennas, downconverting, digitizing and transforming the signal at each of the two of the plurality of directional receiving antennas into a numerical representation of the signal, and calculating a numerical representation of a complex envelope from the numerical representation of the signal for each of the two of the plurality of directional receiving antennas. The processing further comprises calculating an amplitude monopulse ratio for the signal, calculating a coarse signal azimuth angle for the signal by converting the signal amplitude monopulse ratio to an azimuth angle relative to the interferometric baseline, calculating an interferometric phase difference for the signal relative to the interferometric baseline, estimating an interferometric azimuth deviation from the calculated coarse signal azimuth angle, and determining a final signal azimuth for the signal using the calculated coarse signal azimuth angle and the estimated interferometric azimuth deviation.

In some embodiments of the present invention, the digital receiver estimates the final signal azimuth using the equation:

$$\text{final\_azimuth} = \arcsin\left[\sin(\text{coarse\_az}) + \left[\frac{\text{del\_phi} \cdot c}{2 \cdot pi \cdot f \cdot d}\right]\right] \quad (a)$$

where del_phi is the phase difference between the two of the plurality of directional receiving antennas, c is the speed of light, f is the RF frequency of received signal, and d is distance between phase centers of the two of the plurality of directional receiving antennas, and coarse_az is the coarse signal azimuth relative to the normal to the interferometer baseline. In some embodiments, the single site beacon transceiver determines the coarse azimuth (coarse_az) from an amplitude monopulse table using the amplitude monopulse ratio equation, $$\text{amp\_monopulse\_ratio} = \frac{\text{abs}(VC1) - \text{abs}(VC2)}{\text{abs}(VC1) + \text{abs}(VC2)}$$

where ABS denotes the absolute value of the complex envelope of the signal, VC1 is the complex envelope in one of the two of the plurality of directional receiving antennas after calibration, and VC2 is the complex envelope in the other of the two of the plurality of directional receiving antennas after calibration. In other embodiments, the coarse azimuth (coarse_az) is determined from an amplitude monopulse table using the amplitude monopulse ratio equation, $$\text{amp\_monopulse\_ratio} = \frac{\text{abs}(VC1)}{\text{abs}(VC2)} \quad (b)$$

where ABS denotes the absolute value of the complex envelope of the signal, VC1 is the complex envelope in one of the two of the plurality of directional receiving antennas after calibration, and VC2 is the complex envelope in the other of the two of the plurality of directional receiving antennas after calibration.

According to a third aspect of the present invention, there is provided a single site beacon transceiver comprising an omni-directional transceiver, a plurality of directional receiving antennas providing 360 degrees of coverage for receiving signals, and a digital receiver for processing the signal, the digital receiver comprising a plurality of receiver channels and at least one processor. The processing of the signal comprises calibrating the plurality of directional receiving antennas periodically before estimating the angle of arrival of the signal, determining which two of the plurality of directional receiving antennas received the highest amplitude signal, determining an interferometric baseline between the two of the plurality of directional receiving antennas, downconverting, digitizing and transforming the signal at each of the two of the plurality of directional receiving antennas into a numerical representation of the signal, and calculating a numerical representation of a complex envelope from the numerical representation of the signal for each of the two of the plurality of directional receiving antennas. The processing further comprises using the following equation to determine an azimuth angle with respect to an interferometer baseline:

$$\text{COST} = \left|\frac{VC1\_\text{recieved}}{VC2\_\text{recieved}} - \frac{VC1\_\text{model}(\text{theta})}{VC2\_\text{model}(\text{theta})}\right|^2$$

Where VC1_received is the complex envelope of the received signal after calibration at one of the two of the plurality of directional receiving antennas, VC2_received is the complex envelope of the received signal after calibration at the other of the two of the plurality of directional, VC1_model(theta) is the model of the complex envelope of the received signal as a function of azimuth theta at one of the two of the plurality of the two directional receiving antennas, VC2_model(theta) is the model of the complex envelope of the received signal as a function of azimuth theta at the other of the two of the plurality of the two directional receiving antennas; and the azimuth angle corresponds to a minimum COST.

According to a fourth aspect of the present invention, there is provided a method of localizing targets using a single site compact beacon transceiver, the method comprising transmitting an interrogation signal from an omni-directional transceiver, receiving a reply signal at a plurality of directional receiving antennas providing 360 degrees of coverage for receiving a signal, and processing the received reply signals in a digital receiver, the digital receiver comprising a plurality of receiver channels and at least one processor. The method further comprising processing the signal by calibrating the plurality of receiver channels periodically before estimating the angle of arrival of the signal, determining which two of the plurality of directional receiving antennas received the highest amplitude signal, determining an interferometric baseline between the two of the plurality of directional receiving antennas, and downconverting, digitizing and transforming the signal at each of the two of the plurality of directional receiving antennas into a numerical representation of the signal. The method further comprising calculating a numerical representation of a complex envelope from the numerical representation of the signal for each of the two of the plurality of directional receiving antennas, calculating an amplitude monopulse ratio for the signal, calculating a coarse signal azimuth angle for the signal by converting the signal amplitude monopulse ratio to an azimuth angle relative to the interferometric baseline, calculating an interferometric phase difference for the signal relative to the interferometric baseline, estimating an interferometric azimuth deviation from the calculated coarse signal azimuth angle, and determining a final signal azimuth angle for the signal using the calculated coarse signal azimuth angle and the estimated interferometric azimuth deviation.

In some embodiments, the step of determining the final signal azimuth angle uses the equation:

$$\text{final\_azimuth} = \arcsin\left[\sin(\text{coarse\_az}) + \left[\frac{\text{del\_phi} \cdot c}{2 \cdot pi \cdot f \cdot d}\right]\right]$$

where del_phi is the phase difference between the two of the plurality of direction receiving antennas, c is the speed of light, f is the RF frequency of received signal, d is distance between phase centers of the two of the plurality of directional receiving antennas, and coarse_az is the coarse signal azimuth relative to the normal to the interferometer baseline. In other embodiments, the step of determining the coarse azimuth (coarse_az) uses an amplitude monopulse table and the amplitude monopulse ratio equation, $$\mathrm{amp\_monopulse\_ratio} = \frac{\mathrm{abs}(VC1) - \mathrm{abs}(VC2)}{\mathrm{abs}(VC1) + \mathrm{abs}(VC2)}$$

where ABS denotes the absolute value of the complex envelope of the signal, VC1 is the complex envelope in one of the two of the plurality of directional receiving antennas after calibration, and VC2 is the complex envelope in the other of the two of the plurality of directional receiving antennas after calibration.

In other embodiments, the step of determining the coarse azimuth (coarse_az) uses an amplitude monopulse table and the amplitude monopulse ratio equation, $$\mathrm{amp\_monopulse\_ratio} = \frac{\mathrm{abs}(VC1)}{\mathrm{abs}(VC2)}$$

where ABS denotes the absolute value of the complex envelope of the signal, VC1 is the complex envelope in one of the two of the plurality of directional receiving antennas after calibration, and VC2 is the complex envelope in the other of the two of the plurality of directional receiving antennas after calibration. In other embodiments, the method further comprises the step of calculating a range to the target transmitting the reply signal based on the round trip delay time, wherein the omni-directional transceiver and the two of the plurality of directional receiving antennas provide at least two interferometer baselines to resolve azimuth ambiguities.

In some embodiments of the method of the present invention, each of the plurality of receiver channels is calibrated by periodically injecting a calibration signal through a directional coupler, determining a calibration coefficient for each of the plurality of receiver channels, storing the calibration coefficient for each of the plurality of receiver channels, and removing the calibration coefficient for each of the plurality of receiver channels from the signal before estimating a coarse signal azimuth. In other embodiments, the method of calibrating the plurality of receiver channels comprises the steps of receiving a calibration signal at each of the plurality of receiver channels, downconverting the calibration signal to an intermediate frequency, digitizing the downconverted calibration signal, transforming the calibration signal into a numerical representation of a complex envelope of the calibration signal using a Hilbert Transform and calculating an insertion phase difference and an insertion amplitude difference between the plurality of receiver channels, associating each antenna of the plurality of antennas with one of the plurality of receiver channels, combining the insertion amplitude difference and the insertion phase difference calculated for each receiver channel with a stored insertion amplitude difference and a stored insertion phase difference for the antenna associated with the receiver channel, storing the insertion amplitude difference and the insertion phase difference for each receiver channel and the antenna associated with the receiver channel, and then removing the insertion amplitude difference and the insertion phase difference of the receiver channel and the antenna associated with the receiver channel from the signal before estimating the azimuth.

According to a fifth aspect of the present invention, there is provided a single site beacon transceiver, comprising at least one directional transceiver located at a central position in the single site beacon transceiver, a plurality of directional receiving antennas located along a periphery of the single site beacon transceiver providing 360 degrees of coverage for receiving the signal, and a digital receiver for processing the signal, the digital receiver comprising a plurality of receiver channels and at least one processor. The processing of the signal comprises the digital receiver periodically calibrating each of the plurality of receiver channels, estimating a coarse signal azimuth for the signal by calculating an amplitude monopulse ratio for the signal using two of the plurality of directional receiving antennas that receive the highest amplitude signal, and estimating a final signal azimuth for the signal using an interferometer baseline between the two of the plurality of directional receiving antennas.

In some embodiments, the digital receiver estimates the final signal azimuth using the equation:

$$\mathrm{final\_azimuth} = \arcsin\left[\sin(\mathrm{coarse\_az}) + \left[\frac{\mathrm{del\_phi} \cdot c}{2 \cdot pi \cdot f \cdot d}\right]\right] \quad (a)$$

where del_phi is the phase difference between the two of the plurality of directional receiving antennas, c is the speed of light, f is the RF frequency of received signal, d is distance between phase centers of the two of the plurality of directional receiving antennas, and coarse_az is the coarse signal azimuth relative to the normal to the interferometer baseline.

In some embodiments, the coarse azimuth (coarse_az) is determined from an amplitude monopulse table using the amplitude monopulse ratio equation, $$\mathrm{amp\_monopulse\_ratio} = \frac{\mathrm{abs}(VC1) - \mathrm{abs}(VC2)}{\mathrm{abs}(VC1) + \mathrm{abs}(VC2)}$$

where ABS denotes the absolute value of the complex envelope of the signal, VC1 is the complex envelope in one of the two of the plurality of directional receiving antennas after calibration, and VC2 is the complex envelope in the other of the two of the plurality of directional receiving antennas after calibration. In other embodiments, the coarse azimuth (coarse_az) is determined from an amplitude monopulse table using the amplitude monopulse ratio equation, $$\mathrm{amp\_monopulse\_ratio} = \frac{\mathrm{abs}(VC1)}{\mathrm{abs}(VC2)} \quad (b)$$

where ABS denotes the absolute value of the complex envelope of the signal, VC1 is the complex envelope in one of the two of the plurality of directional receiving antennas after calibration, and VC2 is the complex envelope in the other of the two of the plurality of directional receiving antennas after calibration. In other embodiments, the coarse azimuth (coarse_az) is determined from an amplitude monopulse table using the amplitude monopulse ratio equation, $$\mathrm{amp\_monopulse\_ratio} = \log\left[\frac{\mathrm{abs}(VC1)}{\mathrm{abs}(VC2)}\right] \quad (b)$$

where ABS denotes the absolute value of the complex envelope of the signal, VC1 is the complex envelope in one of the two of the plurality of directional receiving antennas after calibration, and VC2 is the complex envelope in the other of the two of the plurality of directional receiving antennas after calibration.

According to a sixth aspect of the present invention, there is provided a single site beacon transceiver, comprising at least one directional transceiver located at a central position in the single site beacon transceiver for transmitting a signal and receiving a signal, wherein the at least one directional transceiver transmits an interrogation signal, a plurality of directional receiving antennas located along a periphery of the single site beacon transceiver providing 360 degrees of coverage for receiving signals, and a digital receiver for processing the signal, the digital receiver comprising a plurality of receiver channels and at least one processor. The processing of the signal comprises calibrating the plurality of receiver channels periodically before estimating the angle of arrival of the signal, determining which two of the plurality of directional receiving antennas received the highest amplitude signal, determining an interferometric baseline between the two of the plurality of directional receiving antennas, downconverting, digitizing and transforming the signal at each of the two of the plurality of directional receiving antennas into a numerical representation of the signal, and calculating a numerical representation of a complex envelope from the numerical representation of the signal for each of the two of the plurality of directional receiving antennas. The processing of the signal further comprises calculating an amplitude monopulse ratio for the signal, calculating a coarse signal azimuth angle for the signal by converting the signal amplitude monopulse ratio to an azimuth angle relative to the interferometric baseline, calculating an interferometric phase difference for the signal relative to the interferometric baseline, estimating an interferometric azimuth deviation from the calculated coarse signal azimuth angle, and determining a final signal azimuth for the signal using the calculated coarse signal azimuth angle and the estimated interferometric azimuth deviation.

In some embodiments, the digital receiver estimates the final signal azimuth using the equation:

$$\text{final\_azimuth} = \arcsin\left[\sin(\text{coarse\_az}) + \left[\frac{\text{del\_phi} \cdot c}{2 \cdot \text{pi} \cdot f \cdot d}\right]\right] \quad \text{(a)}$$

where del_phi is the phase difference between the two of the plurality of directional receiving antennas, c is the speed of light, f is the RF frequency of received signal, d is distance between phase centers of the two of the plurality of directional receiving antennas, and coarse_az is the coarse signal azimuth relative to the normal to the interferometer baseline. In some embodiments, the coarse azimuth (coarse_az) is determined from an amplitude monopulse table using the amplitude monopulse ratio equation, $$\text{amp\_monopulse\_ratio} = \frac{\text{abs}(VC1) - \text{abs}(VC2)}{\text{abs}(VC1) + \text{abs}(VC2)}$$

where ABS denotes the absolute value of the complex envelope of the signal, VC1 is the complex envelope in one of the two of the plurality of directional receiving antennas after calibration, and VC2 is the complex envelope in the other of the two of the plurality of directional receiving antennas after calibration. In other embodiments, the coarse azimuth (coarse_az) is determined from an amplitude monopulse table using the amplitude monopulse ratio equation, $$\text{amp\_monopulse\_ratio} = \frac{\text{abs}(VC1)}{\text{abs}(VC2)} \quad \text{(b)}$$

where ABS denotes the absolute value of the complex envelope of the signal, VC1 is the complex envelope in one of the two of the plurality of directional receiving antennas after calibration, and VC2 is the complex envelope in the other of the two of the plurality of directional receiving antennas after calibration.

In some embodiments, the at least one directional transceiver located at a central position in the single site beacon transceiver transmits an interrogation signal, and the signal is a reply signal to the interrogation signal or an unsolicited beacon "squit" transmission, and wherein the at least one directional transceiver and the plurality of directional antennas provides at least two interferometer baselines to resolve azimuth ambiguities. In some embodiments, the digital receiver calculates an interferometric azimuth deviation from an interferometric phase difference between the two of the plurality of directional receiving antennas. In some embodiments, the signal is downconverted to an intermediate frequency and digitized prior to being transformed into a numerical representation of the signal. In some of these embodiments, the signals are converted to a numerical representation of a complex envelope using a Hilbert Transform.

According to a seventh aspect of the present invention, there is provided a single site beacon transceiver, comprising at least one directional transceiver located at a central position in the single site beacon transceiver, a plurality of directional receiving antennas located along a periphery of the single site beacon transceiver providing 360 degrees of coverage for receiving the signal, and a digital receiver for processing the signal, the digital receiver comprising a plurality of receiver channels and at least one processor. The processing of the signal comprises calibrating the plurality of receiver channels periodically before estimating the angle of arrival of the signal, determining which two of the plurality of directional receiving antennas received the highest amplitude signal, determining an interferometric baseline between the two of the plurality of directional receiving antennas, downconverting, digitizing and transforming the signal at each of the two of the plurality of directional receiving antennas into a numerical representation of the signal, and calculating a numerical representation of a complex envelope from the numerical representation of the signal for each of the two of the plurality of directional receiving antennas. The processing of the signal uses the following equation to determine an azimuth angle with respect to an interferometer baseline:

$$\text{COST} = \left| \frac{VC1\_recieved}{VC2\_recieved} - \frac{VC1\_model(\theta)}{VC2\_model(\theta)} \right|^2$$

Where VC1_received is the complex envelope of the received signal after calibration at one of the two of the plurality of directional receiving antennas, VC2_received is the complex envelope of the received signal after calibration at the other of the two of the plurality of directional, VC1_model(theta) is the model of the complex envelope of the received signal as a function of azimuth theta at one of the two of the plurality of the two directional receiving antennas; VC2_model(theta) is the model of the complex envelope of the received signal as a function of azimuth theta at the other of the two of the plurality of the two directional receiving antennas; and the azimuth angle corresponds to a minimum COST.

According to a eighth aspect of the present invention, there is provided a method of localizing targets using a single site beacon transceiver, the method comprising transmitting an interrogation signal from at least one of the at least one directional transceivers located at a central position in the single site beacon transceiver, receiving a reply signal at a plurality of directional receiving antennas providing 360 degrees of coverage for receiving signals, and processing the received reply signals in a digital receiver, the digital receiver comprising a plurality of receiver channels and at least one processor. The processing of the signal comprises calibrating the plurality of receiver channels periodically before estimating the angle of arrival of the signal, determining which two of the plurality of directional receiving antennas received the highest amplitude a signal, determining an interferometric baseline between the two of the plurality of directional receiving antennas, downconverting, digitizing and transforming the signal at each of the two of the plurality of directional receiving antennas into a numerical representation of the signal and calculating a numerical representation of a complex envelope from the numerical representation of the signal for each of the two of the plurality of directional receiving antennas. The processing of the signal further comprises calculating an amplitude monopulse ratio for the signal, calculating a coarse signal azimuth angle for the signal by converting the signal amplitude monopulse ratio to an azimuth angle relative to the interferometric baseline, calculating an interferometric phase difference for the signal relative to the interferometric baseline, estimating an interferometric azimuth deviation from the calculated coarse signal azimuth angle, and determining a final signal azimuth angle for the signal using the calculated coarse signal azimuth angle and the estimated interferometric azimuth deviation.

In some embodiments, the step of determining the final signal azimuth angle uses the equation:

$$\text{final\_azimuth} = \arcsin\left[\sin(\text{coarse\_az}) + \left[\frac{\text{del\_phi} \cdot c}{2 \cdot \text{pi} \cdot f \cdot d}\right]\right]$$

where del_phi is the phase difference between the two of the plurality of direction receiving antennas, c is the speed of light, f is the RF frequency of received signal, d is distance between phase centers of the two of the plurality of directional receiving antennas; and coarse_az is the coarse signal azimuth relative to the normal to the interferometer baseline. In other embodiments, the step of determining the coarse azimuth (coarse_az) uses an amplitude monopulse table and the amplitude monopulse ratio equation, $$\text{amp\_monopulse\_ratio} = \frac{\text{abs}(VC1) - \text{abs}(VC2)}{\text{abs}(VC1) + \text{abs}(VC2)}$$

where ABS denotes the absolute value of the complex envelope of the signal, VC1 is the complex envelope in one of the two of the plurality of directional receiving antennas after calibration, and VC2 is the complex envelope in the other of the two of the plurality of directional receiving antennas after calibration. In other embodiments, the step of determining the coarse azimuth (coarse_az) uses an amplitude monopulse table and the amplitude monopulse ratio equation, $$\text{amp\_monopulse\_ratio} = \frac{\text{abs}(VC1)}{\text{abs}(VC2)}$$

where ABS denotes the absolute value of the complex envelope of the signal, VC1 is the complex envelope in one of the two of the plurality of directional receiving antennas after calibration, and VC2 is the complex envelope in the other of the two of the plurality of directional receiving antennas after calibration.

In some embodiments, the method further comprises the step of calculating the range to the target transmitting the reply signal based on the round trip delay time, wherein the at least one directional transceiver and the plurality of directional receiving antennas provide at least two interferometer baselines to resolve azimuth ambiguities.

According to a ninth aspect of the present invention, there is provided a single site beacon transceiver, comprising an omni-directional transceiver, at least one directional receiving antenna, a digital receiver for processing the signal, the digital receiver comprising a plurality of receiver channels and at least one processor. The processing of the signal comprises calibrating the plurality of receiver channels periodically before estimating the angle of arrival of the signal, determining which two of the plurality of directional receiving antennas received the highest amplitude signal, determining an interferometric baseline between the two of the plurality of directional receiving antennas, downconverting, digitizing and transforming the signal at each of the two of the plurality of directional receiving antennas into a numerical representation of the signal and calculating a numerical representation of a complex envelope from the numerical representation of the signal for each of the two of the plurality of directional receiving antennas. The processing of the signal uses two interferometer baselines in the following equation to determine an azimuth angle with respect to an interferometer baseline:

$$\text{COST} = W1 \cdot \left|\frac{VC1\_recieved}{VC2\_recieved} - \frac{VC1\_model(theta)}{VC2\_model(theta)}\right|^2 +$$

$$W2 \cdot \left|\frac{VC1\_recieved}{VC3\_recieved} - \frac{VC1\_model(theta)}{VC3\_model(theta)}\right|^2 +$$

$$W3 \cdot \left|\frac{VC2\_recieved}{VC3\_recieved} - \frac{VC2\_model(theta)}{VC3\_model(theta)}\right|^2$$

Where W1, W2 and W3 are adaptive weighting values that are optimized according to estimation theory to mitigate multipath by adding additional baselines, VC1_received is the complex envelope of the received signal after calibration at one of the two of the plurality of directional receiving antennas, VC2_received is the complex envelope of the received signal after calibration at the other of the two of the plurality of directional, VC3_received is the complex envelope of the received signal after calibration at the omni-directional antenna relative to the signal at the other of the two of the plurality of directional receiving antennas, VC1_model (theta) is the model of the complex envelope of the received signal as a function of azimuth theta at one of the two of the plurality of the two directional receiving antennas, VC2_model(theta) is the model of the complex envelope of the received signal as a function of azimuth theta at the other of the two of the plurality of the two directional receiving antennas; VC3_model(theta) is the model of the complex envelope of the received signal as a function of azimuth theta at the omni-directional antenna relative to the signal at the other of the two of the plurality of directional receiving antennas; and the azimuth angle corresponds to a minimum COST. The COST is based on comparison between the complex (amplitude and phase) of the measured signal and a RF model of the signal as a function of azimuth and the above COST is one embodiment of this principle.

According to a tenth aspect of the present invention, there is provided a single site beacon transceiver, comprising at least one directional transceiver located at a central position in the single site beacon transceiver, a plurality of directional receiving antennas located along a periphery of the single site beacon transceiver providing 360 degrees of coverage for receiving the signal, and a digital receiver for processing the signal, the digital receiver comprising a plurality of receiver channels and at least one processor. The processing of the signal comprises calibrating the plurality of directional receiving antennas periodically before estimating the angle of arrival of the signal, determining which two of the plurality of directional receiving antennas received the highest amplitude signal, determining an interferometric baseline between the two of the plurality of directional receiving antennas, downconverting, digitizing and transforming the signal at each of the two of the plurality of directional receiving antennas into a numerical representation of the signal, and calculating a numerical representation of a complex envelope from the numerical representation of the signal for each of the two of the plurality of directional receiving antennas. The processing of the signal uses two interferometer baselines and the following equation to determine an azimuth angle with respect to an interferometer baseline:

$$COST = W1 \cdot \left| \frac{VC1\_recieved}{VC2\_recieved} - \frac{VC1\_model(theta)}{VC2\_model(theta)} \right|^2 +$$
$$W2 \cdot \left| \frac{VC1\_recieved}{VC3\_recieved} - \frac{VC1\_model(theta)}{VC3\_model(theta)} \right|^2 +$$
$$W3 \cdot \left| \frac{VC2\_recieved}{VC3\_recieved} - \frac{VC2\_model(theta)}{VC3\_model(theta)} \right|^2$$

Where W1, W2 and W3 are adaptive weighting values that are optimized according to estimation theory to mitigate multipath, VC1_received is the complex envelope of the received signal after calibration at one of the two of the plurality of directional receiving antennas, VC2_received is the complex envelope of the received signal after calibration at the other of the two of the plurality of directional, VC3_received is the complex envelope of the received signal after calibration at the omni-directional antenna relative to the signal at the other of the two of the plurality of directional receiving antennas, VC1_model(theta) is the model of the complex envelope of the received signal as a function of azimuth theta at one of the two of the plurality of the two directional receiving antennas, VC2_model(theta) is the model of the complex envelope of the received signal as a function of azimuth theta at the other of the two of the plurality of the two directional receiving antennas, VC3_model(theta) is the model of the complex envelope of the received signal as a function of azimuth theta at the omni-directional antenna relative to the signal at the other of the two of the plurality of directional receiving antennas, and the azimuth angle corresponds to a minimum COST.

BRIEF DESCRIPTION OF THE DRAWINGS

For a fuller understanding of the nature and objects of the invention, reference should be made to the following detailed description of a preferred mode of practicing the invention, read in connection with the accompanying drawings in which.

DETAILED DESCRIPTION OF THE INVENTION

Figure 1:
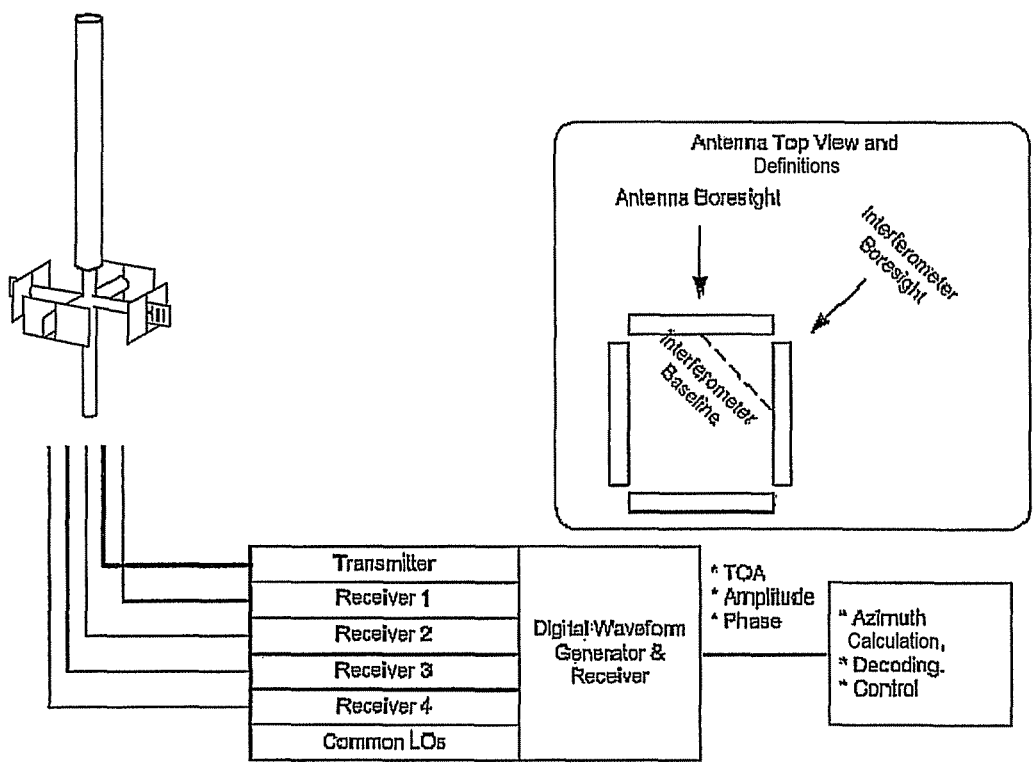
FIG. 1 depicts side and top views of the first embodiment of the single site beacon transceiver that includes one omni-directional antenna and four directional receiving antennas and a block diagram of a digital RF transceiver in the first embodiment and showing the boresight of one of the directional antennas, the interferometer baseline and the interferometer boresight between two of the directional antennas.

In some embodiments of the present invention, the single site beacon transceiver 10 includes an omni-directional transceiver, a plurality of directional receiving antennas 20 providing 360 degrees of coverage for receiving a signal; and a digital RF transceiver 30 for processing received signals, as shown in FIG. 1.

The omni-directional transceiver includes an omni-directional antenna 15 and a digital RF transceiver 30 covering at least the desired frequencies in at least one of the HF, VHF, UHF and SHF frequency bands, for example. The omni-directional antenna 15 comprises at least one material selected from metals, metallic coated plastic and printed circuit board material that includes at least one conductive layer. In one embodiment of the beacon transceiver 10, the digital RF transceiver 30 and omni-directional antenna 15 transmit signals at 1030 MHz and the omni-directional antenna 15 and digital RF transceiver 30 receives RF signals at 1090 MHz. The signals transmitted by the RF transceiver 30 and omni-directional antenna 15 include beacon interrogation signals.

Figure 2:
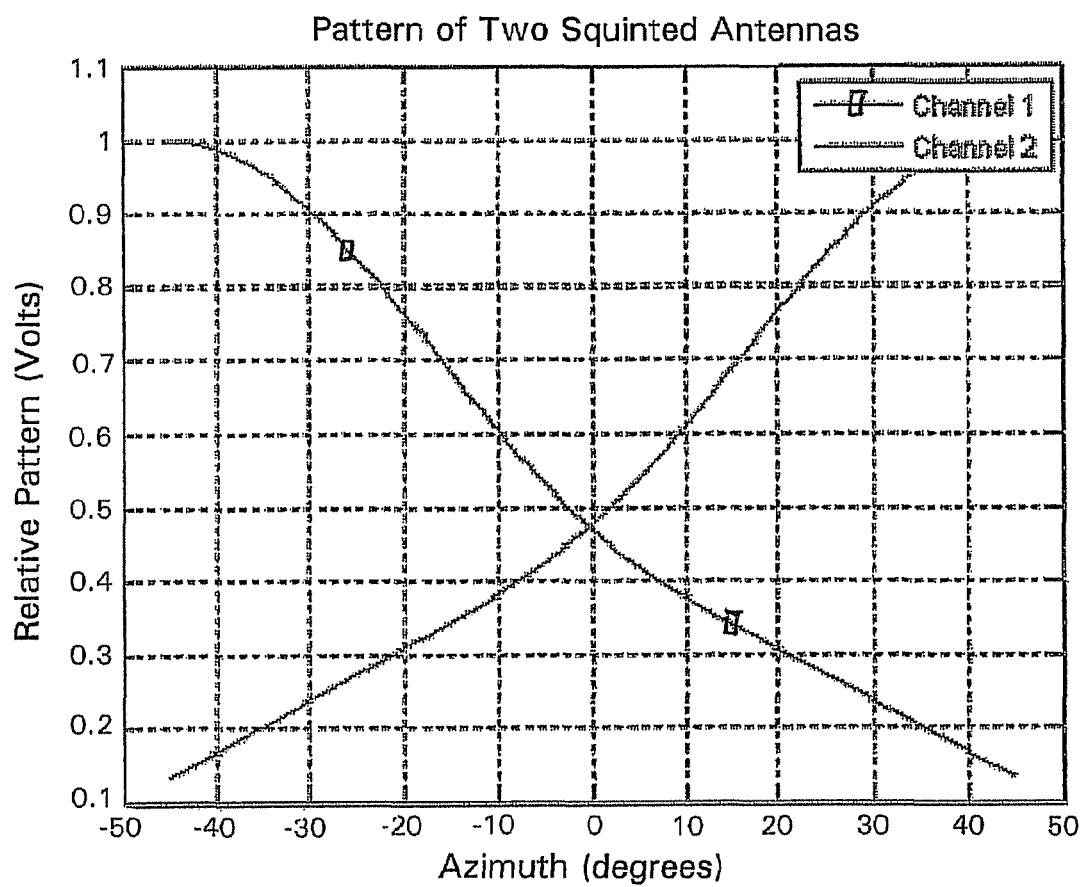
FIG. 2 depicts an example of the overlapping radiation patterns of two adjacent directional receiving antennas in the first embodiment of the present invention.

Each of the plurality of directional receiving antennas 20 comprises at least one material selected from metals, metallic coated plastic and printed circuit board material that includes at least one conductive layer. The directional receiving antennas 20 receive RF signals in at least one of the MF, HF, VHF, UHF and SHF frequency bands. In some embodiments of the beacon transceiver 10, each of the plurality of directional receiving antennas 20 receives RF signals at 1090 MHz. In other embodiments, the plurality of directional receiving antennas 20 are configured to provide less than 360 degrees of coverage based on the specific application. In some embodiments, the plurality of directional receiving antennas 20 are four directional receiving antennas that are angled or "squinted" such that the respective boresights of adjacent antennas are ninety degrees with respect to each other, as shown in FIG. 1. In this configuration, the interferometer boresight is between adjacent antennas offset by forty five degrees from the boresight of each of the adjacent antennas. One example of the antenna pattern of the two adjacent squinted antennas is shown in FIG. 2. By having a transceiver located at a central position with respect to the four directional receiving antennas in the antenna configuration of FIG. 1, two additional baselines are included in the single site beacon transceiver of the present invention.

In some embodiments, the digital RF transceiver 30 transmits an RF signal at one or more frequencies via the omni-directional antenna 15, as shown in FIG. 1. In these embodiments, the digital RF transceiver 30 includes a plurality of input or digital signal receiver channels 23 for receiving the RF signals from the omni-directional antenna 15 and the plurality of directional receiving antennas 20 and at least one processor 22 (shown in FIG. 3). Each of the directional receiving antennas 20 and the omni-directional antenna 15 has at least one dedicated digital signal receiver channel 23. In some embodiments, the digital RF transceiver 30 is more than one digital RF transceiver.

Figure 3:
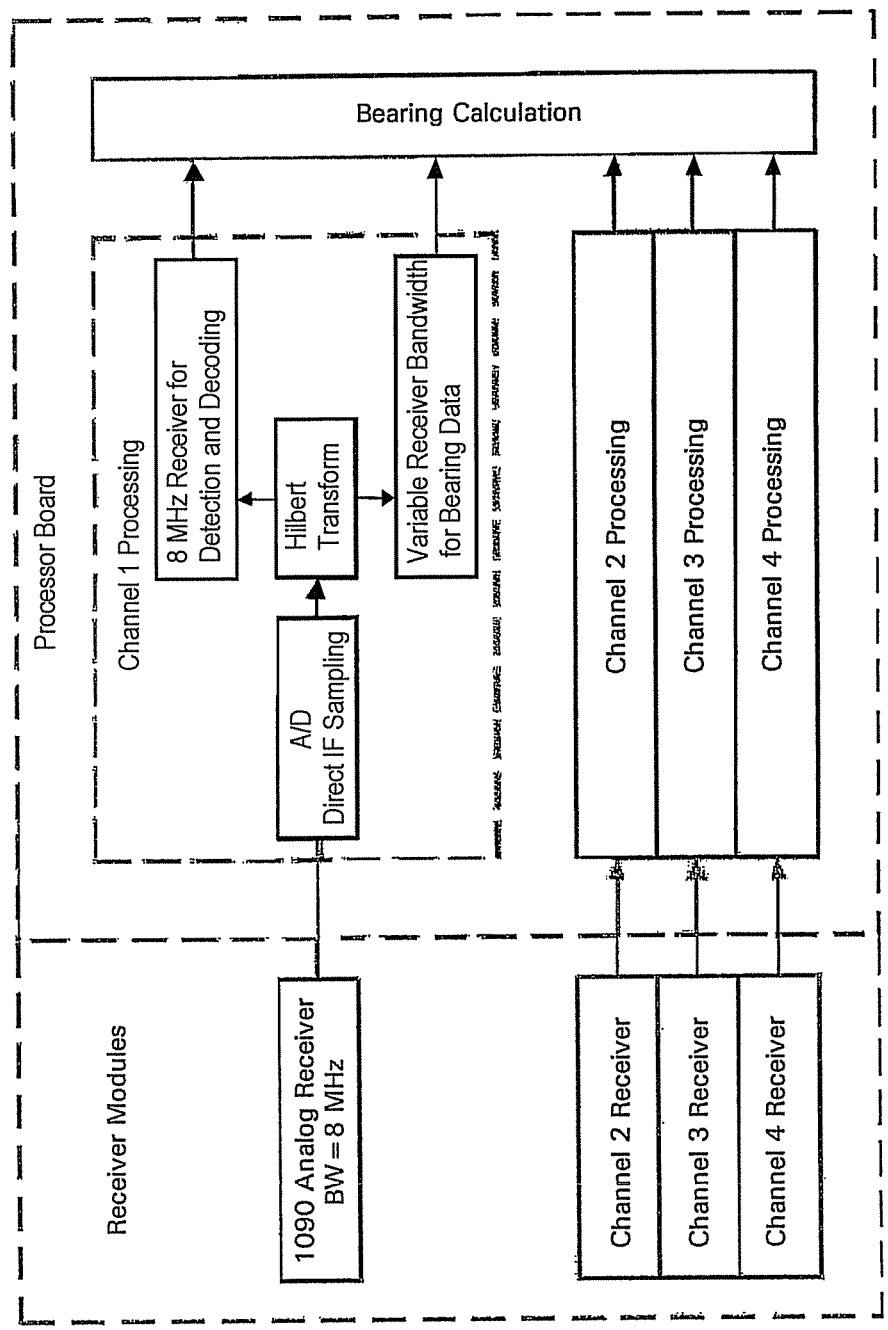
FIG. 3 depicts a block diagram of one example of a digital RF transceiver.

The at least one processor 22 includes at least a single processor board, such as an SBC, memory, A/D converters and software including Hilbert transforms to downconvert, digitize and transform the signal into a numerical representation of the signal and to calculate an azimuth to the target transmitting the signal, as shown in FIG. 3. In some embodiments, the radiation patterns of the antennas are measured and the amplitude and phase are stored in tables in the at least one processor. The at least one processor 22 performs the calculations required to calibrate the plurality of receiver channels, determining the receiver channels receiving the highest amplitude signal and determining the appropriate interferometer baseline. The at least one processor also performs the calculations required to determine the amplitude monopulse ratio and azimuth of the received signal.

In other embodiments, the single site beacon transceiver comprises at least one directional transceiver located at a central position in the single site beacon transceiver for transmitting a signal and receiving a signal, wherein the at least one directional transceiver transmits an interrogation signal, a plurality of directional receiving antennas located along a periphery of the single site beacon transceiver providing 360 degrees of coverage for receiving signals, and a digital RF transceiver 30 for processing the signal, the digital RF transceiver 30 comprising a plurality of receiver channels and at least one processor.

Figure 4:
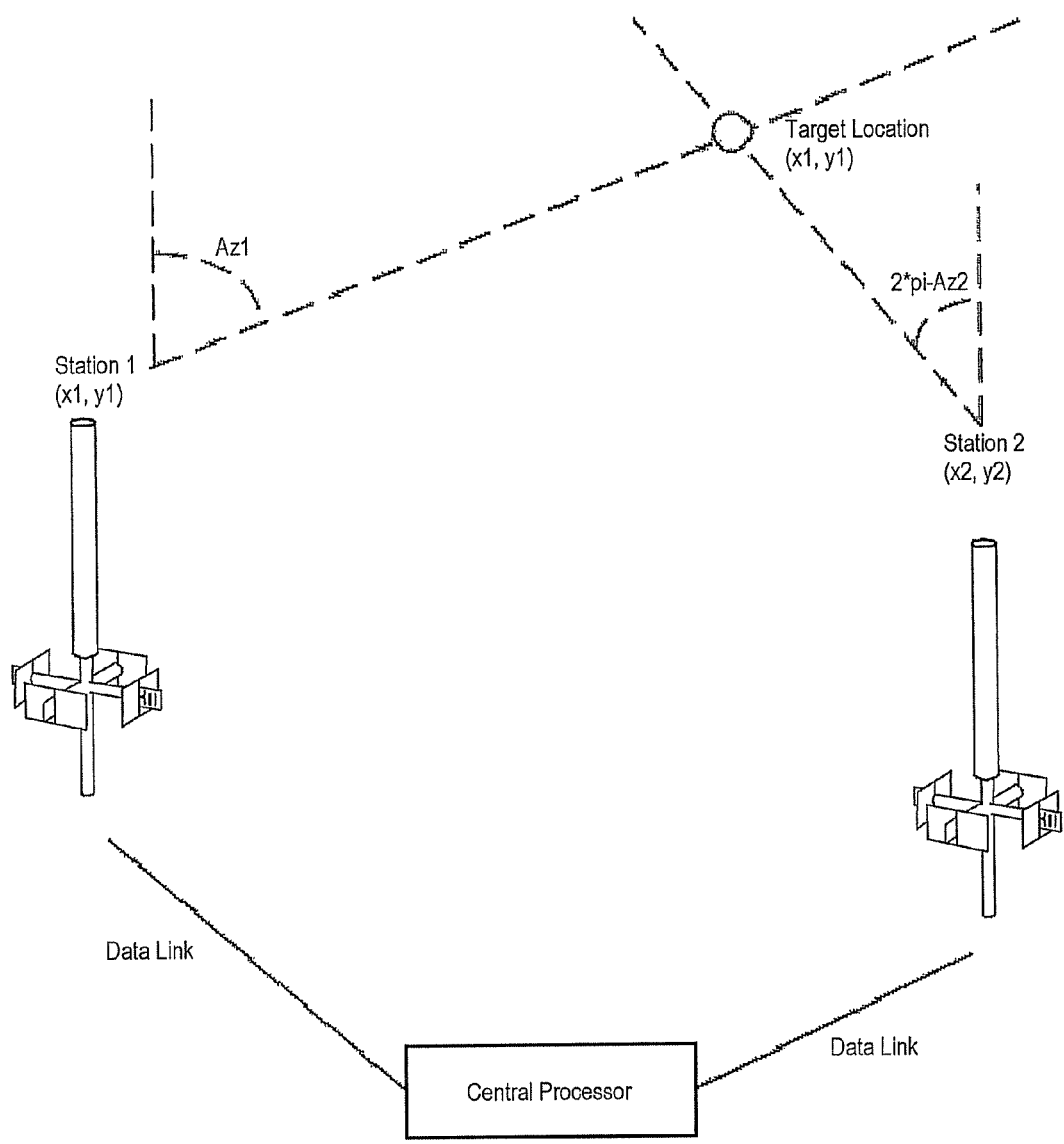
FIG. 4 depicts the geometry of target localization by intersecting lines of azimuth using two single site beacon transceivers.

In some embodiments, the digital RF transceiver 30 also includes at least one output that communicates with an external interface, such as another digital transceiver 30, another beacon transceiver or another computer, such as an FAA control center computer, as shown in FIG. 4. The position of a target transmitting a signal can be determined using more than one single site beacon transceiver, as shown in FIG. 4.

The present invention also provides a method of estimating an azimuth angle to targets using a single site compact beacon transceiver. In one embodiment, shown in FIG. 5, the method comprises receiving signals at a plurality of directional receiving antennas simultaneously or nearly simultaneously, and processing the received signals in a digital RF transceiver 30 by downconverting the received signals to an intermediate frequency (IF), digitizing the downconverted IF signals and calculating the complex envelope of the downconverted IF signal using a Hilbert Transform. The method further comprises determining which two of the plurality of directional receiving antennas received the highest amplitude signal, determining an interferometric baseline between the two of the plurality of directional receiving antennas, and downconverting, digitizing and transforming the signal at each of the two of the plurality of directional receiving antennas into a numerical representation of the signal. The method further comprises calculating a numerical representation of a complex envelope from the numerical representation of the signal for each of the two of the plurality of directional receiving antennas, calculating an amplitude monopulse ratio for the signal, calculating a coarse signal azimuth angle for the signal by converting the signal amplitude monopulse ratio to an azimuth angle relative to the interferometric baseline, calculating an interferometric phase difference for the signal relative to the interferometric baseline, estimating an interferometric azimuth deviation from the calculated coarse signal azimuth angle, and determining a final signal azimuth angle for the signal using the calculated coarse signal azimuth angle and the estimated interferometric azimuth deviation.

Figure 5:
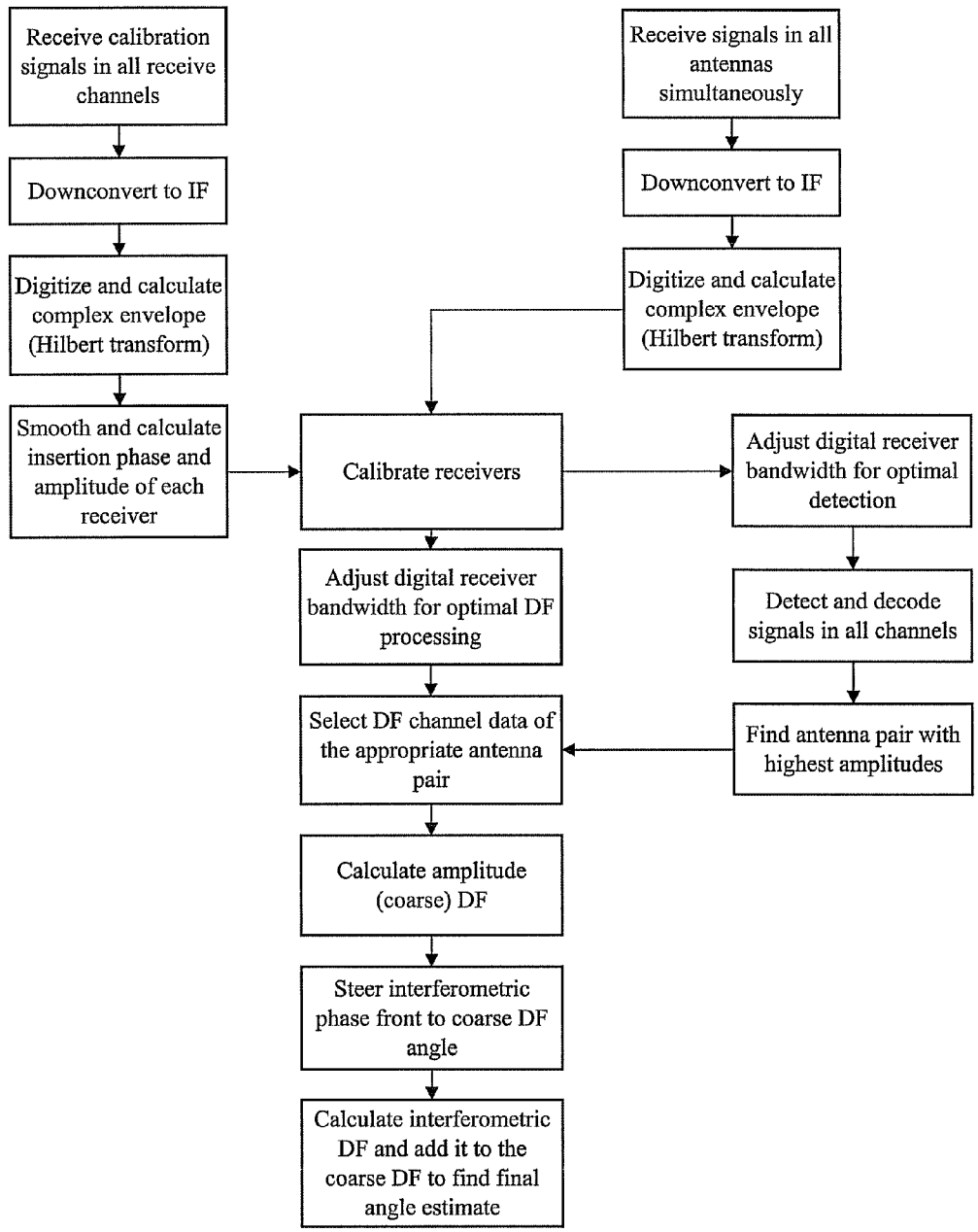
FIG. 5 shows one embodiment of the method of the present invention.

In this embodiment, the method further comprises calibrating the plurality of digital signal receiver channels 23 periodically before estimating the angle of arrival of the signal by injecting a calibration signal into each of the digital signal receiver channels 23 downconverting the calibration signal to an intermediate frequency (IF), digitizing the downconverted IF signal and calculating a numerical representation of a complex envelope of the downconverted IF signal using a Hilbert Transform. The calibration method further comprises calculating an insertion phase difference and an insertion amplitude difference between the plurality of receiver channels using the numerical representation of a complex envelope of the downconverted IF signal, associating each antenna of the plurality of antennas with one of the plurality of digital signal receiver channels 23, combining the insertion amplitude difference and the insertion phase difference calculated for each of the digital signal receiver channels 23 with a stored insertion amplitude difference and a stored insertion phase difference for the antenna associated with the digital signal receiver channel; storing the insertion amplitude difference and the insertion phase difference for each digital signal receiver channel and the antenna associated with each of the digital signal receiver channels 23, and then removing the insertion amplitude difference and the insertion phase difference of the digital signal receiver channel and the antenna associated with the digital signal receiver channel from the received signal before estimating the azimuth. The method can also include adjusting the bandwidth of digital RF transceiver 30 to optimize detection of signals in a specific frequency bandwidth, as shown in FIG. 5. For example, the bandwidth of digital RF transceiver 30 is optimized for detection of signals near 1090 MHz.

In the following sections, some of the signal processing used for determining the coarse signal azimuth angle and the final azimuth angle for the received signal are discussed in greater detail.

Signal Processing

As discussed above, in some embodiments the at least one processor 22 in digital RF transceiver 30 estimates a coarse signal azimuth for the signal by calculating an amplitude monopulse ratio for the signal using two of the plurality of directional receiving antennas receiving the highest amplitude signal, and estimates a final signal azimuth for the signal using an interferometer baseline between the two directional receiving antennas receiving the highest amplitude signal.

Figure 6:
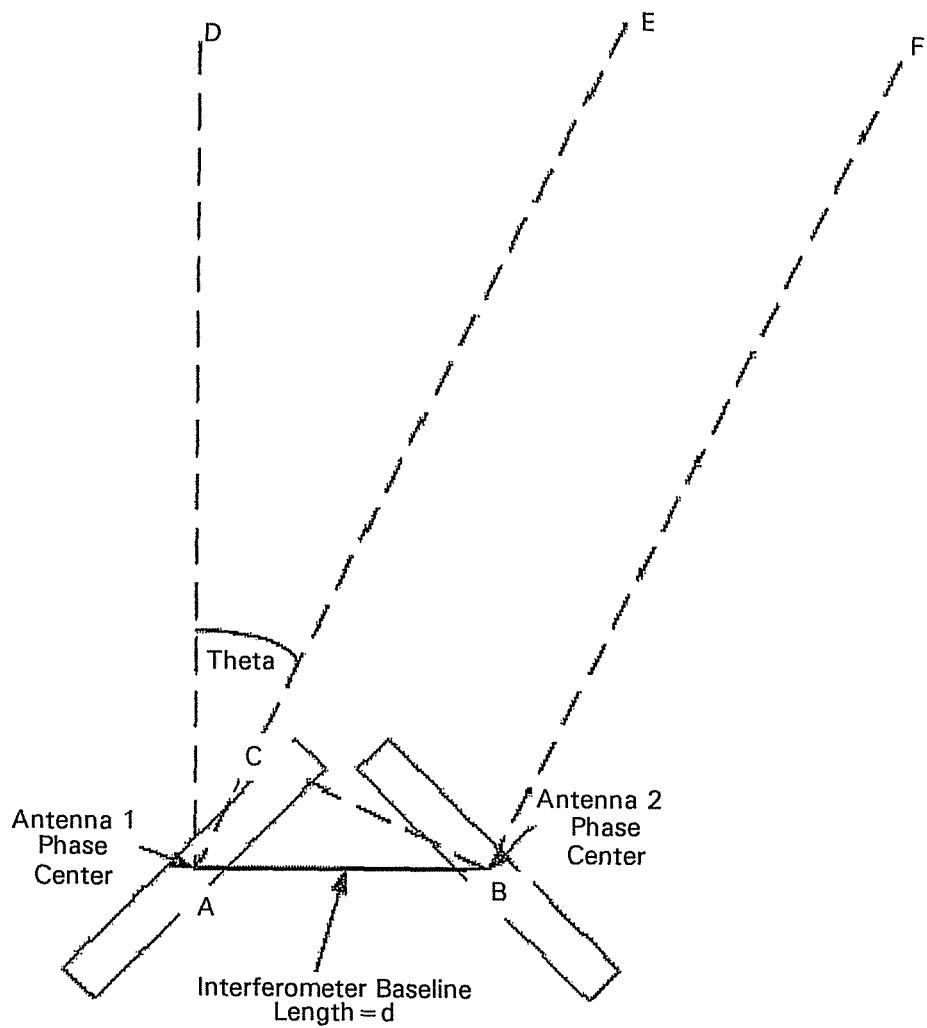
FIG. 6 depicts the geometry of two adjacent directional receiving antennas relative to the signal transmitted from a target.

When the signal processing identifies the target as a valid target, the data from the two antennas receiving the highest amplitude signal is selected for azimuth processing. The signal wave equation for the received signal in antenna 1, shown in FIG. 6 is:

$$V1 = A1(\text{theta}) \cdot \cos\left[2 \cdot \text{pi} \cdot f \cdot t + \frac{2 \cdot \text{pi} \cdot d \cdot f \cdot \sin(\text{theta})}{c}\right] \quad \text{(equation \#1)}$$

and the signal wave equation for the received signal in antenna 2 is:

$$V2 = A2(\text{theta}) \cdot \cos[2 \cdot \text{pi} \cdot f \cdot t] \quad \text{(equation \#2)}$$

Where:
V1 is the signal amplitude in antenna 1;
V2 is the signal amplitude in antenna 2;
A1 is the peak amplitude of the signal in antenna 1;
A2 is the peak amplitude of signal in antenna 2;
theta is the angle between target direction and the normal to interferometer baseline;
f is the RF frequency of received signal;
t is time;
d is the distance between antennas phase centers;
c is the speed of light;
pi is 3.1415926

Coarse Azimuth Estimation

In some embodiments, the received signals are first processed for coarse azimuth estimate (amplitude monopulse). In some embodiments, the signal is downconverted to an intermediate frequency and digitized prior to being transformed into a numerical representation of the signal. In other embodiments, the signals are downconverted to IF and then to baseband in the digital transceiver 30. The relative phase between the two signals depends on the path difference of the wave between the two channels, which is a direct result of the geometry shown in FIG. 5.

In these embodiments, the received signals or downconverted received signals are then converted to a numerical representation of their complex envelope using a Hilbert Transform performed in the digital transceiver 30 as shown in the following equation:

$$VC1 = A1(\text{theta}) \cdot \exp\left\{j \cdot \left[2 \cdot \text{pi} \cdot f0 \cdot t + \frac{2 \cdot \text{pi} \cdot d \cdot f \cdot \sin(\text{theta})}{c}\right]\right\} \quad \text{(equation \#3)}$$

And $$VC2 = A2(\text{theta}) \cdot \exp\{j \cdot [2 \cdot \text{pi} \cdot f0 \cdot t]\} \quad \text{(equation \#4)}$$

Where:
VC1 is the complex envelope in antenna 1 after calibration;
VC2 is the complex envelope in antenna 2 after calibration; and
f0 is the IF frequency. If the signals are at baseband f0=0.

It should be noted that equations 3 and 4 represent a mathematical model of the ideal signal and are presented here to more clearly explain the system and method of the present invention. Complex numbers VC1 and VC2 are actually the complex envelope output from the antenna of the actual received signal. The calibration of the antennas is discussed later in this disclosure.

In some embodiments, the signals are processed for amplitude monopulse (coarse azimuth) using the following equation:

$$\text{amp\_monopulse\_ratio} = \frac{\text{abs}(VC1) - \text{abs}(VC2)}{\text{abs}(VC1) + \text{abs}(VC2)} \quad \text{(equation \#5)}$$

Where:
VC1 is the complex envelope in antenna 1 after calibration;
VC2 is the complex envelope in antenna 2 after calibration; and
abs denotes absolute value of the complex envelope of the signal.

Figure 7:
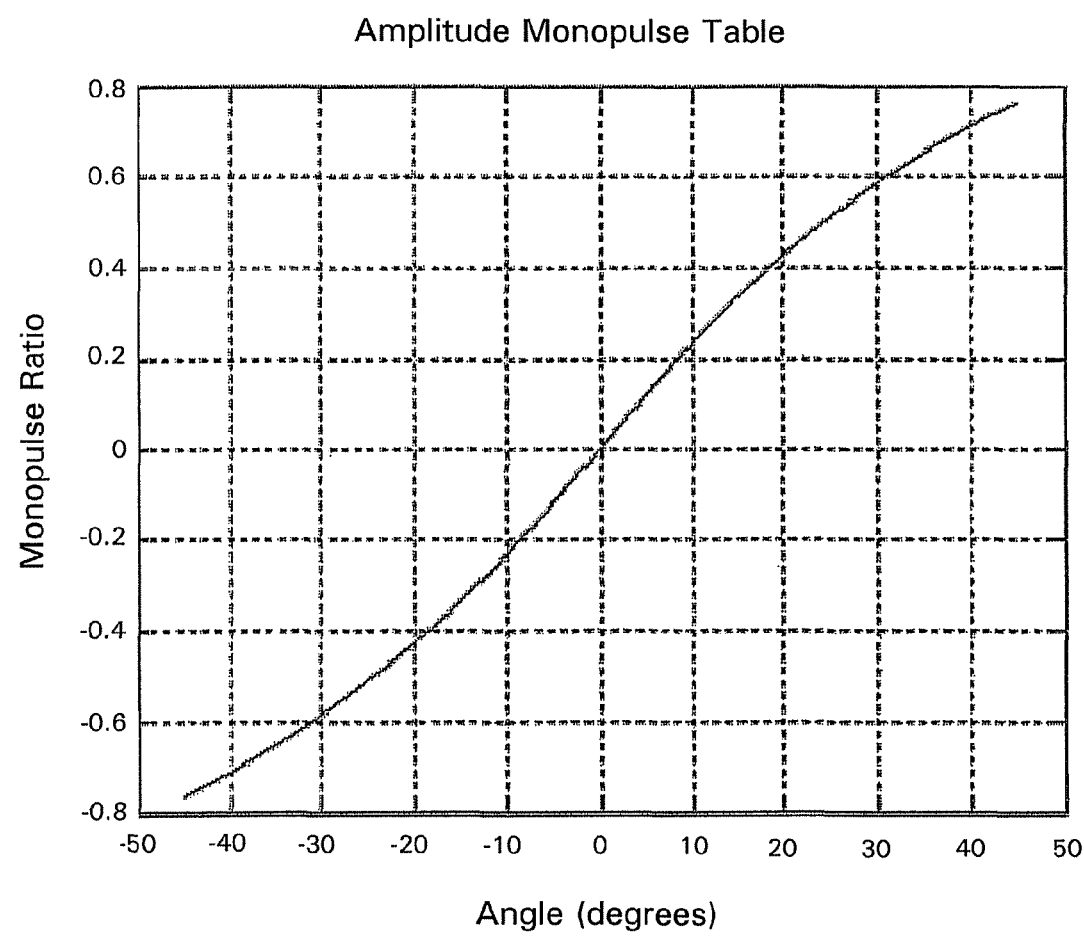
FIG. 7 shows one example of the amplitude monopulse lookup table.

Equation 5 is the amplitude monopulse ratio. One example of values of the amplitude monopulse are shown in FIG. 7, which is the amplitude monopulse table. This is a monotonic function where a specific monopulse ratio is uniquely converted to azimuth angle relative to interferometer boresight. In these embodiments, after the amplitude monopulse ratio is calculated as shown in Equation 5, the amplitude monopulse table is accessed and the target coarse azimuth determined. In this embodiment, the coarse azimuth estimate is non ambiguous over the entire field of view of the two antennas.

In other embodiments, the coarse azimuth (coarse_az) is determined from an amplitude monopulse table using the amplitude monopulse ratio equation, $$\text{amp\_monopulse\_ratio} = \frac{\text{abs}(VC1) - \text{abs}(VC2)}{\text{abs}(VC1) + \text{abs}(VC2)} \quad \text{(equation \#6)}$$

where:
abs denotes the absolute value of the complex envelope of the signal;
VC1 is the complex envelope in one of the two of the plurality of directional receiving antennas after calibration; and
VC2 is the complex envelope in the other of the two of the plurality of directional receiving antennas after calibration.
This is a monotonic function where a specific monopulse ratio is uniquely converted to azimuth angle relative to interferometer boresight. In these embodiments, after the amplitude monopulse ratio is calculated as shown in Equation 5, the amplitude monopulse table is accessed and the target coarse azimuth determined. In this embodiment, the coarse azimuth estimate is non ambiguous over the entire field of view of the two antennas.

In other embodiments, the coarse azimuth (coarse_az) is determined from an amplitude monopulse table using the amplitude monopulse ratio equation, $$(b) \ \text{amp\_monopuluse\_ratio} = \frac{\text{abs}(VC1)}{\text{abs}(VC2)} \quad \text{(equation \#7)}$$

where:
abs denotes the absolute value of the complex envelope of the signal;
VC1 is the complex envelope in one of the two of the plurality of directional receiving antennas after calibration; and
VC2 is the complex envelope in the other of the two of the plurality of directional receiving antennas after calibration.
This is a monotonic function where a specific monopulse ratio is uniquely converted to azimuth angle relative to interferometer boresight. In these embodiments, after the amplitude monopulse ratio is calculated as shown in Equation 5, the amplitude monopulse table is accessed and the target coarse azimuth determined. In this embodiment, the coarse azimuth estimate is non ambiguous over the entire field of view of the two antennas.

In other embodiments, the coarse azimuth (coarse_az) is determined from an amplitude monopulse table using the amplitude monopulse ratio equation, $$(b) \ \text{amp\_monopulse\_ratio} = \log\left[\frac{\text{abs}(VC1)}{\text{abs}(VC2)}\right] \quad \text{(equation \#8)}$$

where:
abs denotes the absolute value of the complex envelope of the signal;
VC1 is the complex envelope in one of the two of the plurality of directional receiving antennas after calibration; and
VC2 is the complex envelope in the other of the two of the plurality of directional receiving antennas after calibration.
This is a monotonic function where a specific monopulse ratio is uniquely converted to azimuth angle relative to interferometer boresight. In these embodiments, after the amplitude monopulse ratio is calculated as shown in Equation 5, the amplitude monopulse table is accessed and the target coarse azimuth determined. In this embodiment, the coarse azimuth estimate is non ambiguous over the entire field of view of the two antennas.

Calibration

Figure 8:
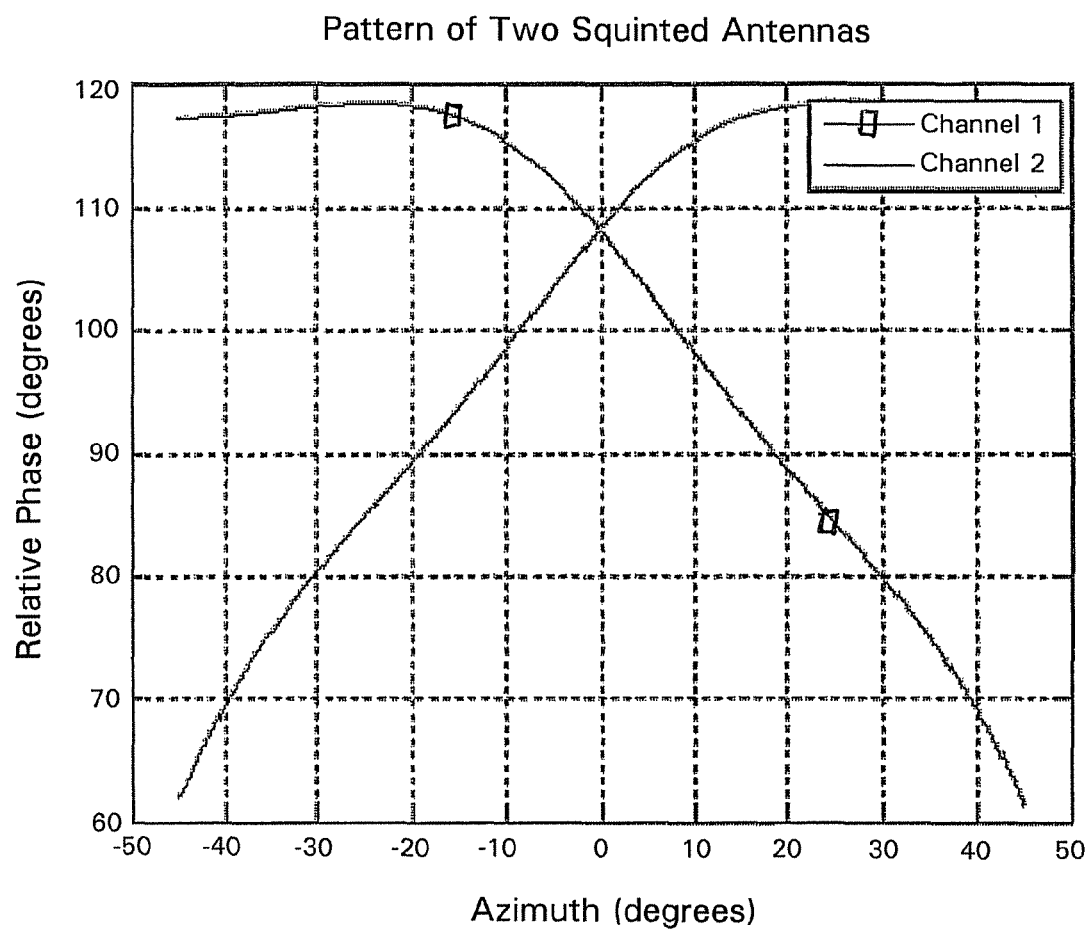
FIG. 8 shows one example of the insertion phase of two overlapping antennas.

VC1 and VC2, which are described in equations 3 and 4, are the mathematical models of the ideal signals. However, in reality each of the receiver channels has some insertion phase and amplitude differences, which will vary as a function of manufacturing tolerances and thermal drift, that are added to the received signals. In addition, the antennas have additional insertion phase, which is a function of azimuth. FIG. 8 shows one example of a typical insertion phase of two antenna squinted (i.e., angled) at 90 degrees with respect to each other. As can be seen in FIG. 8, the insertion phase is azimuth dependent and is added to the received signal as it passes through the antennas. As a result, the interferometric phase difference between the two antennas receiving the highest amplitude signal is no longer only a function of the angle off interferometer boresight, but also a function of the receiver tolerances and drifts as well as the antennas. Therefore, these undesired insertion phase differences need to be removed before performing the interferometric azimuth angle of arrival calculations.

Figure 9:
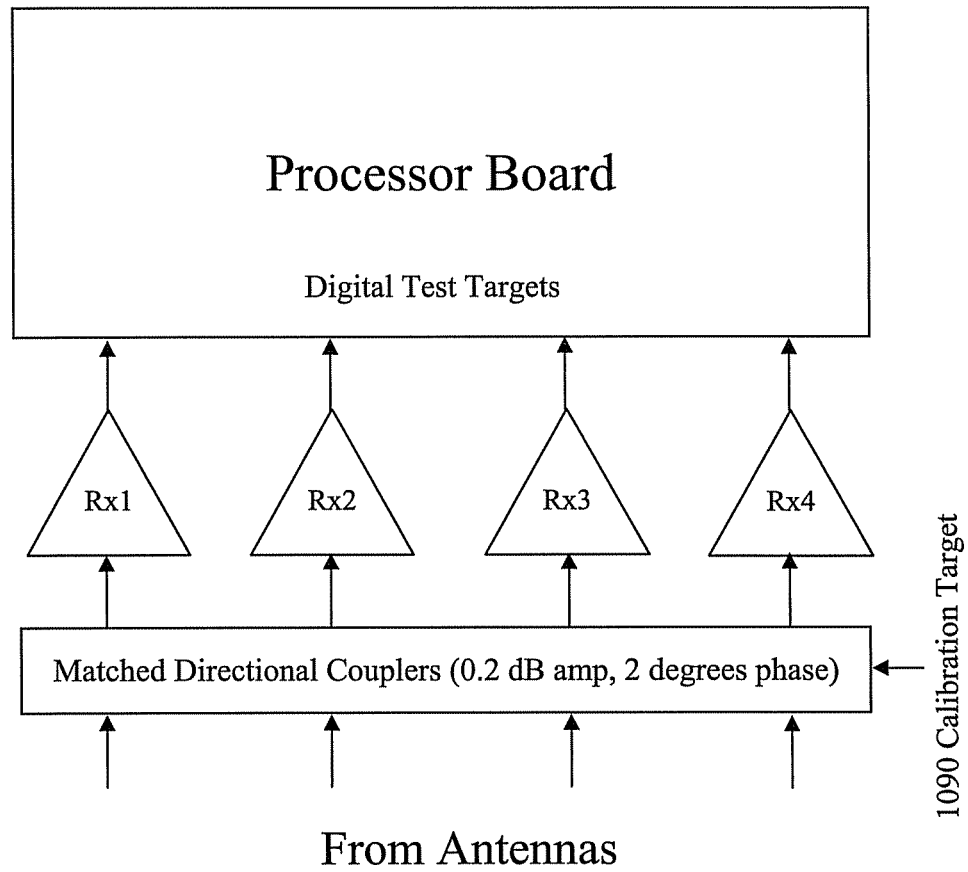
FIG. 9 depicts one method for coupling a test signal for calibration of the present invention.

In some embodiments of the present invention, the plurality of receiver channels is calibrated periodically in digital RF transceiver 30. In these embodiments, the calibration of the plurality of receiver channels of the single site beacon transceiver comprises the steps of receiving a calibration signal at each of the plurality of receiver channels, downconverting the calibration signal to an intermediate frequency, digitizing the downconverted calibration signal, transforming the calibration signal into a numerical representation of a complex envelope of the calibration signal using a Hilbert Transform and calculating an insertion phase difference and an insertion amplitude difference between the plurality of receiver channels, associating each antenna of the plurality of antennas with one of the plurality of receiver channels, combining the insertion amplitude difference and the insertion phase difference calculated for each receiver channel with a stored insertion amplitude difference and a stored insertion phase difference for the antenna associated with the receiver channel; storing the insertion amplitude difference and the insertion phase difference for each receiver channel and the antenna associated with the receiver channel, and then removing the insertion amplitude difference and the insertion phase difference of the receiver channel and the antenna associated with the receiver channel from the signal before estimating the azimuth. In other embodiments, the method of the present invention calibrates each of the plurality of receiver channels by periodically injecting a calibration signal through a directional coupler to determine a calibration coefficient for each of the plurality of receiver channels, storing the calibration coefficient for each of the plurality of receiver channels, and removing the calibration coefficient from the signal before estimating a coarse signal azimuth FIG. 9 shows one example of the calibration circuitry to remove the receiver insertion phase. In this example, a 1090 MHz calibration pulse is injected into all of the digital signal receiver channels through a coupler with tight amplitude and phase matching, as shown in FIG. 9. In this example, the tolerance numbers shown here are typical of a system designed for 0.2 degrees rms azimuth accuracy. In other embodiments, the tolerances vary as a function of the accuracy requirements.

As previously described, VC1 and VC2 are the mathematical model of the complex envelope of the received signal after calibration of the antennas and digital signal receiver channels. In some embodiments, the undesired insertion phases are removed by the following method.

The complex envelope of the received signal at the two antennas receiving the highest amplitude signals is calculated using the following equations:

$$VC1\_P = \frac{VR1}{VPP1} \quad \text{(equation \#9)}$$

and $$VC2\_P = \frac{VR2}{VPP2} \quad \text{(equation \#10)}$$

Where:
VC1_P is the complex envelope of antenna 1 after receiver calibration;
VC2_P is the complex envelope of antenna 2 after receiver calibration;
VR1 is the complex envelope actually received in antenna 1 before calibration;
VR2 is the complex envelope actually received in antenna 2 before calibration;
VPP1 is the complex envelope of the calibration signal in receiver 1; and
VPP2 is the complex envelope of the calibration signal in receiver 2.
VPP1 and VPP2 include the insertion amplitude and phase of the digital signal receiver channels, plus a small residual error resulting from the manufacturing tolerance of the calibration coupler. By dividing the two complex numbers for the complex envelope for the actual received signal and the complex envelope of the calibration signal in the respective antennas, the insertion amplitude and phase associated with the respective receiver channels are removed.

After the coarse azimuth is calculated, the insertion phase of the antennas must also be removed before performing the interferometer calculations.

The radiation patterns of the antennas are measured and the amplitude and phase are stored in tables in the signal processor. FIG. 2 shows one example of the amplitude of the two antennas and FIG. 8 shows one example of the phase of the two antennas, each relative to its own phase center. The measured amplitudes are used to generate the amplitude monopulse table shown in FIG. 7. The insertion phase of each antenna is stored in a table and used in the following equations:

$$VC1 = VC1\_P \cdot \exp[-j \cdot PHI1] \quad \text{(equation \#11)}$$

$$VC2 = VC2\_P \cdot \exp[-j \cdot PHI2] \quad \text{(equation \#12)}$$

Figure 10:
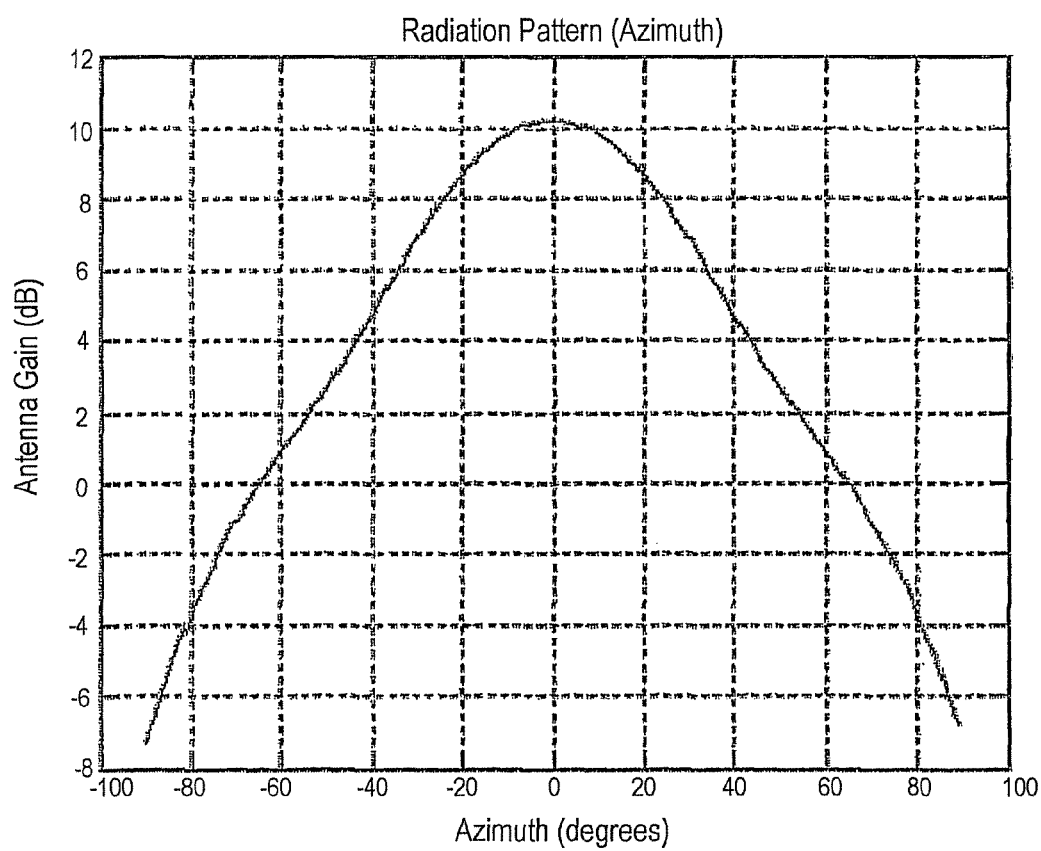
FIG. 10 depicts one example of a radiation pattern of one of the directional receiving antennas.

VC1 and VC2 are the complex envelopes in the two respective directional receiving antennas after calibration as defined in FIG. 10.
PHI1 is the insertion phase of antenna 1 at the coarse azimuth that was calculated
PHI2 is the insertion phase of antenna 2 at the coarse azimuth that was calculated.

For example, referring to FIG. 8, if the coarse azimuth is 10 degrees then PHI1 is 97 degrees and PHI2 is 115 degrees. Once these steps are performed final azimuth can be calculated.

Figure 11:
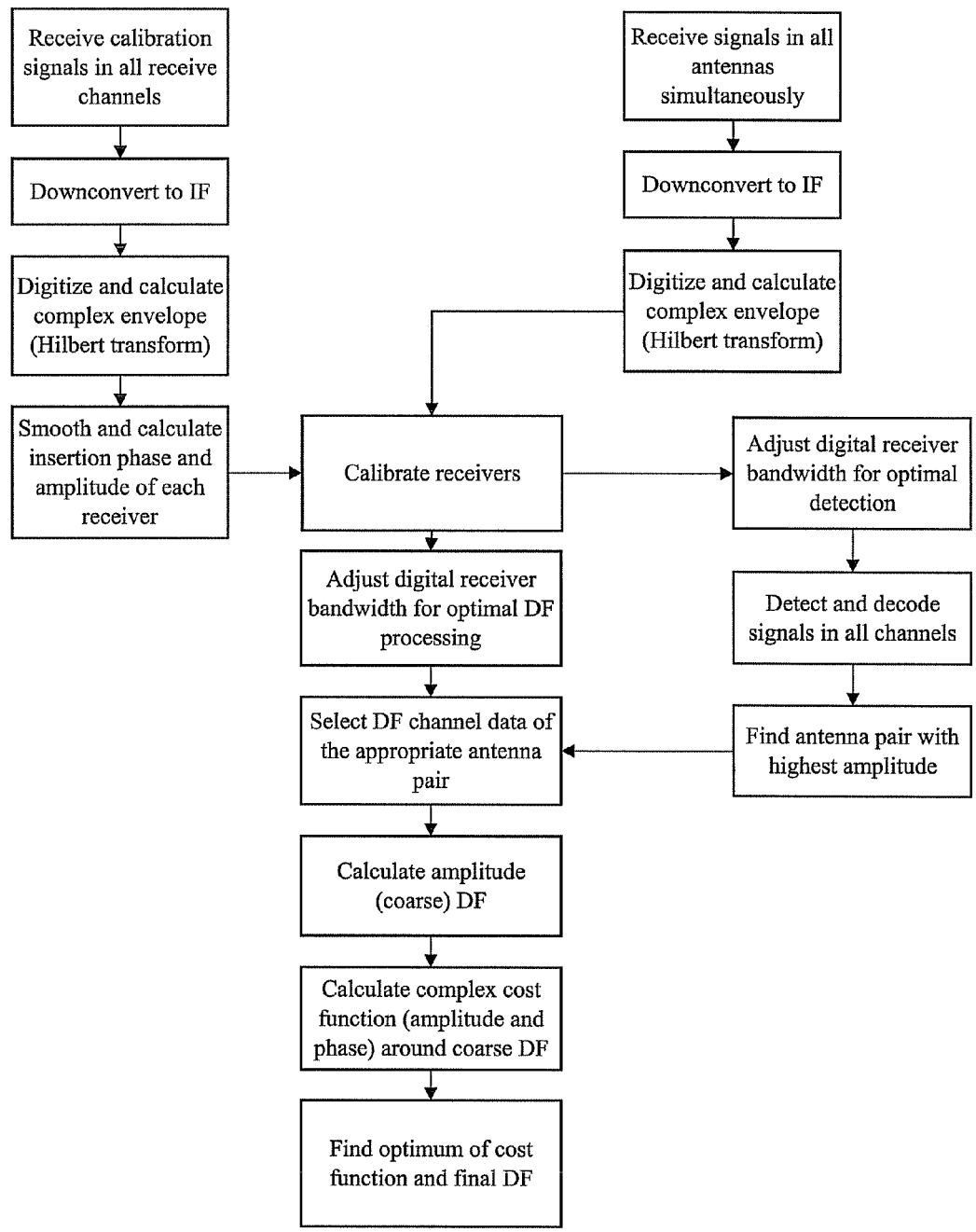
FIG. 11 shows one embodiment of the method of the present invention including a complex cost function that is calculated in a narrow arc around the coarse DF.
Figure 12:
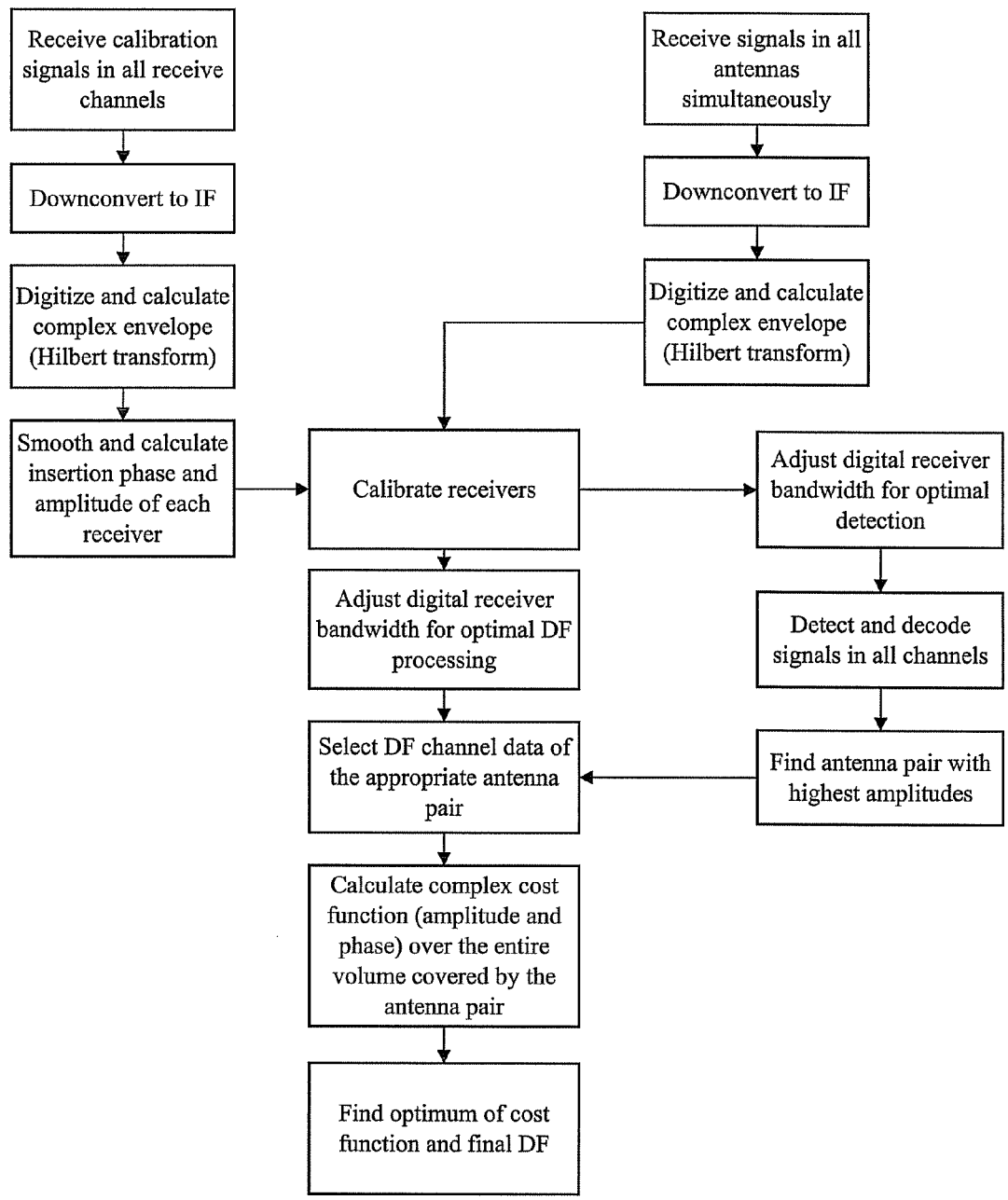
FIG. 12 shows one embodiment of the method of the present invention including a complex cost function calculated over the coverage volume of an antenna pair.

In some embodiments of the method of the present invention, a complex COST function positioned around the coarse signal azimuth angle determined for the signal is used to calculate a final signal azimuth angle for the received signal, as shown in FIG. 11. In other embodiments, the method of the present invention uses a complex COST function over the entire volume of space covered by the selected antenna pair to calculate a final signal azimuth angle for the received signal, as shown in FIG. 12. The COST functions are discussed in greater detail later in this specification.

In some embodiments, the calibration pulses are downconverted, digitized and converted to complex signals just as previously described for the received signal. These complex numbers include the receiver measured amplitude and phase and are stored in the system. In some embodiments, the calibration signals are stored and averaged for enhanced calibration accuracy.

Final Azimuth Estimation

In some embodiments, the final signal azimuth is estimated using the interferometer baseline between the two antennas receiving the highest amplitude signals. Since the distance between antennas phase centers, d, is in the order of several wavelengths, the signal path difference can also be a few wavelengths resulting in phase differences in multiples of 2*pi. This results in potential ambiguity in the final azimuth determination.

In some embodiments, to resolve this potential ambiguity and find the correct azimuth the following steps are performed:

First, the interferometer boresight is electronically steered to the coarse azimuth using the following equation:

$$VC11 = VC1 \cdot \exp\left[-j \cdot \frac{2 \cdot pi \cdot f}{c} \cdot d \cdot \sin(\text{course\_az})\right] \quad \text{(equation \#13)}$$

Where:
VC11 is the corrected complex envelope of antenna 1 after steering;
VC1 is defined in equation 3; and
coarse_az is the coarse azimuth (relative to the normal to the interferometer baseline) calculated by the amplitude monopulse (radians).

Next, the interferometric phase difference is calculated as follows:

$$\text{del\_phi} = \text{angle}\left[\frac{VC2 \cdot \text{conjugate}(VC11)}{\text{abs}(VC2) \cdot \text{abs}(VC11)}\right] \quad \text{(equation \#14)}$$

Where:
del_phi is the phase difference between the interferometer antennas;
angle is the mathematical operation of finding the angle of a complex number;
conjugate is the mathematical operation of converting a complex number to its complex conjugate; and
abs is the mathematical operation of finding the absolute value of a complex number.

Next, the interferometric azimuth deviation from the coarse angle is calculated as follows:

$$\text{del\_sin\_azimuth} = \left[\frac{\text{del\_phi} \cdot c}{2 \cdot pi \cdot f \cdot d}\right] \quad \text{(equation \#15)}$$

Where:
del_phi is defined in equation 14;
arcsin is the inverse operation of sine; and
del_sin_azimuth is the difference between coarse azimuth and final azimuth estimate in sine space.

Then, the final azimuth estimate is calculated as follows:

$$\text{final\_azimuth} = \arcsin[\sin(\text{coarse\_az}) + \text{del\_sin\_azimuth}] \quad \text{(equation \#16)}$$

Where:
final_azimuth is the final azimuth estimation;
arcsin is the mathematical inverse of sine function; and
del_sin_azimuth is defined in equation 15.

In other embodiments, the digital transceiver 30 estimates the final signal azimuth using the equation:

$$\text{final\_azimuth} = \arcsin\left[\sin(\text{coarse\_az}) + \left[\frac{\text{del\_phi} \cdot c}{2 \cdot pi \cdot f \cdot d}\right]\right] \quad \text{(equation \#17)}$$

Where:
del_phi is the phase difference between the two of the plurality of directional receiving antennas;
c is the speed of light;
f is the RF frequency of received signal;
d is distance between phase centers of the two of the plurality of directional receiving antennas, and
coarse_az is the coarse signal azimuth relative to the normal to the interferometer baseline.

In other embodiments, the angle of arrival of the received signal is determined using an angle of arrival estimation algorithm information of the full complex envelope. As in the first embodiment, the received signal is down converted, digitized and Hilbert transformed to a mathematical expression of the complex envelope of the received signal shown in FIG. 12.

In one embodiment, the following COST equation is used to estimate the final angle of arrival of the received signal:

$$\text{COST} = \left|\frac{\text{VC1\_received}}{\text{VC2\_received}} - \frac{\text{VC1\_model(theta)}}{\text{VC2\_model(theta)}}\right|^2 \quad \text{(equation \#18)}$$

Where:
VC1_received is the complex envelope of the received signal in receiver 1;
VC2_received is the complex envelope of the received signal in receiver 2;
VC1_model(theta) is the model of the complex received signal as a function of azimuth theta (VC1_model is described in equation 3);
VC2_model(theta) is the model of the complex received signal as a function of azimuth theta (VC2_model is described in equation 4); and
Theta is the angle between target direction and the normal to interferometer baseline.

Figure 13:
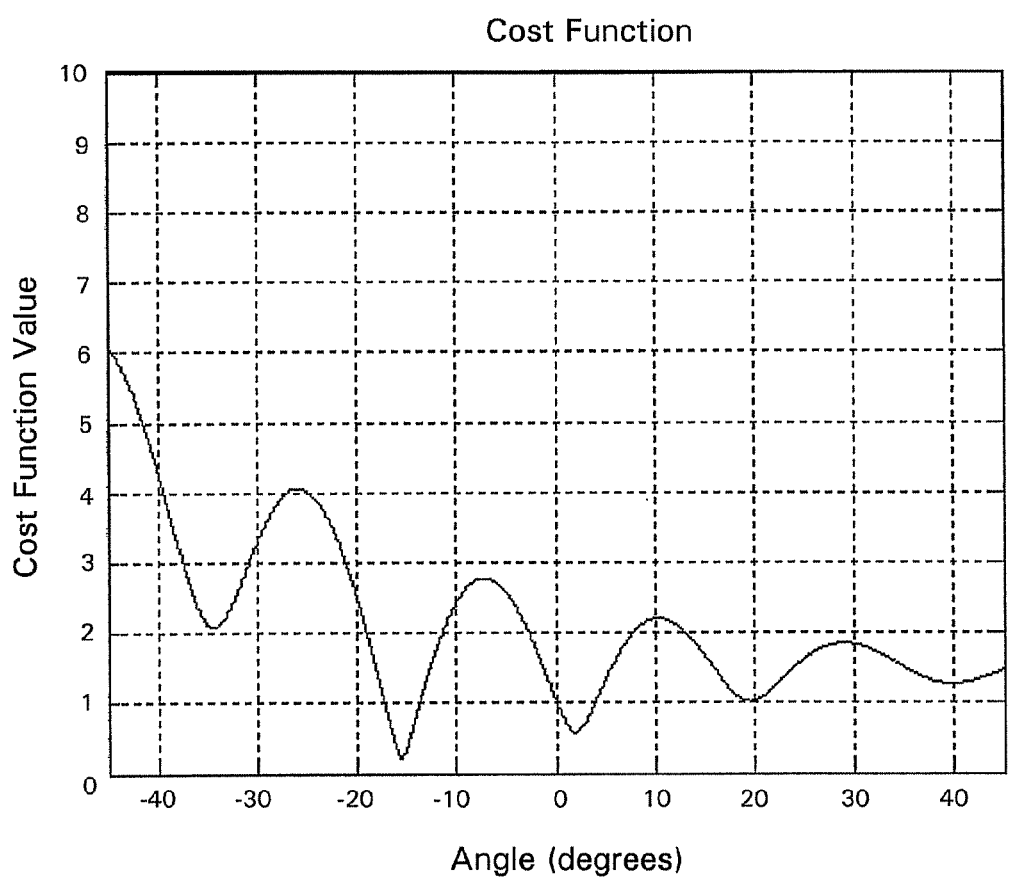
FIG. 13 shows one example of a cost function for the complex ratio estimation method of the present invention.

In this embodiment, the angle theta in the model includes the full span of +/−45 degrees relative to interferometer baseline covered by the two antennas receiving the highest amplitude signal. FIG. 13 shows an example of a typical cost function calculated for the entire +/−45 degrees according to equation 18. In the example shown in FIG. 13, the final angle of arrival of the received signal was determined to be coming from −15.5 degrees relative to interferometer baseline by the COST function. As shown in FIG. 13, although the cost function has local minima (e.g., +3 degrees), the COST function has a clear global minimum at the true angle of arrival of −15.5 degrees relative to interferometer baseline.

It should be noted that this particular cost function was calculated with fine steps in order to achieve the desired accuracy. This cost function is not the most computationally efficient method and it is shown to fully explain the system and method of the present invention. However, any known method for global minimum search can be used here for increased computational efficiency without deviating from the spirit of this disclosure.

Figure 14:
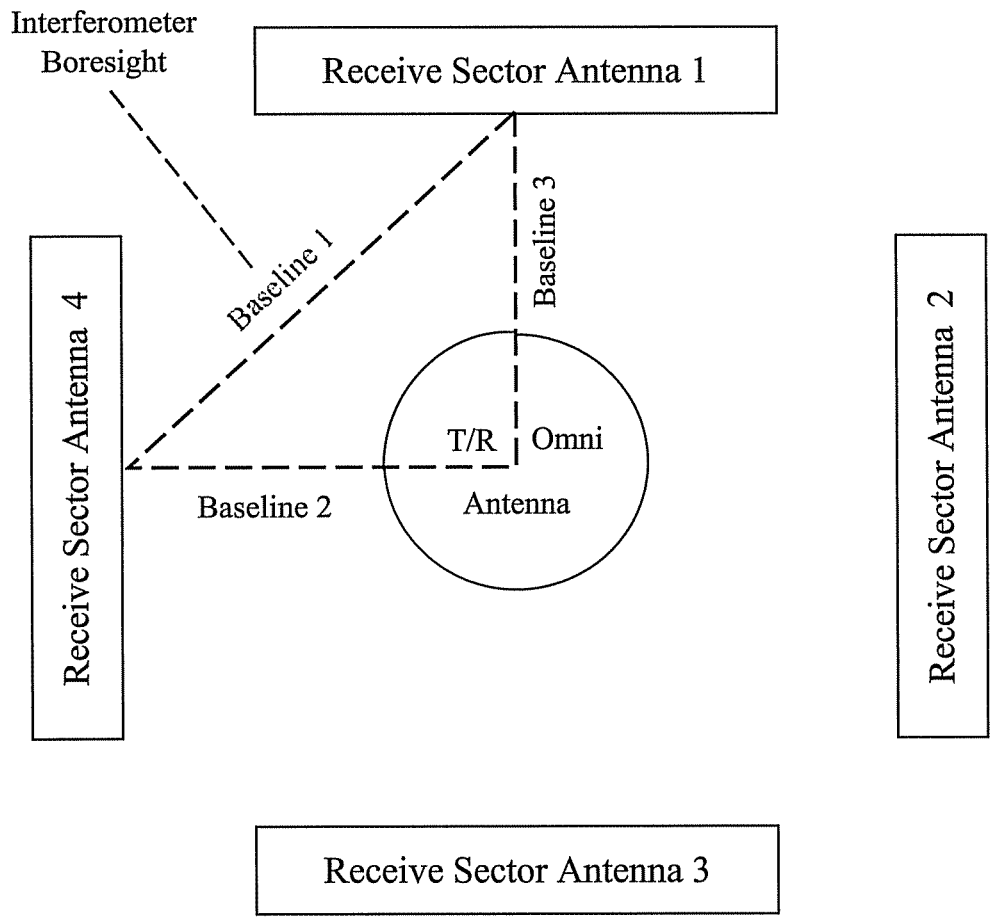
FIG. 14 depicts the first embodiment of the single site beacon transceiver showing the additional baselines for ambiguity resolution.

In other embodiments, the processing of the signal uses two interferometer baselines, such as shown in FIG. 14, in the following equation to determine an azimuth angle with respect to an interferometer baseline:

$$\text{COST} = W1 \cdot \left|\frac{\text{VC1\_received}}{\text{VC2\_received}} - \frac{\text{VC1\_model(theta)}}{\text{VC2\_model(theta)}}\right|^2 +$$
$$W2 \cdot \left|\frac{\text{VC1\_received}}{\text{VC3\_received}} - \frac{\text{VC1\_model(theta)}}{\text{VC3\_model(theta)}}\right|^2 +$$
$$W3 \cdot \left|\frac{\text{VC2\_received}}{\text{VC3\_received}} - \frac{\text{VC2\_model(theta)}}{\text{VC3\_model(theta)}}\right|^2$$

Where:
W1, W2 and W3 are adaptive weighting values that are optimized according to estimation theory to mitigate multipath,
VC1_received is the complex envelope of the received signal; after calibration at one of the two of the plurality of directional receiving antennas;
VC2_received is the complex envelope of the received signal after calibration at the other of the two of the plurality of directional;
VC3_received is the complex envelope of the received signal after calibration at the omni-directional antenna relative to the signal at the other of the two of the plurality of directional receiving antennas;
VC1_model(theta) is the model of the complex envelope of the received signal as a function of azimuth theta at one of the two of the plurality of the two directional receiving antennas;
VC2_model(theta) is the model of the complex envelope of the received signal as a function of azimuth theta at the other of the two of the plurality of the two directional receiving antennas; and
VC3_model(theta) is the model of the complex envelope of the received signal as a function of azimuth theta at the omni-directional antenna relative to the signal at the other of the two of the plurality of directional receiving antennas.

The azimuth angle corresponds to a minimum COST. As can be seen in FIG. 14, by having a transceiver located at a central position with respect to the four directional receiving antennas in the antenna configuration of FIG. 1, two additional baselines are included in the single site beacon transceiver of the present invention. Further, the baselines vary in length, with baselines 2 and 3 being shorter than baseline 1, as shown in FIG. 14.

Multipath Mitigation

Figure 15:
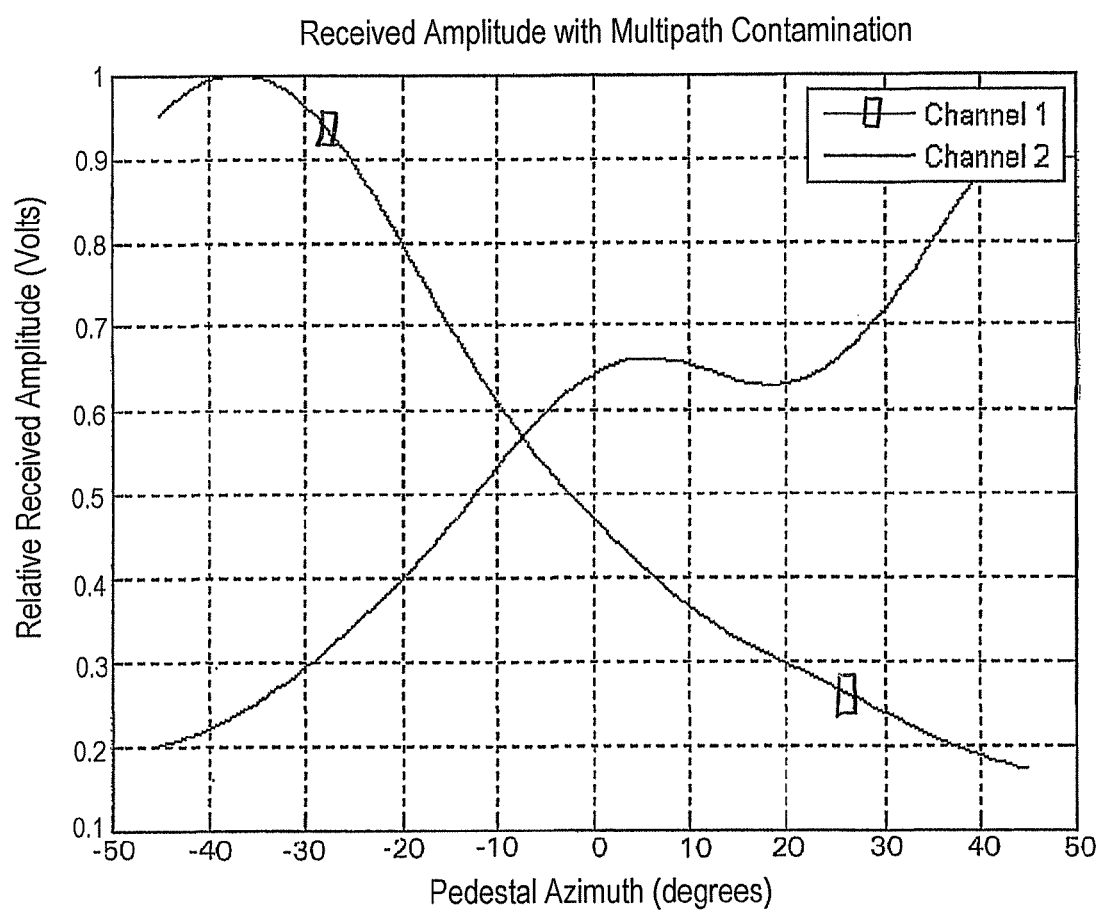
FIG. 15 depicts one example of the amplitude of the received signals under multipath conditions.

In some embodiments, particularly when indirect reflections (i.e., multipath) from other objects mix with the transmitted signal coming directly from the target, the estimated angle may not achieve the desired accuracy. This condition is known as multipath and, in extreme cases, the distortion of the received signal is so severe that the interferometric ambiguity can no longer be correctly solved. FIG. 15 depicts an example of received signals under multipath conditions. The difference between the received signals under conditions free of indirect reflections, shown in FIG. 2, and the received signals under multipath conditions is shown in FIG. 15 is sufficient to adversely impact solving the interferometric ambiguity.

Figure 16:
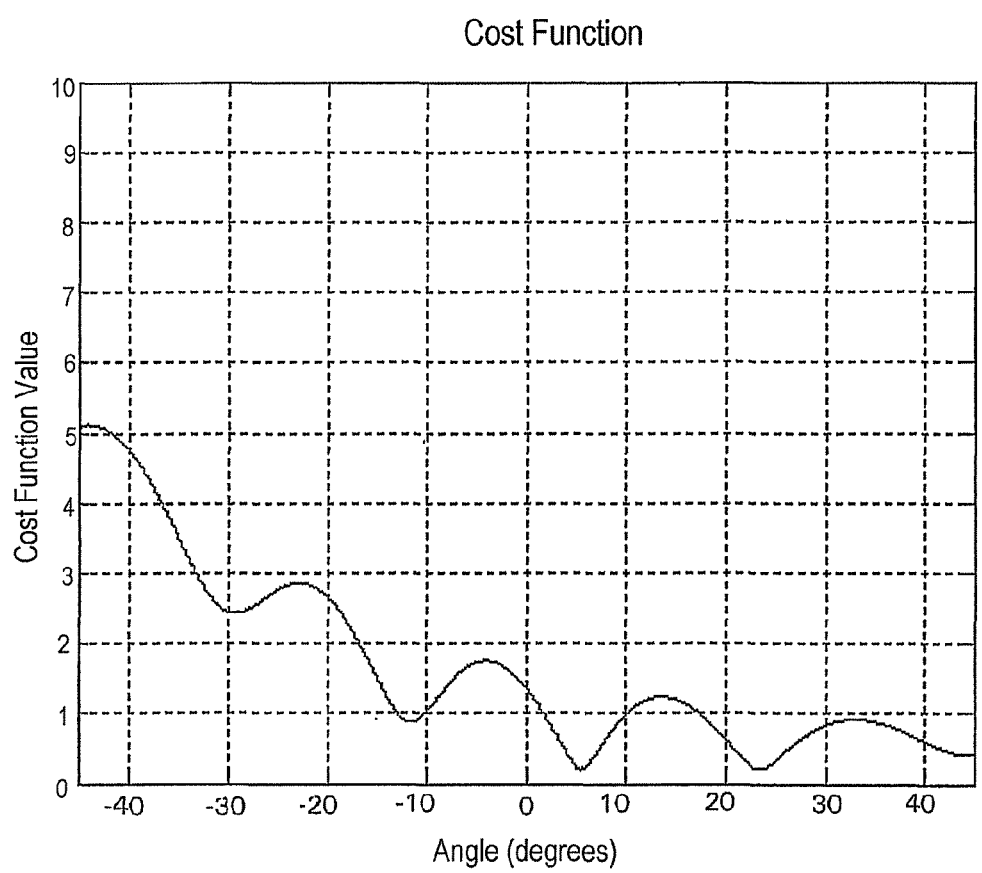
FIG. 16 depicts one example of a cost function for the received signals under multipath conditions in FIG. 15.

FIG. 16 shows the cost function for the received signals of FIG. 15. As can be seen in FIG. 16, minima defining the correct angle are not clearly defined and, therefore, relatively large estimation errors can occur in this particular case. Here, the combination of amplitude and phase ratio is no longer sufficient to resolve the interferometric ambiguity.

Figure 17:
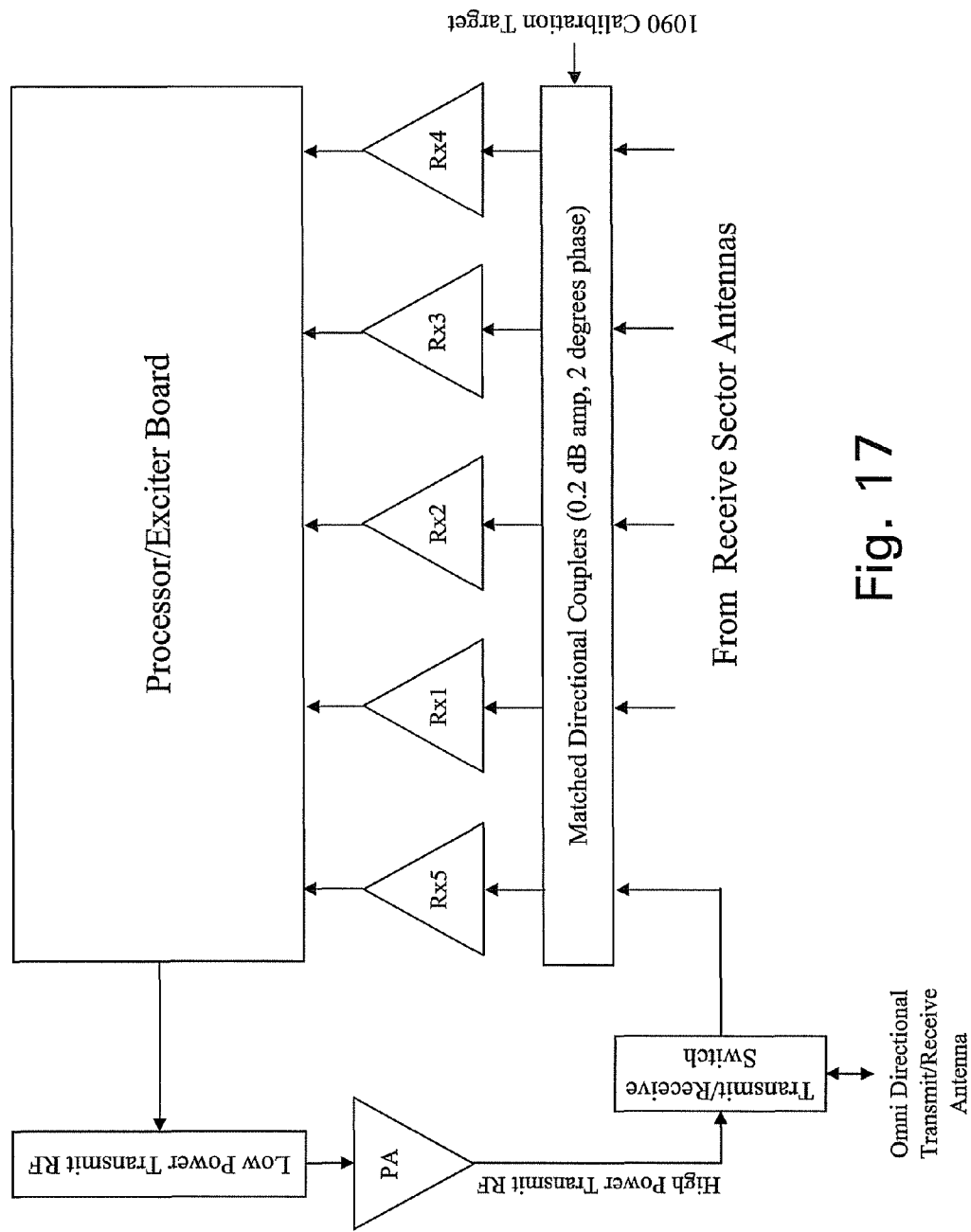
FIG. 17 shows one example of the beacon transceiver interconnection diagram antenna for the first embodiment of the present invention.

To resolve this ambiguity, existing methods require additional antennas and receivers to be positioned at different physical locations to add additional baselines. However, the system and method of the present invention resolves this ambiguity by adding a receiver/transceiver in a central position in the single site beacon transceiver. The addition of a single omni-directional receiver/transceiver (or one or more directional receivers) in a central position in the single site beacon transceiver of the present invention adds two additional baselines to all of the directional receiving antennas, covering the full 360 degrees, as shown in FIG. 14. In the antenna configuration shown in FIG. 14, the omni directional antenna is used for both transmitting and receiving signals. As can be seen in FIG. 14, two additional baselines are added and baselines 2 and 3 are shorter than baseline 1. One example of the system configuration of the present invention for signal transmission, signal reception and calibration is shown in FIG. 17.

Figure 18:
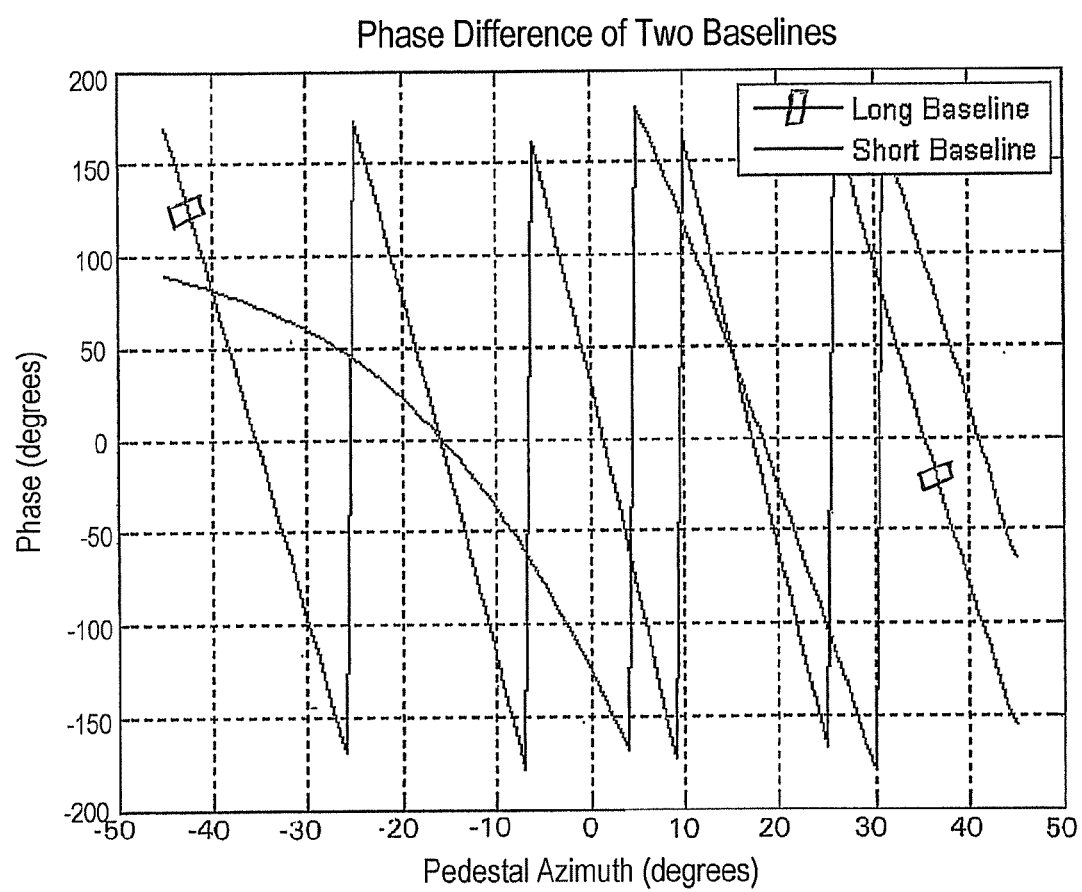
FIG. 18 shows the phase as a function of azimuth for the long baseline and one of the short baselines.

FIG. 18 depicts an example of the phase as a function of azimuth for the long and short baselines of FIG. 14. As can be seen the difference in length increases the amount of information available to resolve the ambiguity.

To accommodate the additional baselines, the estimation algorithm can be modified as follows:

$$VC3 = A3(\text{theta}) \cdot \exp\left\{j \cdot \left[\begin{array}{c} 2 \cdot pi \cdot f0 \cdot t + \\ \frac{2 \cdot pi \cdot d/\sqrt{2} \cdot f \cdot \sin(\text{theta} + \pi/4)}{c} \end{array}\right]\right\} \quad \text{(equation \#17)}$$

Equation 17 shows the complex envelope of the received signal in the omni directional antenna relative to the signal from antenna 2.

$$\text{COST} = W1 \cdot \left|\frac{VC1\_\text{received}}{VC2\_\text{received}} - \frac{VC1\_\text{model(theta)}}{VC2\_\text{model(theta)}}\right|^2 + \quad \text{(equation \#18)}$$
$$W2 \cdot \left|\frac{VC1\_\text{received}}{VC3\_\text{received}} - \frac{VC1\_\text{model(theta)}}{VC3\_\text{model(theta)}}\right|^2 +$$
$$W3 \cdot \left|\frac{VC2\_\text{received}}{VC3\_\text{received}} - \frac{VC2\_\text{model(theta)}}{VC3\_\text{model(theta)}}\right|^2$$

Equation 18 shows a modified cost function that includes the additional baselines. The values of W1, W2, W3 are optimized according to estimation theory for best results. In other embodiments, a sequential algorithm can be used where the short baselines are used to find less accurate coarse azimuth and use the long baseline to determine a more accurate final azimuth.

Figure 19:
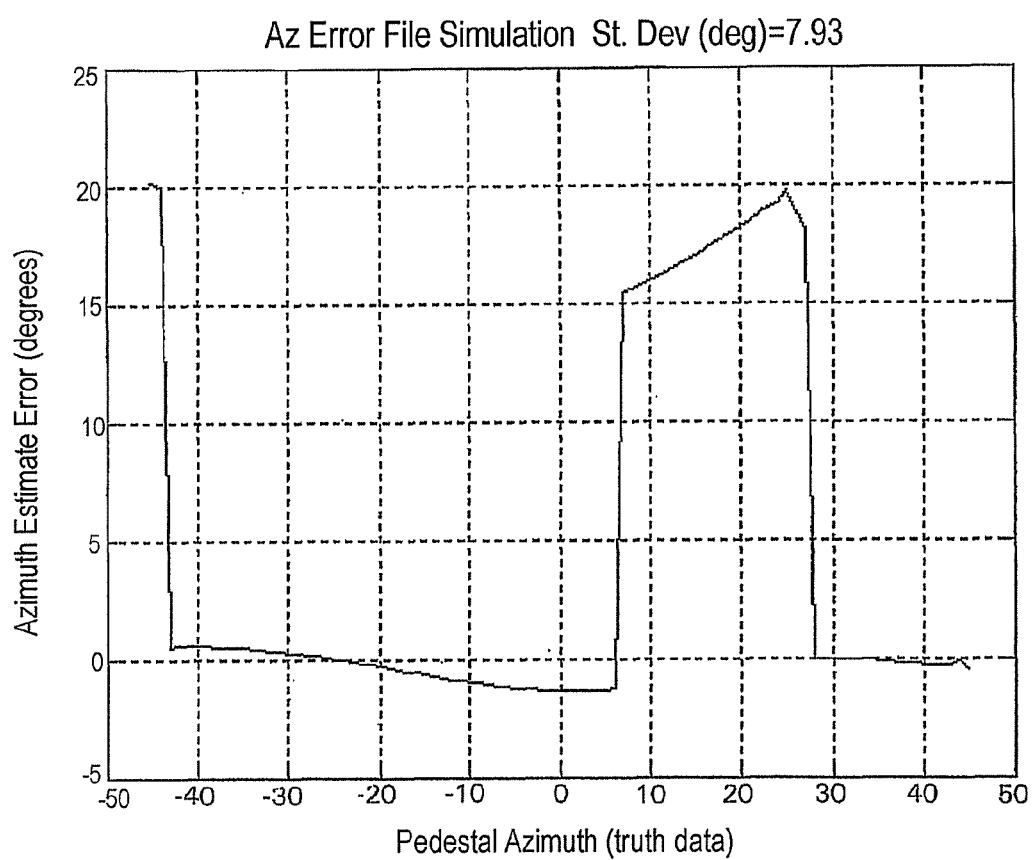
FIG. 19 depicts accuracy results (measurement versus truth) for a severe case of multipath using a single baseline.
Figure 20:
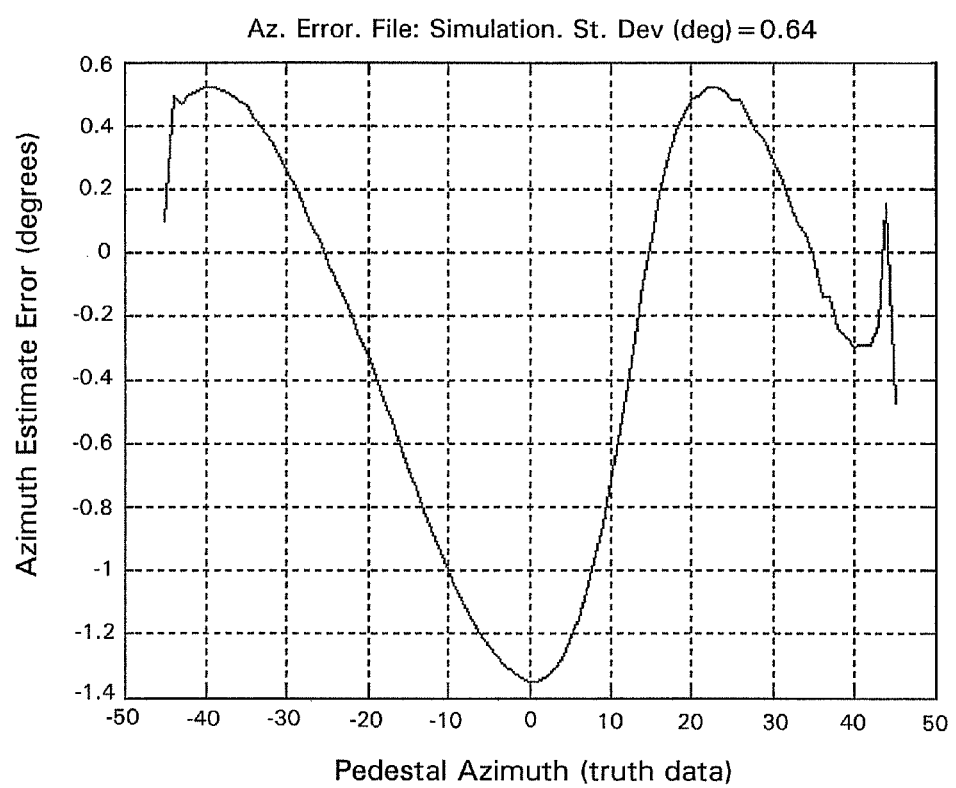
FIG. 20 depicts accuracy results (measurement versus truth) for the severe case of multipath of FIG. 19, when the three baselines of the present invention are used to resolve the ambiguity.

FIG. 19 and FIG. 20 show the effectiveness of the additional baselines and the azimuth estimation method. FIG. 19 shows the performance when the original single baseline is used, where the received signal azimuth is not resolved correctly for about 25% of the received signals. As shown in FIG. 20, the improvement in performance when the 3 baselines are used is significant with azimuth errors of +0.5 to −1.3 degrees throughout the +45 to −45 degree arc covered by each directional receiving antenna.

Figure 21:
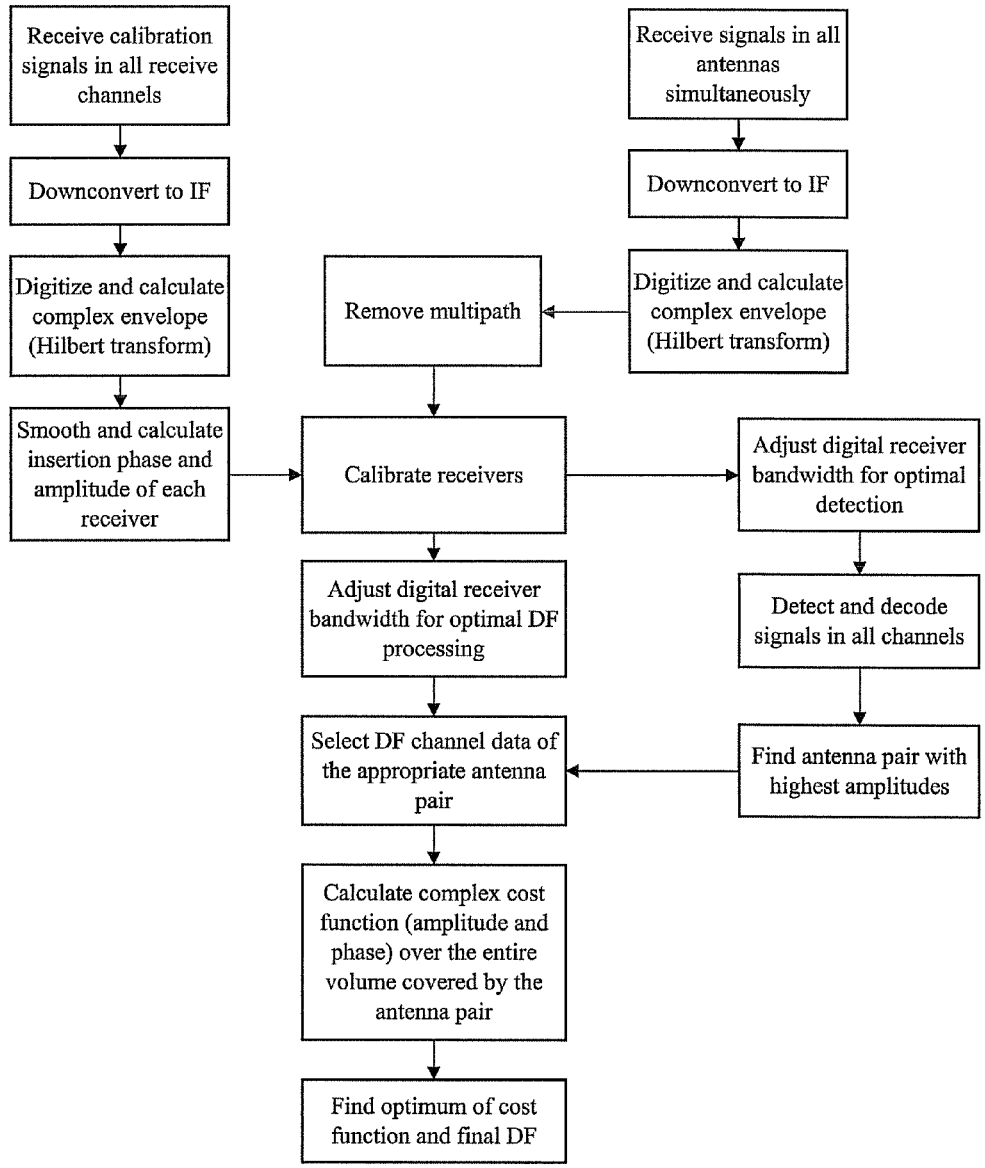
FIG. 21 shows the method for removal of the multipath signals in one embodiment of the method of the present invention.

In some embodiments of the method of the present invention, the multipath signal distortion is removed from the received signals before the digital RF transceiver 30 determines which two of the plurality of directional receiving antennas received the highest amplitude signal, as shown in FIG. 21. In other embodiments, the multipath signal distortion is removed from the received signals before the received signals are downconverted to an intermediate frequency, digitized and transformed into a numerical representation of the complex envelope of the downconverted IF signal using a Hilbert Transform.

In other embodiments, multipath is mitigated by adaptive algorithms in the time domain. The algorithms used in the present invention do not require additional antennas and use the complex input samples in the time domain only. While prior art regarding adaptive techniques briefly mention the possibility of adaptive nulling in space, using the antenna array, these techniques adaptively create a null in space towards multipath sources only if the multipath signals can be separated from the direct path signals. In one embodiment of the present invention, the multipath signals are mitigated by the following method; including the steps of:

Detecting the received signal and determining the leading and trailing edges of the received signal (i.e., signal pulse) by examining the pulse shape.

Figure 22:
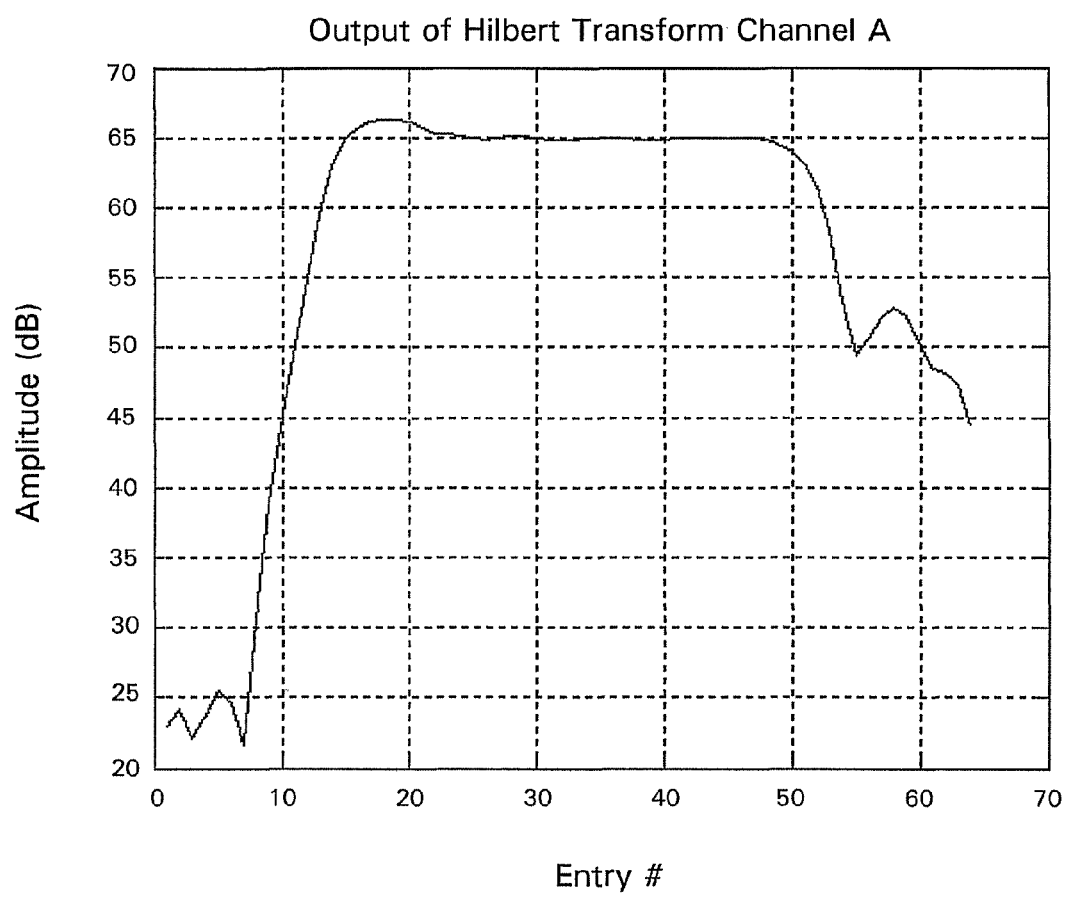
FIG. 22 shows the measured output of the Hilbert Transform for one channel of the digital receiver that is connected to one of the directional receiving antennas.
Figure 23:
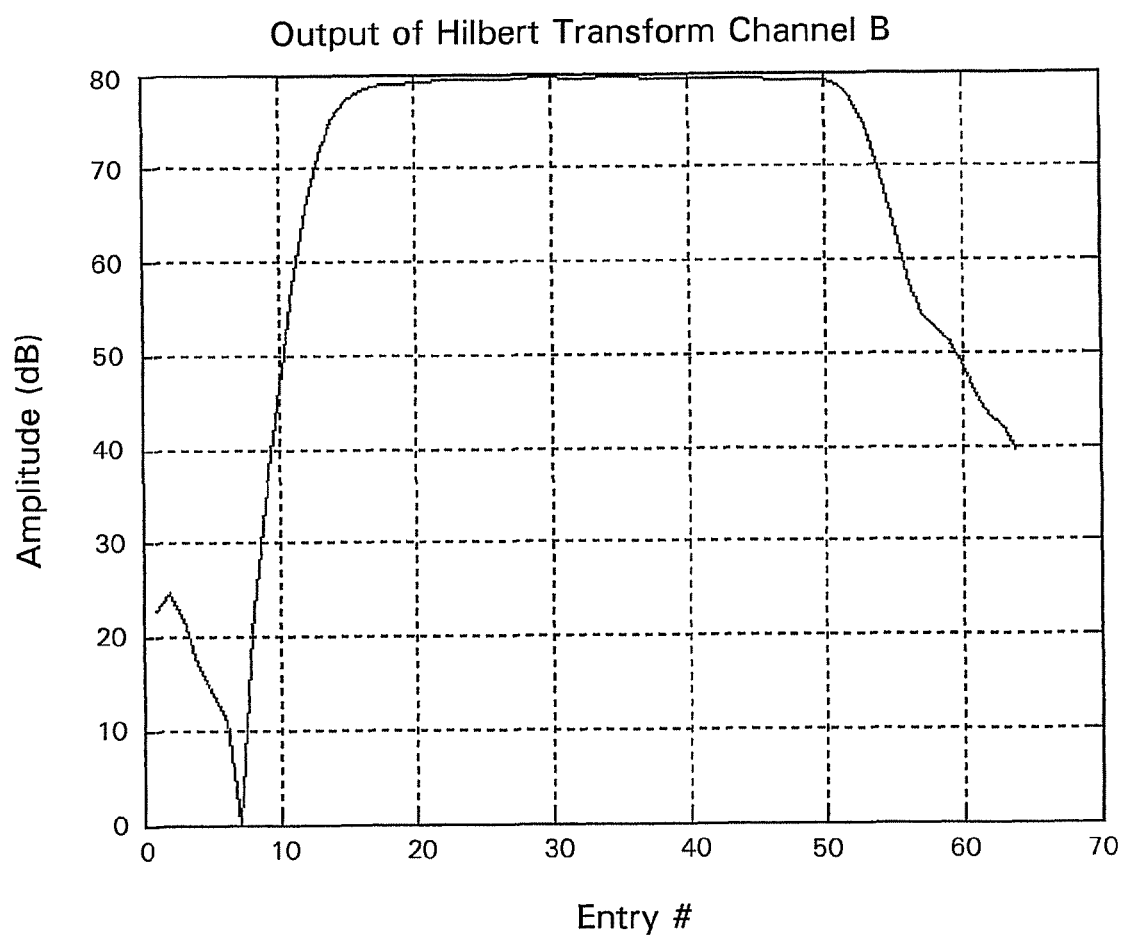
FIG. 23 shows the measured output of the Hilbert Transform for one channel of the digital receiver that is connected to one of the directional receiving antennas squinted by 90 degrees from the directional receiving antenna of FIG. 22.

Determining the multipath signal, which is delayed compared to the direct path signal and, therefore, will be visible at the trailing edge of the received signal pulse. FIGS. 22 and 23 show measured data from two directional receiving antennas squinted by 90 degrees. The multipath signal is clearly visible at the trailing edge (right hand side) of the signals shown in FIGS. 22 and 23.

Creating synthetic A/D samples of a pulse having the same pulse width as the detected signal pulse. The timing of the trailing edge of this pulse is adjusted to overlap the multipath area and the nominal frequency of the pulse corresponds to the center frequency of the received signal pulse. The created synthetic A/D samples of the received signal pulse are then passed through the signal processing previously described to determine a final azimuth to the source of the transmitted signal.

Selecting a sample from the multipath area close to the trailing edge of the received signal. An adaptive weight is then calculated using equation 19.

$$W = \frac{Vsignal(sp) \cdot Vsynthetic(sp)^*}{|Vsynthetic(sp)|^2} \quad \text{(equation \#19)}$$

Where:

Vsignal(sp) is the complex envelope of the signal in the sampling area; and

Vsynthetic(sp) is the complex envelope of the synthetic signal in the sampling area.

The adaptive weight W is used to calculate the cancelled complex envelope according to equation 20.

$$V\text{cancelled} = V\text{signal} - W \cdot V\text{synthetic} \quad \text{(equation \#20)}$$

Where:

Vsignal and Vsynthetic include all the samples along the pulses.

Figure 24:
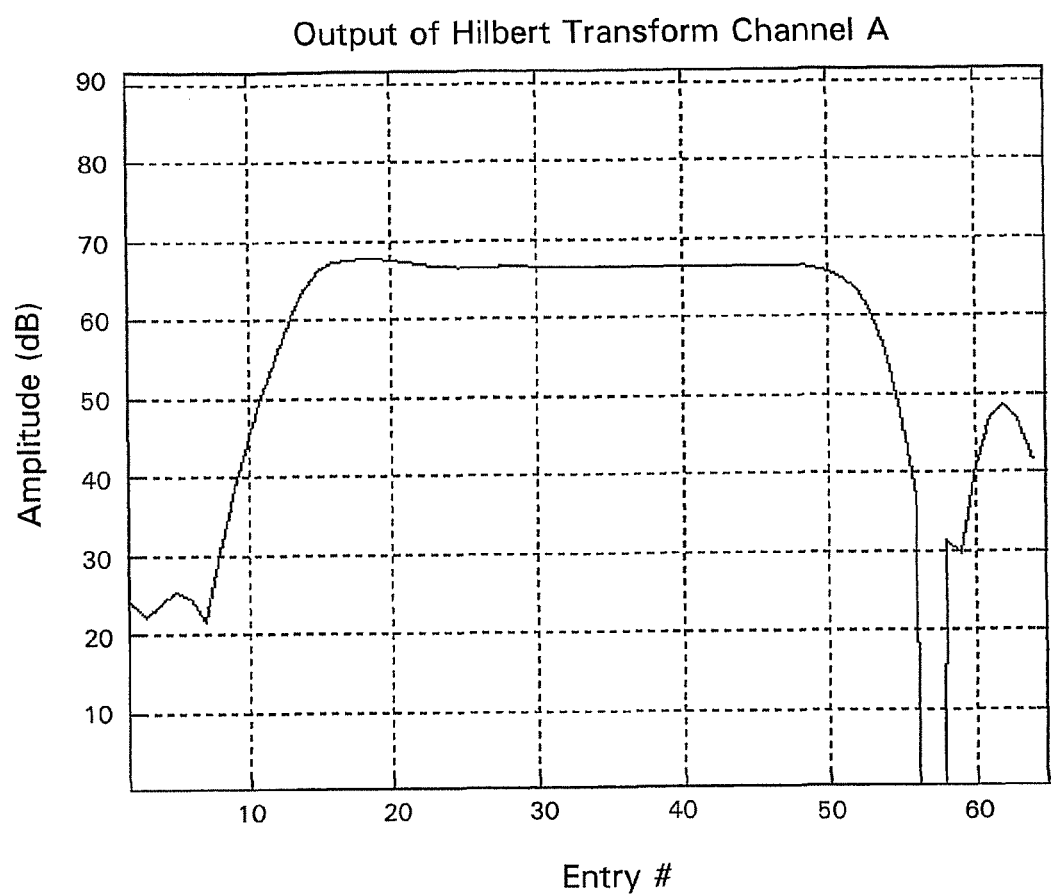
FIG. 24 shows the output of the Hilbert Transform after cancellation of multipath for the directional receiving antenna of FIG. 22.
Figure 25:
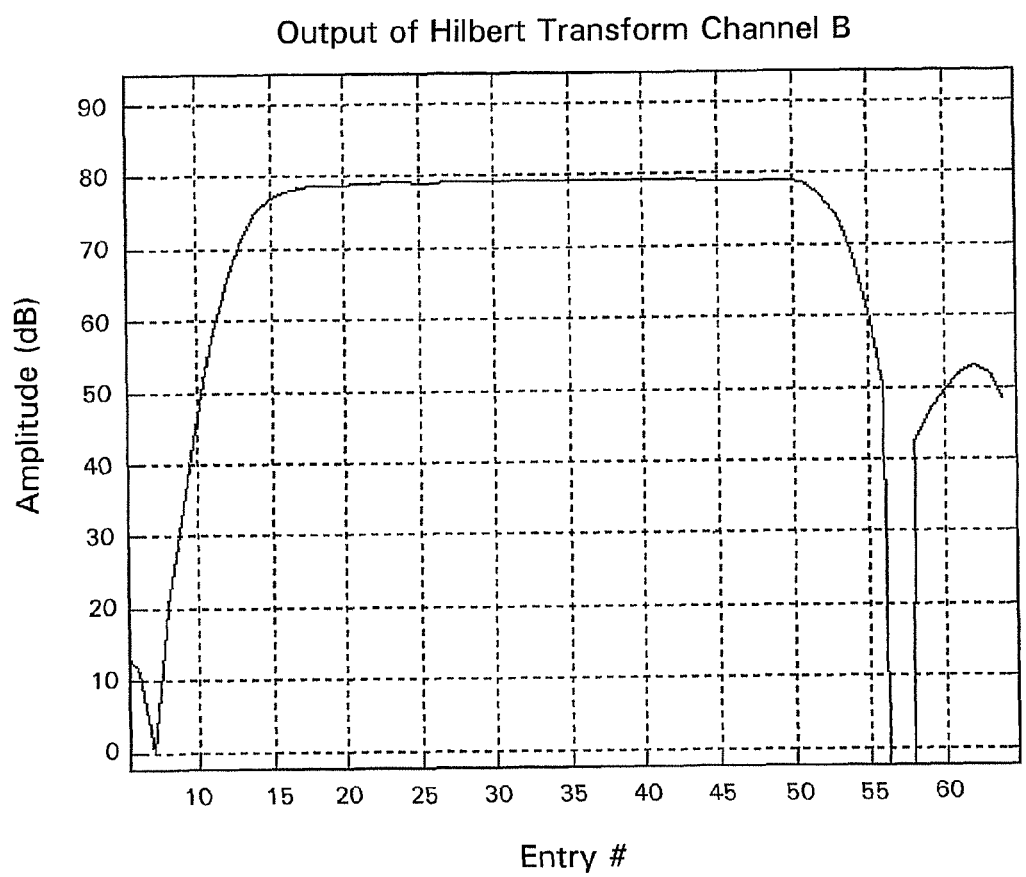
FIG. 25 shows the output of the Hilbert Transform after cancellation of multipath for the directional receiving antenna of FIG. 23.

FIGS. 24 and 25 show the signal voltage envelope after cancellation in which there is an improvement of about 10 dB in multipath signal attenuation.

Figure 26:
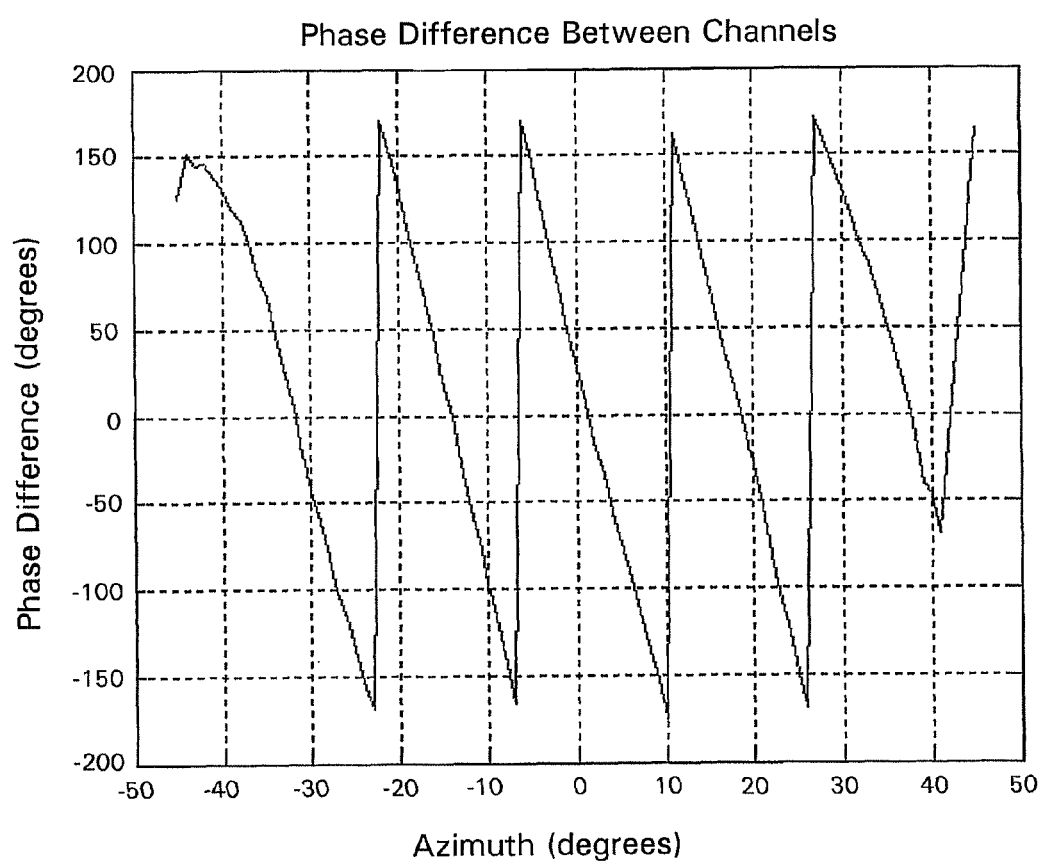
FIG. 26 shows the phase difference between the two channels of FIGS. 22 and 23 when the target is moved +/−45 degrees relative to boresight before cancellation of multipath.
Figure 27:
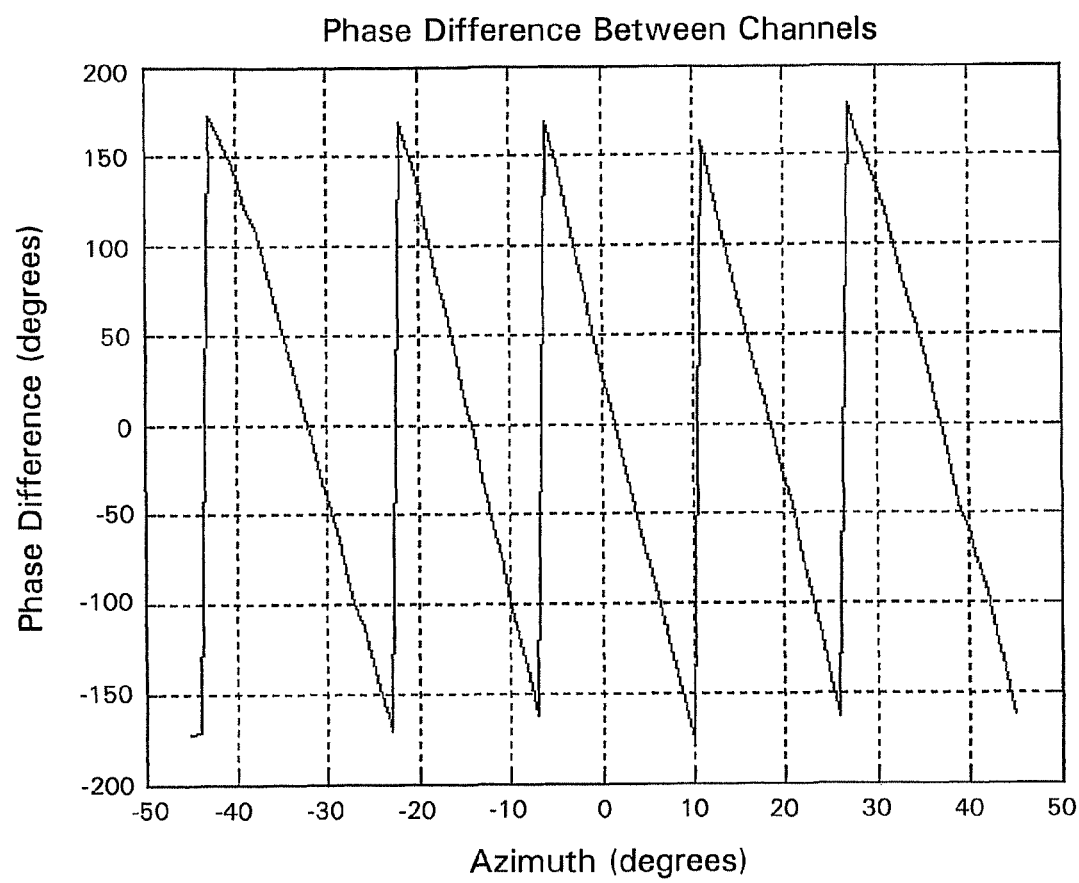
FIG. 27 shows the phase difference between the two channels of FIGS. 22 and 23 when the target is moved +/−45 degrees relative to boresight after cancellation of multipath.

The phase difference between the received signals in the two channels before cancellation is shown in FIG. 26 and after cancellation in FIG. 27. Comparing FIGS. 26 and 27 clearly shows that the distortion of the phase after cancellation is significantly smaller.

In some embodiments, this process is repeated for each channel. In order for the technique to work well, the selected sample for azimuth processing has to be in the pulse area, but close to the trailing edge. If no cancellation is used, the sample for azimuth processing is selected in the leading edge of the pulse in order to mitigate some of the multipath. However, measurements demonstrate that leading edge sampling cannot separate the multipath from the direct signal very effectively because of the limited receiver bandwidth.

First Embodiment

In the first embodiment, the single site beacon transceiver 10 includes an omni-directional transceiver, a plurality of directional receiving antennas 20, and a digital RF transceiver 30 for processing received signals, as shown in FIG. 1.

In operation, in this first embodiment shown in FIG. 1, the signal transmitted by the single site beacon transceiver 10 via omni-directional antenna 15, such as a beacon interrogation signal, is received by the transponders of targets, such as aircraft. The targets respond to the received signal by transmitting a reply signal. The digital RF transceiver 30 receives and processes RF signals received by the omni-directional antenna 15 and the plurality of directional receiving antennas 20. In one embodiment, the signal transmitted by the single site beacon transceiver 10 is a transponder interrogation signal at 1030 MHz and the received signal from the targets is an interrogation response signal at 1090 MHz, which is transmitted after a fixed known time delay.

In this embodiment, the received signal is received by at least two of the directional antennas and/or the omni-directional antenna and forwarded to the at least one processor 22 for processing by the plurality of digital signal receiver channels 23 of the digital RF transceiver 30, as shown in FIG. 2. The received signal can also be a target "squit" transmission, which is a periodic transmission that is not in response to a received interrogation signal. In this case, the range to the target transmitting the "squit" is unknown and the present invention will only calculate an accurate azimuth to the target. In this embodiment, the received signal or "squit" transmission is received by all four directional receiving antennas 20, downconverted to an intermediate frequency (IF), digitized and processed by the respective digital signal receiver channel 23. In this embodiment, the receiver bandwidth is 8 MHz, as shown in FIG. 2. However, the bandwidth of digital RF transceiver 30 can be adjusted by controlling the filter coefficients to any bandwidth best suited for target processing.

In the embodiment shown in FIG. 1, since the target azimuth is unknown, the received signal is initially detected in at least the four directional receiving antennas 20 and omni-directional antenna 15, and decoded in each of the digital receiver channels associated with the four directional receiving antennas 20 omni-directional antenna 15. In parallel, calibration is determining the amplitude and phase data for the respective digital signal receiver channels 23 associated with the four directional receiving antennas 20 and omni-directional antenna 15 and storing the amplitude and phase data for the respective digital signal receiver channels 23 in memory, such as a sliding window buffer.

From each of the four directional receiving antennas 20 omni-directional antenna 15 is stored in memory, such as a sliding window buffer.

The geometry of the reception of the received signal or "squit" transmission at the two antennas receiving the highest amplitude signal, is shown in FIG. 6. In FIG. 6, the target that transmitted the received signal or "squit" is at an angle theta relative to the normal to the interferometer baseline shown in the Fig. (AB). When the target distance, represented by lines of bearing AE and BF, is much greater than the length of the interferometer baseline AB, the lines of bearing AE and BF can be treated, mathematically, as parallel lines within the tolerances of the target azimuth calculation.

The at least one processor 22 then decodes the received signal, calculates a range to the target transmitting the received signal using the time of transmission of the interrogation signal, the receipt of the received signal and the known fixed time delay of the transponder (i.e., round trip delay (RTD)). In embodiments of the present invention, the at least one processor 22 then determines a precise azimuth to the target using a combination of amplitude monopulse and interferometry.

In some embodiments, the at least one processor 22 in digital RF transceiver 30 estimates a coarse signal azimuth for the signal by calculating an amplitude monopulse ratio for the signal using two of the plurality of directional receiving antennas receiving the highest amplitude signal, and estimates a final signal azimuth for the signal using an interferometer baseline between the two directional receiving antennas receiving the highest amplitude signal.

When the processing identifies the target as a valid target, the data from the two antennas receiving the highest amplitude signal is selected for azimuth processing. The signal amplitude equations for the received signals in antenna 1 and antenna 2 are previously discussed equations #1 and #2 respectively, shown below.

$$V1 = A1(\text{theta}) \cdot \cos\left[2 \cdot pi \cdot f \cdot t + \frac{2 \cdot pi \cdot d \cdot f \cdot \sin(\text{theta})}{c}\right] \quad \text{(equation \#1)}$$

and $$V2 = A2(\text{theta}) \cdot \cos[2 \cdot pi \cdot f \cdot t] \quad \text{(equation \#2)}$$

Where:

V1 is the signal amplitude in antenna 1;

V2 is the signal amplitude in antenna 2;

A1 is the peak amplitude of the signal in antenna 1;

A2 is the peak amplitude of signal in antenna 2;

theta is the angle between target direction and the normal to interferometer baseline;

f is the RF frequency of received signal;
t is time;
d is the distance between antennas phase centers;
c is the speed of light;
pi is 3.1415926

The amplitude of the signal is determined by the absolute value of the radiation pattern of the antenna, as shown in FIG. 2. Since in this embodiment the two directional antennas are angled ninety degrees with respect to each other, relative to the interferometer baseline the radiation patterns of antenna 1 and antenna 2 overlap, as shown in FIG. 2. The signal amplitude of the received signal at antenna 1 and antenna 2 will be equal when the target transmitting the signal is located along the line extending from the antenna along the interferometer boresight shown in FIG. 1.

In this embodiment, the received signals are first processed for coarse azimuth estimate (amplitude monopulse). The relative phase between the two signals depends on the path difference of the wave between the two channels, which is a direct result of the geometry shown in FIG. 6.

The signals are downconverted to IF and then to baseband in the digital receiver. Using a Hilbert transform, the signals are converted to a mathematical expression of the complex envelope of the received signal. In this embodiment, the signals are expressed in terms of their complex envelope (after Hilbert Transform) the digital transceiver 30 by the following equation:

$$VC1 = A1(\text{theta}) \cdot \exp\left\{j \cdot \left[\begin{array}{c} 2 \cdot pi \cdot f0 \cdot t + \\ \frac{2 \cdot pi \cdot d \cdot f \cdot \sin(\text{theta})}{c} \end{array}\right]\right\} \quad \text{(equation \#3)}$$

$$VC2 = A2(\text{theta}) \cdot \exp\{j \cdot [2 \cdot pi \cdot f0 \cdot t]\} \quad \text{(equation \#4)}$$

Where:
VC1 is the complex envelope in antenna 1 after calibration;
VC2 is the complex envelope in antenna 2 after calibration; and
f0 is the IF frequency. If the signals are at baseband f0=0.

In this embodiment, the signals are processed for amplitude monopulse (coarse azimuth) using the following equation:

$$\text{amp\_monopulse\_ratio} = \frac{\text{abs}(VC1) - \text{abs}(VC2)}{\text{abs}(VC1) + \text{abs}(VC2)} \quad \text{(equation \#5)}$$

Where:
VC1 is the complex envelope in antenna 1 after calibration;
VC2 is the complex envelope in antenna 2 after calibration; and
abs denotes absolute value of the complex envelope of the signal.

As previously discussed, equation 5 is the amplitude monopulse ratio. The expected values of the amplitude monopulse are shown in FIG. 7, which is the amplitude monopulse table that converts a specific monopulse ratio to azimuth angle relative to interferometer boresight.

In this embodiment, after the amplitude monopulse ratio is calculated as shown in equation 5, the amplitude monopulse table is accessed and the target coarse azimuth determined. The coarse azimuth estimate is non ambiguous over the entire field of view of the two antennas.

In this embodiment, the final signal azimuth is estimated using the interferometer baseline between the two antennas receiving the highest amplitude signals. As previously discussed, since the distance between antennas phase centers, d, is in the order of several wavelengths, the signal path difference can also be a few wavelengths resulting in phase differences in multiples of 2*pi, which results in potential ambiguity in the final azimuth determination.

In this embodiment, to resolve this potential ambiguity and find the accurate azimuth the following steps are performed:

First, the interferometer boresight is electronically steered to the coarse azimuth using the following equation:

$$VC11 = VC1 \cdot \exp\left[-j \cdot \frac{2 \cdot \text{pi} \cdot f}{c} \cdot d \cdot \sin(\text{coarse\_az})\right] \quad \text{(equation \#13)}$$

Where:
VC11 is the corrected complex envelope of antenna 1 after steering;
VC1 is defined in equation 3; and
coarse_az is the coarse azimuth (relative to the normal to the interferometer baseline) calculated by the amplitude monopulse (radians).

Next, the interferometric phase difference is calculated as follows:

$$\text{del\_phi} = \text{angle}\left[\frac{VC2 \cdot \text{conjugate}(VC11)}{\text{abs}(VC2) \cdot \text{abs}(VC11)}\right] \quad \text{(equation \#14)}$$

Where:
del_phi is the phase difference between the interferometer antennas;
angle is the mathematical operation of finding the angle of a complex number;
conjugate is the mathematical operation of converting a complex number to its complex conjugate; and
abs is the mathematical operation of finding the absolute value of a complex number.

Next, the interferometric azimuth deviation from the coarse angle is calculated as follows:

$$\text{del\_sin\_azimuth} = \left[\frac{\text{del\_phi} \cdot c}{2 \cdot \text{pi} \cdot f \cdot d}\right] \quad \text{(equation \#15)}$$

Where:
del_phi is defined in equation 14;
arcsin is the inverse operation of sine; and
del_sin_azimuth is the difference between coarse azimuth and final azimuth estimate in sine space.

Then, the final azimuth estimate is calculated as follows:

final_azimuth=arcsin [sin(coarse_az)+del_sin_azimuth]   (equation #16)

Where:
final_azimuth is the final azimuth estimation;
arcsin is the mathematical inverse of sine function; and
del_sin_azimuth is defined in equation 15.

Applications

In an automatic dependent surveillance-broadcast (ADS-B) system, each aircraft periodically transmits its own position coordinates. As shown in FIG. 4, two or more of the single site beacon transceivers of the present invention can be used to determine the location of a target passively by intersecting the respective lines of azimuth from each of the single site beacon transceivers. The passive target localization shown in FIG. 4, does not require the transmission of a signal for round trip delay (RTD) and details of such calculation is known to those familiar with the art and will not be shown here. The ability to use line intersection from a minimum of two stations to determine the location of a target passively and, at the same time, support a probability of intercept (POI) of a transmitted signal of 100% is unique to the disclosed system and method. Known prior art methods, such as multilateration that supports a 100% POI requires a minimum of 3 beacon transceiver stations.

Figure 28:
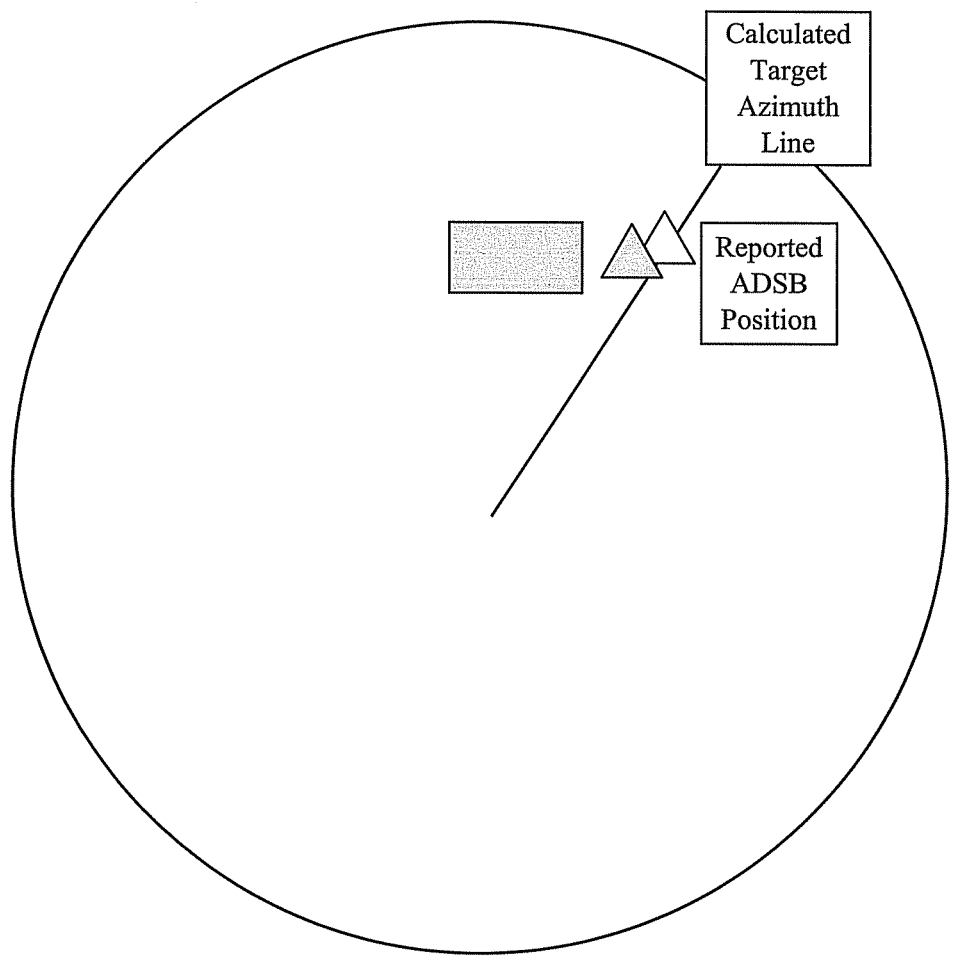
FIG. 28 shows one example of verification of an ADS-B target as a true target by one embodiment of the present invention.
Figure 29:
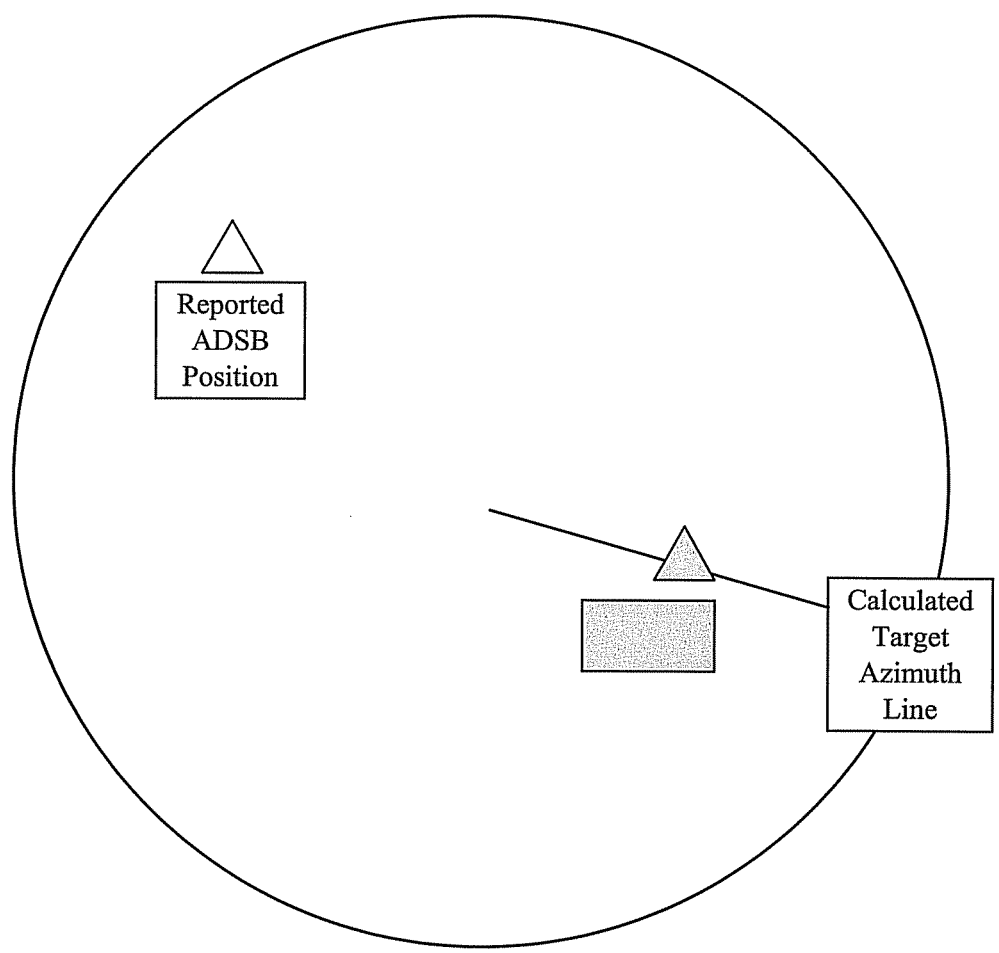
FIG. 29 shows one example of verification of an ADS-B target as a false target by one embodiment of the present invention.

Some embodiments of the system and method of the present invention provide independent verification of position data transmitted from an aircraft using an ADS-B system, such as shown in FIG. 4. Since the location of the single site beacon transceiver is known, the azimuth to the target from the transceiver is calculated using the aircraft's transmitted ADS-B position coordinates, and then the azimuth calculated from the ADS-B position coordinates is compared to the azimuth calculated by interferometry in the present invention. If the difference between the azimuth calculated from the ADS-B position coordinates and the azimuth calculated by the present invention are within a predefined tolerance or threshold, the ADS-B aircraft position is determined to be valid, as shown in FIG. 28. Where the difference between the azimuth calculated from the ADS-B position coordinates and the azimuth calculated by the present invention exceed the predefined tolerance or threshold, such as shown in FIG. 29, the ADS-B aircraft position is determined to be invalid.

It will be understood that various modifications and changes may be made in the present invention by those of ordinary skill in the art who have the benefit of this disclosure. The method of the present invention can also be used in other RF bearing measurement systems. All such changes and modifications fall within the spirit of this invention, the scope of which is measured by the following appended claims.

I claim:

1. A single site beacon transceiver, comprising:
an omni-directional transceiver;
a plurality of directional receiving antennas providing 360 degrees of coverage for receiving a signal; and
a digital receiver for processing said signal, said digital receiver comprising a plurality of receiver channels and at least one processor, wherein the plurality of receivers are calibrated periodically and said processor estimates a coarse signal azimuth for said signal by calculating an amplitude monopulse ratio for said signal using two of the plurality of directional receiving antennas receiving the highest amplitude signal, and estimates a final signal azimuth for said signal using the estimated coarse signal azimuth and an interferometer baseline between said two of the plurality of directional receiving antennas.

2. The single site beacon transceiver of claim 1, wherein the digital receiver estimates the final signal azimuth using the equation:

$$\text{final\_azimuth} = \arcsin\left[\sin(\text{coarse\_az}) + \left[\frac{\text{del\_phi} \cdot c}{2 \cdot \text{pi} \cdot f \cdot d}\right]\right] \quad (a)$$

where:
del_phi is the phase difference between said two of the plurality of directional receiving antennas;
c is the speed of light;
f is the RF frequency of received signal;
d is distance between phase centers of said two of the plurality of directional receiving antennas, and coarse_az is the coarse signal azimuth relative to the normal to the interferometer baseline.

3. The single site beacon transceiver of claim 2, wherein the coarse azimuth (coarse_az) is determined from an amplitude monopulse table using the amplitude monopulse ratio equation, $$\text{amp\_monopulse\_ratio} = \frac{\text{abs}(VC1) - \text{abs}(VC2)}{\text{abs}(VC1) + \text{abs}(VC2)}$$

where:
ABS denotes the absolute value of the complex envelope of the signal;
VC1 is the complex envelope in one of said two of the plurality of directional receiving antennas after calibration; and
VC2 is the complex envelope in the other of said two of the plurality of directional receiving antennas after calibration.

4. The single site beacon transceiver of claim 2, wherein the coarse azimuth (coarse_az) is determined from an amplitude monopulse table using the amplitude monopulse ratio equation, $$\text{amp\_monopulse\_ratio} = \frac{\text{abs}(VC1)}{\text{abs}(VC2)} \quad (b)$$

where:
ABS denotes the absolute value of the complex envelope of the signal;
VC1 is the complex envelope in one of said two of the plurality of directional receiving antennas after calibration; and
VC2 is the complex envelope in the other of said two of the plurality of directional receiving antennas after calibration.

5. The single site beacon transceiver of claim 2, wherein the coarse azimuth (coarse_az) is determined from an amplitude monopulse table using the amplitude monopulse ratio equation, $$\text{amp\_monopulse\_ratio} = \log\left[\frac{\text{abs}(VC1)}{\text{abs}(VC2)}\right] \quad (b)$$

where:
ABS denotes the absolute value of the complex envelope of the signal;
VC1 is the complex envelope in one of said two of the plurality of directional receiving antennas after calibration; and
VC2 is the complex envelope in the other of said two of the plurality of directional receiving antennas after calibration.

6. The single site beacon transceiver of claim 1, wherein the omni-directional transceiver transmits an interrogation signal and said signal is a reply signal to the interrogation signal or an unsolicited beacon squit transmission, and wherein the omni-directional transceiver and said two of the plurality of directional receiving antennas provide at least two interferometer baselines to resolve azimuth ambiguities.

7. The single site beacon transceiver of claim 1, wherein the digital receiver calculates an interferometric azimuth deviation from an interferometric phase difference between said two of the plurality of directional receiving antennas.

8. The single site beacon transceiver of claim 1, wherein said signal is downconverted to an intermediate frequency and digitized prior to being transformed into a numerical representation of said signal.

9. The single site beacon transceiver of claim 1, wherein said signals are converted to a numerical representation of their complex envelope using a Hilbert Transform.

10. The single site beacon transceiver of claim 1, wherein the calibration of the plurality of receiver channels comprises:
  receiving a calibration signal at each of the plurality of receiver channels;
  downconverting the calibration signal to an intermediate frequency;
  digitizing the downconverted calibration signal;
  transforming the calibration signal into a numerical representation of a complex envelope of the calibration signal using a Hilbert Transform and
  calculating an insertion phase difference and an insertion amplitude difference between said plurality of receiver channels, associating each antenna of said plurality of antennas with one of said plurality of receiver channels, combining said insertion amplitude difference and said insertion phase difference calculated for each receiver channel with a stored insertion amplitude difference and a stored insertion phase difference for said antenna associated with said receiver channel; storing said insertion amplitude difference and said insertion phase difference for each receiver channel and said antenna associated with said receiver channel, and then removing said insertion amplitude difference and said insertion phase difference of said receiver channel and said antenna associated with said receiver channel from said signal before estimating the azimuth.

11. A single site beacon transceiver, comprising:
  an omni-directional transceiver, wherein the omni-directional transceiver transmits an interrogation signal;
  a plurality of directional receiving antennas providing 360 degrees of coverage for receiving a signal;
  a digital receiver for processing said signal, said digital receiver comprising a plurality of receiver channels and at least one processor, wherein the processing of said signal comprises:
    calibrating the plurality of receiver channels periodically before estimating the angle of arrival of said signal;
    determining which two of the plurality of directional receiving antennas received the highest amplitude signal;
    determining an interferometric baseline between said two of the plurality of directional receiving antennas;
    downconverting, digitizing and transforming said signal at each of said two of the plurality of directional receiving antennas into a numerical representation of said signal;
    calculating a numerical representation of a complex envelope from the numerical representation of said signal for each of said two of the plurality of directional receiving antennas;
    calculating an amplitude monopulse ratio for said signal;
    calculating a coarse signal azimuth angle for said signal by converting said signal amplitude monopulse ratio to an azimuth angle relative to the interferometric baseline;
    calculating an interferometric phase difference for said signal relative to the interferometric baseline;
    estimating an interferometric azimuth deviation from the calculated coarse signal azimuth angle; and
    determining a final signal azimuth for said signal using the calculated coarse signal azimuth angle and the estimated interferometric azimuth deviation.

12. The single site beacon transceiver of claim 11, wherein the digital receiver estimates the final signal azimuth using the equation:

$$\text{final\_azimuth} = \arcsin\left[\sin(\text{coarse\_az}) + \left[\frac{\text{del\_phi} \cdot c}{2 \cdot \text{pi} \cdot f \cdot d}\right]\right] \quad (a)$$

where:
  del_phi is the phase difference between said two of the plurality of directional receiving antennas;
  c is the speed of light;
  f is the RF frequency of received signal; and
  d is distance between phase centers of said two of the plurality of directional receiving antennas, and coarse_az is the coarse signal azimuth relative to the normal to the interferometer baseline.

13. The single site beacon transceiver of claim 12, wherein the coarse azimuth (coarse_az) is determined from an amplitude monopulse table using the amplitude monopulse ratio equation, $$\text{amp\_monopulse\_ratio} = \frac{\text{abs}(VC1) - \text{abs}(VC2)}{\text{abs}(VC1) + \text{abs}(VC2)}$$

where:
  ABS denotes the absolute value of the complex envelope of the signal;
  VC1 is the complex envelope in one of said two of the plurality of directional receiving antennas after calibration; and
  VC2 is the complex envelope in the other of said two of the plurality of directional receiving antennas after calibration.

14. The single site beacon transceiver of claim 12, wherein the coarse azimuth (coarse_az) is determined from an amplitude monopulse table using the amplitude monopulse ratio equation, $$\text{amp\_monopulse\_ratio} = \frac{\text{abs}(VC1)}{\text{abs}(VC2)} \quad (b)$$

where:
  ABS denotes the absolute value of the complex envelope of the signal;
  VC1 is the complex envelope in one of said two of the plurality of directional receiving antennas after calibration; and
  VC2 is the complex envelope in the other of said two of the plurality of directional receiving antennas after calibration.

15. The single site beacon transceiver of claim 11, wherein the omni-directional transceiver transmits an interrogation signal, and said signal is a reply signal to the interrogation signal or an unsolicited beacon squit transmission, wherein the omni-directional transceiver and said two of the plurality of directional receiving antennas provide at least two interferometer baselines to resolve azimuth ambiguities.

16. The single site beacon transceiver of claim 11, wherein the digital receiver calculates an interferometric azimuth deviation from an interferometric phase difference between said two of the plurality of directional receiving antennas.

17. The single site beacon transceiver of claim 11, wherein said signal is downconverted to an intermediate frequency and digitized prior to being transformed into a numerical representation of said signal.

18. The single site beacon transceiver of claim 11, wherein said signals are converted to the numerical representation of the complex envelope using a Hilbert Transform.

19. The single site beacon transceiver of claim 11, wherein the calibration of the plurality of receiver channels comprises:
  receiving a calibration signal at each of the plurality of receiver channels;
  downconverting the calibration signal to an intermediate frequency;
  digitizing the downconverted calibration signal;
  transforming the calibration signal into a numerical representation of a complex envelope of the calibration signal using a Hilbert Transform and
  calculating an insertion phase difference and an insertion amplitude difference between said plurality of receiver channels, associating each antenna of said plurality of antennas with one of said plurality of receiver channels, combining said insertion amplitude difference and said insertion phase difference calculated for each receiver channel with a stored insertion amplitude difference and a stored insertion phase difference for said antenna associated with said receiver channel; storing said insertion amplitude difference and said insertion phase difference for each receiver channel and said antenna associated with said receiver channel, and then removing said insertion amplitude difference and said insertion phase difference of said receiver channel and said antenna associated with said receiver channel from said signal before estimating the azimuth.

20. A single site beacon transceiver, comprising:
  an omni-directional transceiver;
  a plurality of directional receiving antennas providing 360 degrees of coverage for receiving signals;
  a digital receiver for processing said signal, said digital receiver comprising a plurality of receiver channels and at least one processor, wherein processing of said signal comprises:
  calibrating the plurality of directional receiving antennas periodically before estimating the angle of arrival of said signal;
  determining which two of the plurality of directional receiving antennas received the highest amplitude signal;
  determining an interferometric baseline between said two of the plurality of directional receiving antennas;
  downconverting, digitizing and transforming said signal at each of said two of the plurality of directional receiving antennas into a numerical representation of said signal;
  calculating a numerical representation of a complex envelope from the numerical representation of said signal for each of said two of the plurality of directional receiving antennas;
  wherein the processing of said signal uses the following equation to determine an azimuth angle with respect to an interferometer baseline:

$$COST = \left| \frac{VC1\_recieved}{VC2\_recieved} - \frac{VC1\_model(theta)}{VC2\_model(theta)} \right|^2$$

where:
  VC1_recieved is the complex envelope of the received signal after calibration at one of said two of the plurality of directional receiving antennas;
  VC2_recieved is the complex envelope of the received signal after calibration at the other of said two of the plurality of directional; and
  VC1_model(theta) is the model of the complex envelope of the received signal as a function of azimuth theta at one of said two of the plurality of the two directional receiving antennas; and
  VC2_model(theta) is the model of the complex envelope of the received signal as a function of azimuth theta at the other of said two of the plurality of the two directional receiving antennas; and
  wherein the azimuth angle corresponds to a minimum COST.

21. The single site beacon transceiver of claim 20, wherein the omni-directional transceiver transmits an interrogation signal and said signal is a reply signal to the interrogation signal or an unsolicited beacon squit transmission, wherein the omni-directional transceiver and said two of the plurality of directional receiving antennas provide at least two interferometer baselines to resolve azimuth ambiguities.

22. The single site beacon transceiver of claim 20, wherein said signal is downconverted to an intermediate frequency and digitized prior to being transformed into a numerical representation of said signal.

23. The single site beacon transceiver of claim 20, wherein the calibration of the plurality of receiver channels comprises:
  receiving a calibration signal at each of the plurality of receiver channels;
  downconverting the calibration signal to an intermediate frequency;
  digitizing the downconverted calibration signal;
  transforming the calibration signal into a numerical representation of a complex envelope of the calibration signal using a Hilbert Transform and
  calculating an insertion phase difference and an insertion amplitude difference between said plurality of receiver channels, associating each antenna of said plurality of antennas with one of said plurality of receiver channels, combining said insertion amplitude difference and said insertion phase difference calculated for each receiver channel with a stored insertion amplitude difference and a stored insertion phase difference for said antenna associated with said receiver channel; storing said insertion amplitude difference and said insertion phase difference for each receiver channel and said antenna associated with said receiver channel, and then removing said insertion amplitude difference and said insertion phase difference of said receiver channel and said antenna associated with said receiver channel from said signal before estimating the azimuth.

24. A method of localizing targets using a single site compact beacon transceiver, the method comprising:
  transmitting an interrogation signal from an omni-directional transceiver;
  receiving a reply signal at a plurality of directional receiving antennas providing 360 degrees of coverage for receiving a signal; and processing the received reply signals in a digital receiver, said digital receiver comprising a plurality of receiver channels and at least one processor; wherein the processing comprises:

calibrating the plurality of receiver channels periodically before estimating the angle of arrival of the signal;

determining which two of the plurality of directional receiving antennas received the highest amplitude signal;

determining an interferometric baseline between said two of the plurality of directional receiving antennas;

downconverting, digitizing and transforming said signal at each of said two of the plurality of directional receiving antennas into a numerical representation of said signal;

calculating a numerical representation of a complex envelope from the numerical representation of said signal for each of said two of the plurality of directional receiving antennas;

calculating an amplitude monopulse ratio for said signal;

calculating a coarse signal azimuth angle for said signal by converting said signal amplitude monopulse ratio to an azimuth angle relative to the interferometric baseline;

calculating an interferometric phase difference for said signal relative to the interferometric baseline;

estimating an interferometric azimuth deviation from the calculated coarse signal azimuth angle; and determining a final signal azimuth angle for said signal using the calculated coarse signal azimuth angle and the estimated interferometric azimuth deviation.

25. The method of claim 24, wherein determining the final signal azimuth angle uses the equation:

$$\text{final\_azimuth} = \arcsin\left[\sin(\text{coarse\_az}) + \left[\frac{\text{del\_phi} \cdot c}{2 \cdot \text{pi} \cdot f \cdot d}\right]\right]$$

where:
del_phi is the phase difference between said two of the plurality of direction receiving antennas;
c is the speed of light;
f is the RF frequency of received signal; and
d is distance between phase centers of said two of the plurality of directional receiving antennas; and
coarse_az is the coarse signal azimuth relative to the normal to the interferometer baseline.

26. The method of claim 25, wherein determining the coarse azimuth (coarse_az) uses an amplitude monopulse table and the amplitude monopulse ratio equation, $$\text{amp\_monopulse\_ratio} = \frac{\text{abs}(VC1) - \text{abs}(VC2)}{\text{abs}(VC1) + \text{abs}(VC2)}$$

where:
ABS denotes the absolute value of the complex envelope of the signal;
VC1 is the complex envelope in one of said two of the plurality of directional receiving antennas after calibration; and
VC2 is the complex envelope in the other of said two of the plurality of directional receiving antennas after calibration.

27. The method of claim 25, wherein determining the coarse azimuth (coarse_az) uses an amplitude monopulse table and the amplitude monopulse ratio equation, $$\text{amp\_monopulse\_ratio} = \frac{\text{abs}(VC1)}{\text{abs}(VC2)}$$

where:
ABS denotes the absolute value of the complex envelope of the signal;
VC1 is the complex envelope in one of said two of the plurality of directional receiving antennas after calibration; and
VC2 is the complex envelope in the other of said two of the plurality of directional receiving antennas after calibration.

28. The method of claim 24, further comprising calculating a range to the target transmitting the reply signal based on the round trip delay time, wherein the omni-directional transceiver and said two of the plurality of directional receiving antennas provide at least two interferometer baselines to resolve azimuth ambiguities.

29. The method of claim 24, wherein calibrating the plurality of receiver channels comprises the steps of:

receiving a calibration signal at each of the plurality of receiver channels;

downconverting the calibration signal to an intermediate frequency;

digitizing the downconverted calibration signal;

transforming the calibration signal into a numerical representation of a complex envelope of the calibration signal using a Hilbert Transform and calculating an insertion phase difference and an insertion amplitude difference between said plurality of receiver channels, associating each antenna of said plurality of antennas with one of said plurality of receiver channels, combining said insertion amplitude difference and said insertion phase difference calculated for each receiver channel with a stored insertion amplitude difference and a stored insertion phase difference for said antenna associated with said receiver channel; storing said insertion amplitude difference and said insertion phase difference for each receiver channel and said antenna associated with said receiver channel, and then removing said insertion amplitude difference and said insertion phase difference of said receiver channel and said antenna associated with said receiver channel from said signal before estimating the azimuth.

30. A single site beacon transceiver, comprising:
at least one directional transceiver located at a central position in said single site beacon transceiver;
a plurality of directional receiving antennas located along a periphery of said single site beacon transceiver providing 360 degrees of coverage for receiving said signal; and
a digital receiver for processing said signal, said digital receiver comprising a plurality of receiver channels and at least one processor, wherein said digital receiver periodically calibrates each of the plurality of receiver channels, estimates a coarse signal azimuth for said signal by calculating an amplitude monopulse ratio for said signal using two of the plurality of directional receiving antennas that receive the highest amplitude signal, and estimates a final signal azimuth for said signal using the estimated coarse signal azimuth and an interferometer baseline between said two of the plurality of directional receiving antennas.

31. The single site beacon transceiver of claim 30, wherein the digital receiver estimates the final signal azimuth using the equation:

$$\text{final\_azimuth} = \arcsin\left[\sin(\text{coarse\_az}) + \left[\frac{\text{del\_phi} \cdot c}{2 \cdot pi \cdot f \cdot d}\right]\right] \quad (a)$$

where:
- del_phi is the phase difference between said two of the plurality of directional receiving antennas;
- c is the speed of light;
- f is the RF frequency of received signal; and
- d is distance between phase centers of said two of the plurality of directional receiving antennas, and coarse_az is the coarse signal azimuth relative to the normal to the interferometer baseline.

32. The single site beacon transceiver of claim 31, wherein the coarse azimuth (coarse_az) is determined from an amplitude monopulse table using the amplitude monopulse ratio equation, $$\text{amp\_monopulse\_ratio} = \frac{\text{abs}(VC1) - \text{abs}(VC2)}{\text{abs}(VC1) + \text{abs}(VC2)}$$

where:
- ABS denotes the absolute value of the complex envelope of the signal;
- VC1 is the complex envelope in one of said two of the plurality of directional receiving antennas after calibration; and
- VC2 is the complex envelope in the other of said two of the plurality of directional receiving antennas after calibration.

33. The single site beacon transceiver of claim 31, wherein the coarse azimuth (coarse_az) is determined from an amplitude monopulse table using the amplitude monopulse ratio equation, $$\text{amp\_monopulse\_ratio} = \frac{\text{abs}(VC1)}{\text{abs}(VC2)} \quad (b)$$

where:
- ABS denotes the absolute value of the complex envelope of the signal;
- VC1 is the complex envelope in one of said two of the plurality of directional receiving antennas after calibration; and
- VC2 is the complex envelope in the other of said two of the plurality of directional receiving antennas after calibration.

34. The single site beacon transceiver of claim 31, wherein the coarse azimuth (coarse_az) is determined from an amplitude monopulse table using the amplitude monopulse ratio equation, $$\text{amp\_monopulse\_ratio} = \log\left[\frac{\text{abs}(VC1)}{\text{abs}(VC2)}\right] \quad (b)$$

where:
- ABS denotes the absolute value of the complex envelope of the signal;
- VC1 is the complex envelope in one of said two of the plurality of directional receiving antennas after calibration; and
- VC2 is the complex envelope in the other of said two of the plurality of directional receiving antennas after calibration.

35. The single site beacon transceiver of claim 30, wherein said at least one directional transceiver located at a central position in said single site beacon transceiver transmits an interrogation signal, and said signal is a reply signal to the interrogation signal or an unsolicited beacon squit transmission, and wherein said at least one directional transceiver and the plurality of directional antennas provide at least two interferometer baselines to resolve azimuth ambiguities.

36. The single site beacon transceiver of claim 30, wherein the digital receiver calculates an interferometric azimuth deviation from an interferometric phase difference between said two of the plurality of directional receiving antennas.

37. The single site beacon transceiver of claim 30, wherein said signal is downconverted to an intermediate frequency and digitized prior to being transformed into a numerical representation of said signal.

38. The single site beacon transceiver of claim 30, wherein said signals are converted to a numerical representation of a complex envelope using a Hilbert Transform.

39. The single site beacon transceiver of claim 30, wherein the calibration of the plurality of receiver channels comprises:
- receiving a calibration signal at each of the plurality of receiver channels;
- downconverting the calibration signal to an intermediate frequency;
- digitizing the downconverted calibration signal;
- transforming the calibration signal into a numerical representation of a complex envelope of the calibration signal using a Hilbert Transform and
- calculating an insertion phase difference and an insertion amplitude difference between said plurality of receiver channels, associating each antenna of said plurality of antennas with one of said plurality of receiver channels, combining said insertion amplitude difference and said insertion phase difference calculated for each receiver channel with a stored insertion amplitude difference and a stored insertion phase difference for said antenna associated with said receiver channel; storing said insertion amplitude difference and said insertion phase difference for each receiver channel and said antenna associated with said receiver channel, and then removing said insertion amplitude difference and said insertion phase difference of said receiver channel and said antenna associated with said receiver channel from said signal before estimating the azimuth.

40. A single site beacon transceiver, comprising:
at least one directional transceiver located at a central position in said single site beacon transceiver for transmitting a signal and receiving a signal, wherein said at least one directional transceiver transmits an interrogation signal;

a plurality of directional receiving antennas located along a periphery of said single site beacon transceiver providing 360 degrees of coverage for receiving signals; and a digital receiver for processing said signal, said digital receiver comprising a plurality of receiver channels and at least one processor, wherein the processing of said signal comprises:

calibrating the plurality of receiver channels periodically before estimating the angle of arrival of said signal;

determining which two of the plurality of directional receiving antennas received the highest amplitude signal;

determining an interferometric baseline between said two of the plurality of directional receiving antennas;

downconverting, digitizing and transforming said signal at each of said two of the plurality of directional receiving antennas into a numerical representation of said signal;

calculating a numerical representation of a complex envelope from the numerical representation of said signal for each of said two of the plurality of directional receiving antennas;

calculating an amplitude monopulse ratio for said signal;

calculating a coarse signal azimuth angle for said signal by converting said signal amplitude monopulse ratio to an azimuth angle relative to the interferometric baseline;

calculating an interferometric phase difference for said signal relative to the interferometric baseline;

estimating an interferometric azimuth deviation from the calculated coarse signal azimuth angle; and determining a final signal azimuth for said signal using the calculated coarse signal azimuth angle and the estimated interferometric azimuth deviation.

41. The single site beacon transceiver of claim 40, wherein the digital receiver estimates the final signal azimuth using the equation:

$$\text{final\_azimuth} = \arcsin\left[\sin(\text{coarse\_az}) + \left[\frac{\text{del\_phi} \cdot c}{2 \cdot pi \cdot f \cdot d}\right]\right] \quad (a)$$

where:
del_phi is the phase difference between said two of the plurality of directional receiving antennas;
c is the speed of light;
f is the RF frequency of received signal; and
d is distance between phase centers of said two of the plurality of directional receiving antennas, and coarse_az is the coarse signal azimuth relative to the normal to the interferometer baseline.

42. The single site beacon transceiver of claim 41, wherein the coarse azimuth (coarse_az) is determined from an amplitude monopulse table using the amplitude monopulse ratio equation, $$\text{amp\_monopulse\_ratio} = \frac{\text{abs}(VC1) - \text{abs}(VC2)}{\text{abs}(VC1) + \text{abs}(VC2)}$$

where:
ABS denotes the absolute value of the complex envelope of the signal;
VC1 is the complex envelope in one of said two of the plurality of directional receiving antennas after calibration; and
VC2 is the complex envelope in the other of said two of the plurality of directional receiving antennas after calibration.

43. The single site beacon transceiver of claim 41, wherein the coarse azimuth (coarse_az) is determined from an amplitude monopulse table using the amplitude monopulse ratio equation, $$\text{amp\_monopulse\_ratio} = \frac{\text{abs}(VC1)}{\text{abs}(VC2)} \quad (b)$$

where:
ABS denotes the absolute value of the complex envelope of the signal;
VC1 is the complex envelope in one of said two of the plurality of directional receiving antennas after calibration; and
VC2 is the complex envelope in the other of said two of the plurality of directional receiving antennas after calibration.

44. The single site beacon transceiver of claim 41, wherein said at least one directional transceiver located at a central position in said single site beacon transceiver transmits an interrogation signal, and said signal is a reply signal to the interrogation signal or an unsolicited beacon squit transmission, and wherein said at least one directional transceiver and the plurality of directional antennas provides at least two interferometer baselines to resolve azimuth ambiguities.

45. The single site beacon transceiver of claim 40, wherein the digital receiver calculates an interferometric azimuth deviation from an interferometric phase difference between said two of the plurality of directional receiving antennas.

46. The single site beacon transceiver of claim 40, wherein said signal is downconverted to an intermediate frequency and digitized prior to being transformed into a numerical representation of said signal.

47. The single site beacon transceiver of claim 40, wherein said signals are converted to a numerical representation of a complex envelope using a Hilbert Transform.

48. The single site beacon transceiver of claim 40, wherein the calibration of the plurality of receiver channels comprises:

receiving a calibration signal at each of the plurality of receiver channels;

downconverting the calibration signal to an intermediate frequency;

digitizing the downconverted calibration signal;

transforming the calibration signal into a numerical representation of a complex envelope of the calibration signal using a Hilbert Transform and calculating an insertion phase difference and an insertion amplitude difference between said plurality of receiver channels, associating each antenna of said plurality of antennas with one of said plurality of receiver channels, combining said insertion amplitude difference and said insertion phase difference calculated for each receiver channel with a stored insertion amplitude difference and a stored insertion phase difference for said antenna associated with said receiver channel; storing said insertion amplitude difference and said insertion phase difference for each receiver channel and said antenna associated with said receiver channel, and then removing said insertion amplitude difference and said insertion phase difference of said receiver channel and said antenna associated with said receiver channel from said signal before estimating the azimuth.

49. A single site beacon transceiver, comprising:
at least one directional transceiver located at a central position in said single site beacon transceiver;
a plurality of directional receiving antennas located along a periphery of said single site beacon transceiver providing 360 degrees of coverage for receiving said signal; and
a digital receiver for processing said signal, said digital receiver comprising a plurality of receiver channels and at least one processor, wherein processing of said signal comprises:
calibrating the plurality of receiver channels periodically before estimating the angle of arrival of said signal;
determining which two of the plurality of directional receiving antennas received the highest amplitude signal;
determining an interferometric baseline between said two of the plurality of directional receiving antennas;
downconverting, digitizing and transforming said signal at each of said two of the plurality of directional receiving antennas into a numerical representation of said signal;
calculating a numerical representation of a complex envelope from the numerical representation of said signal for each of said two of the plurality of directional receiving antennas;
wherein the processing of said signal uses the following equation to determine an azimuth angle with respect to an interferometer baseline:

$$COST = \left| \frac{VC1\_received}{VC2\_received} - \frac{VC1\_model(theta)}{VC2\_model(theta)} \right|^2$$

where:
VC1_received is the complex envelope of the received signal after calibration at one of said two of the plurality of directional receiving antennas;
VC2_received is the complex envelope of the received signal after calibration at the other of said two of the plurality of directional; and
VC1_model(theta) is the model of the complex envelope of the received signal as a function of azimuth theta at one of said two of the plurality of the two directional receiving antennas; and
VC2_model(theta) is the model of the complex envelope of the received signal as a function of azimuth theta at the other of said two of the plurality of the two directional receiving antennas; and
wherein the azimuth angle corresponds to a minimum COST.

50. The single site beacon transceiver of claim 49, wherein said at least one directional transceiver transmits an interrogation signal and said signal is a reply signal to the interrogation signal or an unsolicited beacon squit transmission, wherein the plurality of directional transceivers and the plurality of directional receiving antennas provide at least two interferometer baselines to resolve azimuth ambiguities.

51. The single site beacon transceiver of claim 49, wherein said signal is downconverted to an intermediate frequency and digitized prior to being transformed into a numerical representation of said signal.

52. The single site beacon transceiver of claim 49, wherein the calibration of the plurality of receiver channels comprises:
receiving a calibration signal at each of the plurality of receiver channels;
downconverting the calibration signal to an intermediate frequency;
digitizing the downconverted calibration signal;
transforming the calibration signal into a numerical representation of a complex envelope of the calibration signal using a Hilbert Transform and
calculating an insertion phase difference and an insertion amplitude difference between said plurality of receiver channels, associating each antenna of said plurality of antennas with one of said plurality of receiver channels, combining said insertion amplitude difference and said insertion phase difference calculated for each receiver channel with a stored insertion amplitude difference and a stored insertion phase difference for said antenna associated with said receiver channel; storing said insertion amplitude difference and said insertion phase difference for each receiver channel and said antenna associated with said receiver channel, and then removing said insertion amplitude difference and said insertion phase difference of said receiver channel and said antenna associated with said receiver channel from said signal before estimating the azimuth.

53. A method of localizing targets using a single site beacon transceiver, the method comprising:
transmitting an interrogation signal from at least one of the at least one directional transceivers located at a central position in said single site beacon transceiver;
receiving a reply signal at a plurality of directional receiving antennas providing 360 degrees of coverage for receiving signals; and
processing the received reply signals in a digital receiver, said digital receiver comprising a plurality of receiver channels and at least one processor; wherein the processing comprises:
calibrating the plurality of receiver channels periodically before estimating the angle of arrival of the signal;
determining which two of the plurality of directional receiving antennas received the highest amplitude a signal;
determining an interferometric baseline between said two of the plurality of directional receiving antennas;
downconverting, digitizing and transforming said signal at each of said two of the plurality of directional receiving antennas into a numerical representation of said signal;
calculating a numerical representation of a complex envelope from the numerical representation of said signal for each of said two of the plurality of directional receiving antennas;
calculating an amplitude monopulse ratio for said signal;
calculating a coarse signal azimuth angle for said signal by converting said signal amplitude monopulse ratio to an azimuth angle relative to the interferometric baseline;
calculating an interferometric phase difference for said signal relative to the interferometric baseline;
estimating an interferometric azimuth deviation from the calculated coarse signal azimuth angle; and
determining a final signal azimuth angle for said signal using the calculated coarse signal azimuth angle and the estimated interferometric azimuth deviation.

54. The method of claim 53, wherein determining the final signal azimuth angle uses the equation:

$$\text{final\_azimuth} = \arcsin\left[\sin(\text{coarse\_az}) + \left[\frac{\text{del\_phi} \cdot c}{2 \cdot pi \cdot f \cdot d}\right]\right]$$

where:
del_phi is the phase difference between said two of the plurality of direction receiving antennas;
c is the speed of light;
f is the RF frequency of received signal; and
d is distance between phase centers of said two of the plurality of directional receiving antennas; and
coarse_az is the coarse signal azimuth relative to the normal to the interferometer baseline.

55. The method of claim 54, wherein determining the coarse azimuth (coarse_az) uses an amplitude monopulse table and the amplitude monopulse ratio equation, $$\text{amp\_monopulse\_ratio} = \frac{\text{abs}(VC1) - \text{abs}(VC2)}{\text{abs}(VC1) + \text{abs}(VC2)}$$

where:
ABS denotes the absolute value of the complex envelope of the signal;
VC1 is the complex envelope in one of said two of the plurality of directional receiving antennas after calibration; and
VC2 is the complex envelope in the other of said two of the plurality of directional receiving antennas after calibration.

56. The method of claim 54, wherein determining the coarse azimuth (coarse_az) uses an amplitude monopulse table and the amplitude monopulse ratio equation, $$\text{amp\_monopulse\_ratio} = \frac{\text{abs}(VC1)}{\text{abs}(VC2)}$$

where:
ABS denotes the absolute value of the complex envelope of the signal;
VC1 is the complex envelope in one of said two of the plurality of directional receiving antennas after calibration; and
VC2 is the complex envelope in the other of said two of the plurality of directional receiving antennas after calibration.

57. The method of claim 54 further comprising calculating the range to the target transmitting the reply signal based on the round trip delay time, wherein said at least one directional transceiver and the plurality of directional receiving antennas provide at least two interferometer baselines to resolve azimuth ambiguities.

58. The method of claim 53, wherein calibrating the plurality of receiver channels comprises the steps of:
receiving a calibration signal at each of the plurality of receiver channels;
downconverting the calibration signal to an intermediate frequency;
digitizing the downconverted calibration signal;
transforming the calibration signal into a numerical representation of a complex envelope of the calibration signal using a Hilbert Transform and
calculating an insertion phase difference and an insertion amplitude difference between said plurality of receiver channels, associating each antenna of said plurality of antennas with one of said plurality of receiver channels, combining said insertion amplitude difference and said insertion phase difference calculated for each receiver channel with a stored insertion amplitude difference and a stored insertion phase difference for said antenna associated with said receiver channel; storing said insertion amplitude difference and said insertion phase difference for each receiver channel and said antenna associated with said receiver channel, and then removing said insertion amplitude difference and said insertion phase difference of said receiver channel and said antenna associated with said receiver channel from said signal before estimating the azimuth.

59. The single site beacon transceiver of claim 1, wherein each of the plurality of receiver channels is calibrated by periodically injecting a calibration signal through a directional coupler to determine a calibration coefficient for each of the plurality of receiver channels, storing the calibration coefficient for each of the plurality of receiver channels, and removing the calibration coefficient from said signal before estimating a coarse signal azimuth.

60. The single site beacon transceiver of claim 11, wherein each of the plurality of receiver channels is calibrated by periodically injecting a calibration signal through a directional coupler to determine a calibration coefficient for each of the plurality of receiver channels, storing the calibration coefficient for each of the plurality of receiver channels, and removing the calibration coefficient from said signal before estimating a coarse signal azimuth.

61. The single site beacon transceiver of claim 20, wherein each of the plurality of receiver channels is calibrated by periodically injecting a calibration signal through a directional coupler to determine a calibration coefficient for each of the plurality of receiver channels, storing the calibration coefficient for each of the plurality of receiver channels, and removing the calibration coefficient from said signal before estimating a coarse signal azimuth.

62. The method of claim 24, wherein calibrating each of the plurality of receiver channels further comprises:
injecting a calibration signal through a directional coupler periodically to each of the plurality of receiver channels;
determining a calibration coefficient for each of the plurality of receiver channels;
storing the calibration coefficient for each of the plurality of receiver channels; and
removing the calibration coefficient from said signal before estimating a coarse signal azimuth.

63. The single site beacon transceiver of claim 30, wherein each of the plurality of receiver channels is calibrated by periodically injecting a calibration signal through a directional coupler to determine a calibration coefficient for each of the plurality of receiver channels, storing the calibration coefficient for each of the plurality of receiver channels, and removing the calibration coefficient from said signal before estimating a coarse signal azimuth.

64. The single site beacon transceiver of claim 40, wherein each of the plurality of receiver channels is calibrated by periodically injecting a calibration signal through a directional coupler to determine a calibration coefficient for each of the plurality of receiver channels, storing the calibration coefficient for each of the plurality of receiver channels, and removing the calibration coefficient from said signal before estimating a coarse signal azimuth.

65. The single site beacon transceiver of claim 49, wherein each of the plurality of receiver channels is calibrated by periodically injecting a calibration signal through a directional coupler to determine a calibration coefficient for each of the plurality of receiver channels, storing the calibration coefficient for each of the plurality of receiver channels, and removing the calibration coefficient from said signal before estimating a coarse signal azimuth.

66. The method of claim 53, wherein calibrating each of the plurality of receiver channels further comprises:
injecting a calibration signal through a directional coupler periodically to each of the plurality of receiver channels;
determining a calibration coefficient for each of the plurality of receiver channels;
storing the calibration coefficient for each of the plurality of receiver channels; and
removing the calibration coefficient from said signal before estimating a coarse signal azimuth.

67. A single site beacon transceiver, comprising:
an omni-directional transceiver;
at least one directional receiving antenna;
a digital receiver for processing said signal, said digital receiver comprising a plurality of receiver channels and at least one processor, wherein processing of said signal comprises:
calibrating the plurality of receiver channels periodically before estimating the angle of arrival of said signal;
determining which two of the plurality of directional receiving antennas received the highest amplitude signal;
determining an interferometric baseline between said two of the plurality of directional receiving antennas;
downconverting, digitizing and transforming said signal at each of said two of the plurality of directional receiving antennas into a numerical representation of said signal;
calculating a numerical representation of a complex envelope from the numerical representation of said signal for each of said two of the plurality of directional receiving antennas;
wherein the processing of said signal uses two interferometer baselines in the following equation to determine an azimuth angle with respect to an interferometer baseline:

$$COST = W1 \cdot \left| \frac{VC1\_received}{VC2\_received} - \frac{VC1\_model(theta)}{VC2\_model(theta)} \right|^2 +$$
$$W2 \cdot \left| \frac{VC1\_received}{VC3\_received} - \frac{VC1\_model(theta)}{VC3\_model(theta)} \right|^2 +$$
$$W3 \cdot \left| \frac{VC2\_received}{VC3\_received} - \frac{VC2\_model(theta)}{VC3\_model(theta)} \right|^2$$

where:
W1, W2 and W3 are adaptive weighting values that are optimized according to estimation theory to mitigate multipath;
VC1_received is the complex envelope of the received signal after calibration at one of said two of the plurality of directional receiving antennas;
VC2_received is the complex envelope of the received signal after calibration at the other of said two of the plurality of directional;
VC3_received is the complex envelope of the received signal after calibration at the omni-directional antenna relative to the signal at the other of said two of the plurality of directional receiving antennas; and
VC1_model(theta) is the model of the complex envelope of the received signal as a function of azimuth theta at one of said two of the plurality of the two directional receiving antennas;
VC2_model(theta) is the model of the complex envelope of the received signal as a function of azimuth theta at the other of said two of the plurality of the two directional receiving antennas; and
VC3_model(theta) is the model of the complex envelope of the received signal as a function of azimuth theta at the omni-directional antenna relative to the signal at the other of said two of the plurality of directional receiving antennas; and
wherein the azimuth angle corresponds to a minimum COST.

68. The single site beacon transceiver of claim 67, wherein at least one of said at least one directional receiving antenna transmits an interrogation signal and said signal is a reply signal to the interrogation signal or an unsolicited beacon squit transmission, wherein the omni-directional transceiver and said two of the plurality of directional receiving antennas and at least one directional transceiver provide at least two interferometer baselines to resolve azimuth ambiguities.

69. The single site beacon transceiver of claim 67, wherein said signal is downconverted to an intermediate frequency and digitized prior to being transformed into a numerical representation of said signal.

70. The single site beacon transceiver of claim 67, wherein the calibration of the plurality of receiver channels comprises:
receiving a calibration signal at each of the plurality of receiver channels;
downconverting the calibration signal to an intermediate frequency;
digitizing the downconverted calibration signal;
transforming the calibration signal into a numerical representation of a complex envelope of the calibration signal using a Hilbert Transform and
calculating an insertion phase difference and an insertion amplitude difference between said plurality of receiver channels, associating each antenna of said plurality of antennas with one of said plurality of receiver channels, combining said insertion amplitude difference and said insertion phase difference calculated for each receiver channel with a stored insertion amplitude difference and a stored insertion phase difference for said antenna associated with said receiver channel; storing said insertion amplitude difference and said insertion phase difference for each receiver channel and said antenna associated with said receiver channel, and then removing said insertion amplitude difference and said insertion phase difference of said receiver channel and said antenna associated with said receiver channel from said signal before estimating the azimuth.

71. A single site beacon transceiver, comprising:
at least one directional transceiver located at a central position in said single site beacon transceiver;
a plurality of directional receiving antennas located along a periphery of said single site beacon transceiver providing 360 degrees of coverage for receiving said signal; and
a digital receiver for processing said signal, said digital receiver comprising a plurality of receiver channels and at least one processor, wherein processing of said signal comprises:

calibrating the plurality of directional receiving antennas periodically before estimating the angle of arrival of said signal;

determining which two of the plurality of directional receiving antennas received the highest amplitude signal;

determining an interferometric baseline between said two of the plurality of directional receiving antennas;

downconverting, digitizing and transforming said signal at each of said two of the plurality of directional receiving antennas into a numerical representation of said signal;

calculating a numerical representation of a complex envelope from the numerical representation of said signal for each of said two of the plurality of directional receiving antennas;

wherein the processing of said signal uses two interferometer baselines and the following equation to determine an azimuth angle with respect to an interferometer baseline:

$$COST = W1 \cdot \left| \frac{VC1\_received}{VC2\_received} - \frac{VC1\_model(theta)}{VC2\_model(theta)} \right|^2 +$$
$$W2 \cdot \left| \frac{VC1\_received}{VC3\_received} - \frac{VC1\_model(theta)}{VC3\_model(theta)} \right|^2 +$$
$$W3 \cdot \left| \frac{VC2\_received}{VC3\_received} - \frac{VC2\_model(theta)}{VC3\_model(theta)} \right|^2$$

where:
W1, W2 and W3 are adaptive weighting values that are optimized according to estimation theory to mitigate multipath;
VC1_received is the complex envelope of the received signal after calibration at one of said two of the plurality of directional receiving antennas;
VC2_received is the complex envelope of the received signal after calibration at the other of said two of the plurality of directional;
VC3_received is the complex envelope of the received signal after calibration at the omni-directional antenna relative to the signal at the other of said two of the plurality of directional receiving antennas; and
VC1_model(theta) is the model of the complex envelope of the received signal as a function of azimuth theta at one of said two of the plurality of the two directional receiving antennas; and
VC2_model(theta) is the model of the complex envelope of the received signal as a function of azimuth theta at the other of said two of the plurality of the two directional receiving antennas; and
VC3_model(theta) is the model of the complex envelope of the received signal as a function of azimuth theta at the omni-directional antenna relative to the signal at the other of said two of the plurality of directional receiving antennas; and
wherein the azimuth angle corresponds to a minimum COST.

72. The single site beacon transceiver of claim 71, wherein at least one of said at least one directional receiving antenna transmits an interrogation signal and said signal is a reply signal to the interrogation signal or an unsolicited beacon squit transmission, wherein the omni-directional transceiver and said two of the plurality of directional receiving antennas and at least one directional transceiver provide at least two interferometer baselines to resolve azimuth ambiguities.

73. The single site beacon transceiver of claim 71, wherein said signal is downconverted to an intermediate frequency and digitized prior to being transformed into a numerical representation of said signal.

74. The single site beacon transceiver of claim 71, wherein the calibration of the plurality of receiver channels comprises:
receiving a calibration signal at each of the plurality of receiver channels;
downconverting the calibration signal to an intermediate frequency;
digitizing the downconverted calibration signal;
transforming the calibration signal into a numerical representation of a complex envelope of the calibration signal using a Hilbert Transform and
calculating an insertion phase difference and an insertion amplitude difference between said plurality of receiver channels, associating each antenna of said plurality of antennas with one of said plurality of receiver channels, combining said insertion amplitude difference and said insertion phase difference calculated for each receiver channel with a stored insertion amplitude difference and a stored insertion phase difference for said antenna associated with said receiver channel; storing said insertion amplitude difference and said insertion phase difference for each receiver channel and said antenna associated with said receiver channel, and then removing said insertion amplitude difference and said insertion phase difference of said receiver channel and said antenna associated with said receiver channel from said signal before estimating the azimuth.

75. The single site beacon transceiver of claim 67, wherein W1, W2 and W3 are determined by adaptive algorithms in the time domain to mitigate multipath.

76. The single site beacon transceiver of claim 67, wherein W1, W2 and W3 are determined by:
examining the received signal pulse shape and determining a leading edge and a trailing edge of the received signal pulse shape, wherein a multipath signal is visible near the trailing edge of the received signal pulse shape;
creating a new synthetic pulse shape for the received signal having a trailing edge adjusted to overlap the multipath signal visible near the trailing edge of the received signal pulse shape;
processing said synthetic pulse shape through the digital receiver processing;
selecting a sample from the area of overlap with the multipath signal visible near the trailing edge of the received signal pulse shape; and
calculating an adaptive weight W using the following equation:

$$W = \frac{Vsignal(sp) \cdot Vsynthetic(sp)^*}{|Vsynthetic(sp)|^2}$$

where:
Vsignal(sp) is the complex envelope of the signal in the sampling area; and
Vsynthetic(sp) is the complex envelope of the synthetic signal in the sampling area.

77. The single site beacon transceiver of claim 76, wherein the adaptive weight W is used to calculate the cancelled complex envelope using the following equation:

$$Vcancelled = Vsignal - W \cdot Vsynthetic$$

where:
- Vsignal is the complex envelope of the signal;
- Vsynthetic is the complex envelope of the synthetic signal; and
- W is the adaptive weight value.

78. The single site beacon transceiver of claim 71, wherein W1, W2 and W3 are determined by adaptive algorithms in the time domain to mitigate multipath.

79. The single site beacon transceiver of claim 71, wherein W1, W2 and W3 are determined by:
- examining the received signal pulse shape and determining a leading edge and a trailing edge of the received signal pulse shape, wherein a multipath signal is visible near the trailing edge of the received signal pulse shape;
- creating a new synthetic pulse shape for the received signal having a trailing edge adjusted to overlap the multipath signal visible near the trailing edge of the received signal pulse shape;
- processing said synthetic pulse shape through the digital receiver processing;
- selecting a sample from the area of overlap with the multipath signal visible near the trailing edge of the received signal pulse shape; and
- calculating an adaptive weight W using the following equation:

$$W = \frac{Vsignal(sp) \cdot Vynthetic(sp)^*}{|Vsynthetic(sp)|^2}$$

where:
- Vsignal(sp) is the complex envelope of the signal in the sampling area; and
- Vsynthetic(sp) is the complex envelope of the synthetic signal in the sampling area.

80. The single site beacon transceiver of claim 79, wherein the adaptive weight W is used to calculate the cancelled complex envelope using the following equation:

$$Vcancelled = Vsignal - W \cdot Vsynthetic$$

where:
- Vsignal is the complex envelope of the signal;
- Vsynthetic is the complex envelope of the synthetic signal; and
- W is the adaptive weight value.

* * * * *